(12) United States Patent
Liefsoens et al.

(10) Patent No.: US 11,428,887 B2
(45) Date of Patent: Aug. 30, 2022

(54) SEALING ENCLOSURE ARRANGEMENTS FOR OPTICAL FIBER CABLES

(71) Applicant: COMMSCOPE CONNECTIVITY BELGIUM BVBA, Kessel-Lo (BE)

(72) Inventors: Ronnie Rosa Georges Liefsoens, Tessenderlo (BE); Jiri Zavrel, Leuven (BE); Eric Schurmans, Hogen-Geetbets (BE); Kristof Vastmans, Kessel-Lo (BE); Dirk Jozef G. Van De Weyer, Beringen (BE); Bart Mattie Claessens, Hasselt (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 17/047,005

(22) PCT Filed: Apr. 12, 2019

(86) PCT No.: PCT/EP2019/059552
§ 371 (c)(1),
(2) Date: Oct. 12, 2020

(87) PCT Pub. No.: WO2019/197665
PCT Pub. Date: Oct. 17, 2019

(65) Prior Publication Data
US 2021/0191057 A1 Jun. 24, 2021

Related U.S. Application Data

(60) Provisional application No. 62/832,041, filed on Apr. 10, 2019, provisional application No. 62/681,923, (Continued)

(51) Int. Cl.
*G02B 6/44* (2006.01)
*G02B 6/42* (2006.01)

(52) U.S. Cl.
CPC ......... *G02B 6/4447* (2013.01); *G02B 6/4248* (2013.01); *G02B 6/4454* (2013.01); *G02B 6/4477* (2013.01)

(58) Field of Classification Search
CPC .................................................. G02B 6/4447
See application file for complete search history.

(56) References Cited

U.S. PATENT DOCUMENTS 5,142,661 A    8/1992  Grant et al.
6,308,000 B1  10/2001  Ikeda et al.
(Continued)

FOREIGN PATENT DOCUMENTS

EP    2 788 808 A1   10/2014
EP    2 834 691 A1    2/2015
(Continued)

OTHER PUBLICATIONS

International Search Report and Written Opinion of the International Searching Authority for International Patent Application No. PCT/EP2019/059552 dated Oct. 31, 2019, 25 pages.

*Primary Examiner* — Chris H Chu
(74) *Attorney, Agent, or Firm* — Merchant & Gould P.C.

(57) ABSTRACT

Pairs of windows are cut into a distribution cable at various points along the length to couple some of the optical fibers of the distribution cable to drop cables. A wrap-type sealing arrangement can seal a first window of each pair. An enclosure-type sealing arrangement can seal a second window of each pair. The enclosure includes a splice tray and cable storage. Optical adapters and/or a passive splitter also may be disposed within the enclosure.

18 Claims, 44 Drawing Sheets

Related U.S. Application Data filed on Jun. 7, 2018, provisional application No. 62/660,019, filed on Apr. 19, 2018, provisional application No. 62/656,896, filed on Apr. 12, 2018, provisional application No. 62/656,853, filed on Apr. 12, 2018.

(56) References Cited

U.S. PATENT DOCUMENTS

| | | | |
|---|---|---|---|
| 6,311,007 B1* | 10/2001 | Daoud | G02B 6/4454 |
| | | | 385/135 |
| 2009/0252472 A1* | 10/2009 | Solheid | G02B 6/4454 |
| | | | 385/135 |
| 2009/0310927 A1 | 12/2009 | Riggsby et al. | |
| 2011/0262095 A1* | 10/2011 | Fabrykowski | G02B 6/4466 |
| | | | 385/135 |
| 2015/0093089 A1* | 4/2015 | Varghese | G02B 6/4455 |
| | | | 385/135 |
| 2015/0241654 A1 | 8/2015 | Allen et al. | |
| 2016/0252694 A1 | 9/2016 | Sadasivan et al. | |

FOREIGN PATENT DOCUMENTS

| | | |
|---|---|---|
| WO | 2019/209613 A1 | 10/2019 |
| WO | 2019/209643 A1 | 10/2019 |
| WO | 2020/150392 A1 | 7/2020 |

* cited by examiner

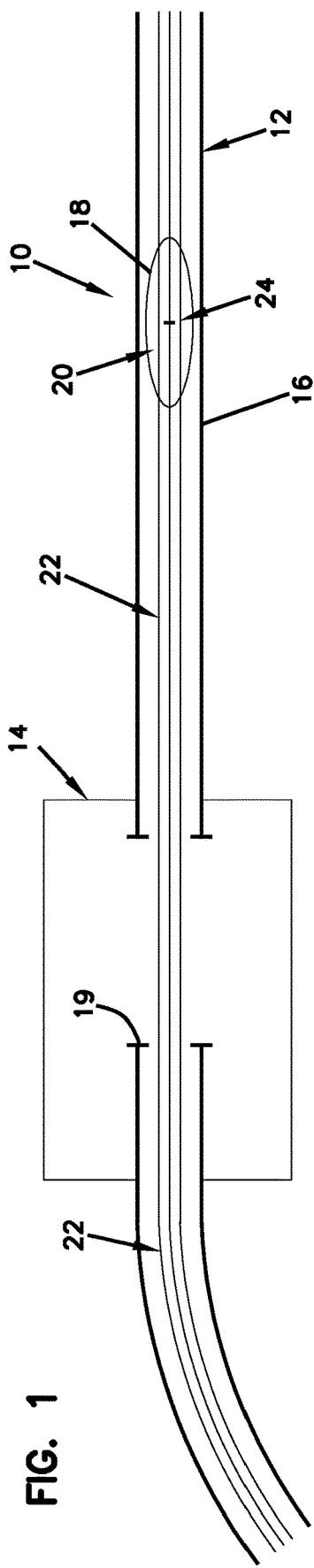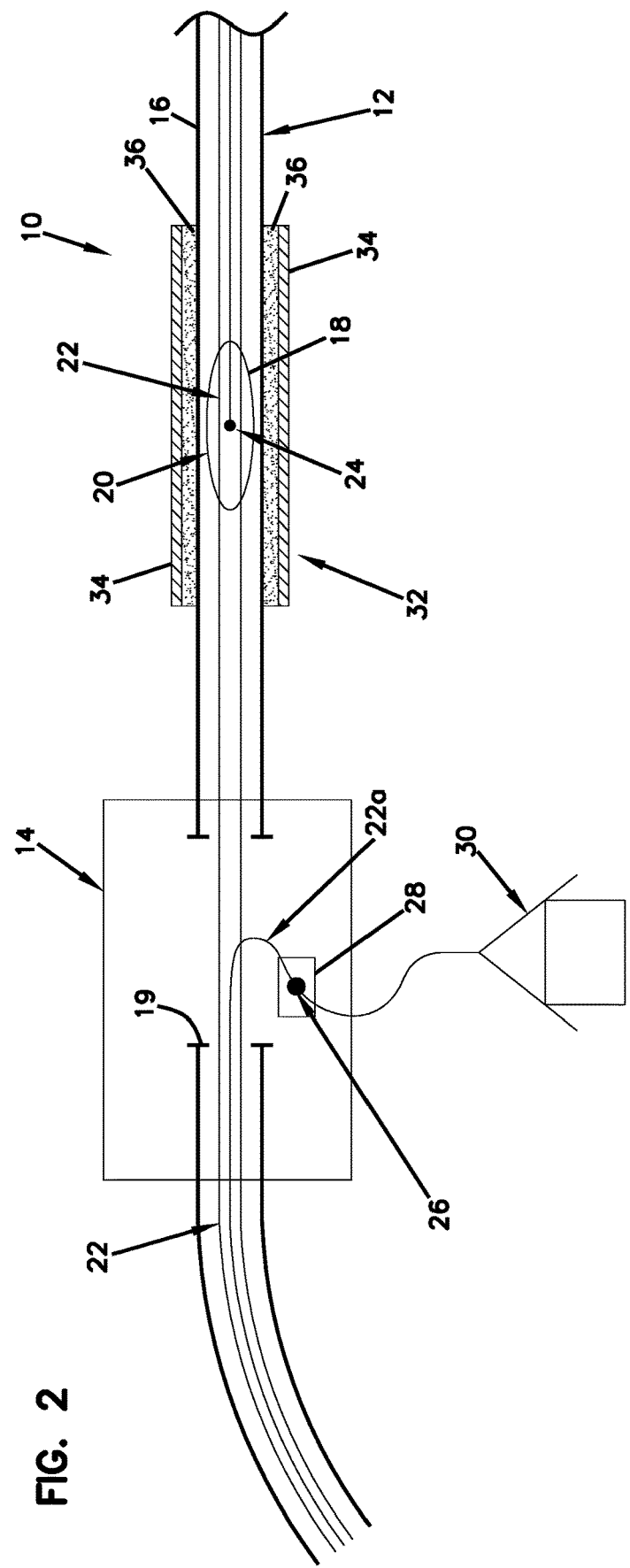

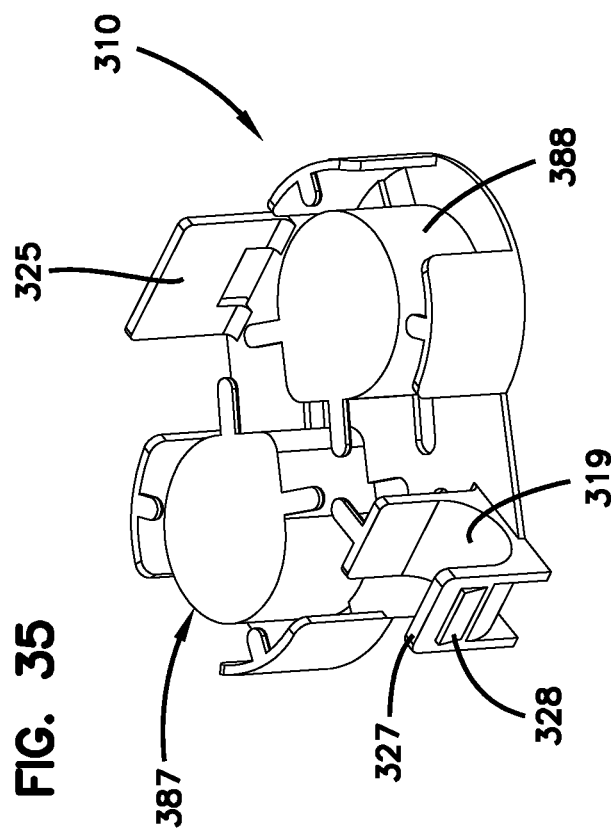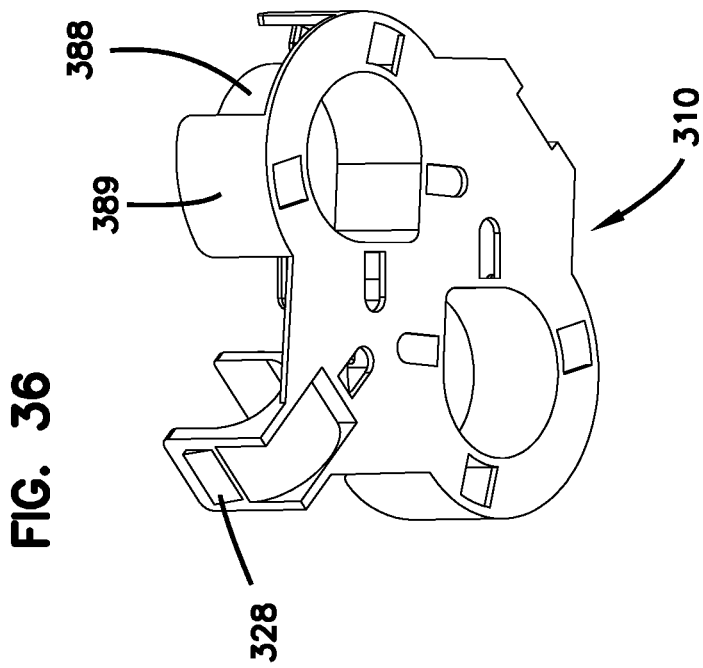

SEALING ENCLOSURE ARRANGEMENTS FOR OPTICAL FIBER CABLES

CROSS-REFERENCE TO RELATED APPLICATIONS

This application is a National Stage Application of PCT/EP2019/059552, filed on Apr. 12, 2019, which claims the benefit of U.S. Patent Application Ser. No. 62/656,853, filed on Apr. 12, 2018, and claims the benefit of U.S. Patent Application Ser. No. 62/656,896, filed on Apr. 12, 2018, and claims the benefit of U.S. Patent Application Ser. No. 62/660,019, filed on Apr. 19, 2018, and claims the benefit of U.S. Patent Application Ser. No. 62/681,923, filed on Jun. 7, 2018, and claims the benefit of U.S. Patent Application Ser. No. 62/832,041, filed on Apr. 10, 2019, the disclosures of which are incorporated herein by reference in their entireties.

BACKGROUND

Fiber optic telecommunications technology is becoming more prevalent as service providers strive to deliver higher bandwidth communication capabilities to customers/subscribers. As data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on. These networks are often referred to as fiber to the premise (FTTP) or fiber to the home (FTTH) networks. In an FTTH network, fiber optic cable is run from the service provider's central office to an ONT located at the subscriber's residence or office space.

Improvements in telecommunications enclosures to protect the exposed interior of fiber optic cables are desirable.

SUMMARY

Features of the present disclosure relate to a fiber distribution system in which pairs of windows are cut into a distribution cable at various points along the length to couple some of the optical fibers of the distribution cable to drop cables. Select fibers are cut at the first window and retracted through the second window. A first sealing arrangement seals the first window of each pair. A second sealing arrangement seals the second window of each pair. The second sealing arrangement also manages the cut optical fibers to enable the cut optical fibers to be optically coupled to one or more drop cables.

In accordance with certain aspects of the disclosure, the first sealing arrangement includes a wrap-style sealing arrangement. In certain implementations, the first sealing arrangement includes a sheet and a clip. The sheet is wrapped around the cable at the window to form a roll. The roll is wrapped sufficiently tightly around the cable to seal against the cable jacket. The clip holds the roll to the cable and inhibits unwrapping of the sheet.

In accordance with certain aspects of the disclosure, the second sealing arrangement includes an enclosure-type sealing arrangement. The enclosure includes a base and a pivotal cover. The enclosure includes a splice tray and cable storage. In certain examples, optical adapters and/or a passive splitter also may be disposed within the enclosure.

In accordance with certain aspects of the disclosure, the enclosure of the second sealing arrangement can be shaped so that a first end appears larger than a second end. The enclosure includes distribution cable ports towards the first end and includes drop cable ports towards the second end. In certain examples, the enclosure appears larger (e.g., longer, thicker, etc.) where the distribution cable extends from the enclosure as compared to where the drop cables extend from the enclosure. In certain examples, the sides of the enclosure has similar contouring to the drop cables extending from the enclosure towards the distribution cable. In certain examples, the cover of the enclosure overhangs the base. In an example, the cover overhangs the base at the distribution cable ports and/or at the drop cable ports.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a schematic representation of a fiber optic network including a cable passing through an optical termination enclosure, the cable having an incision in accord with principles of the present disclosure.

FIG. 2 is a schematic representation of the fiber optic network shown in FIG. 1 with an optical fiber retracted from the cable and an enclosure arrangement positioned over the incision in accord with the principles of the present disclosure.

FIG. 35 is a front perspective view of the management arrangement of FIG. 34;

FIG. 36 is a rear perspective view of the management arrangement of FIG. 34;

DETAILED DESCRIPTION

Figure 3:
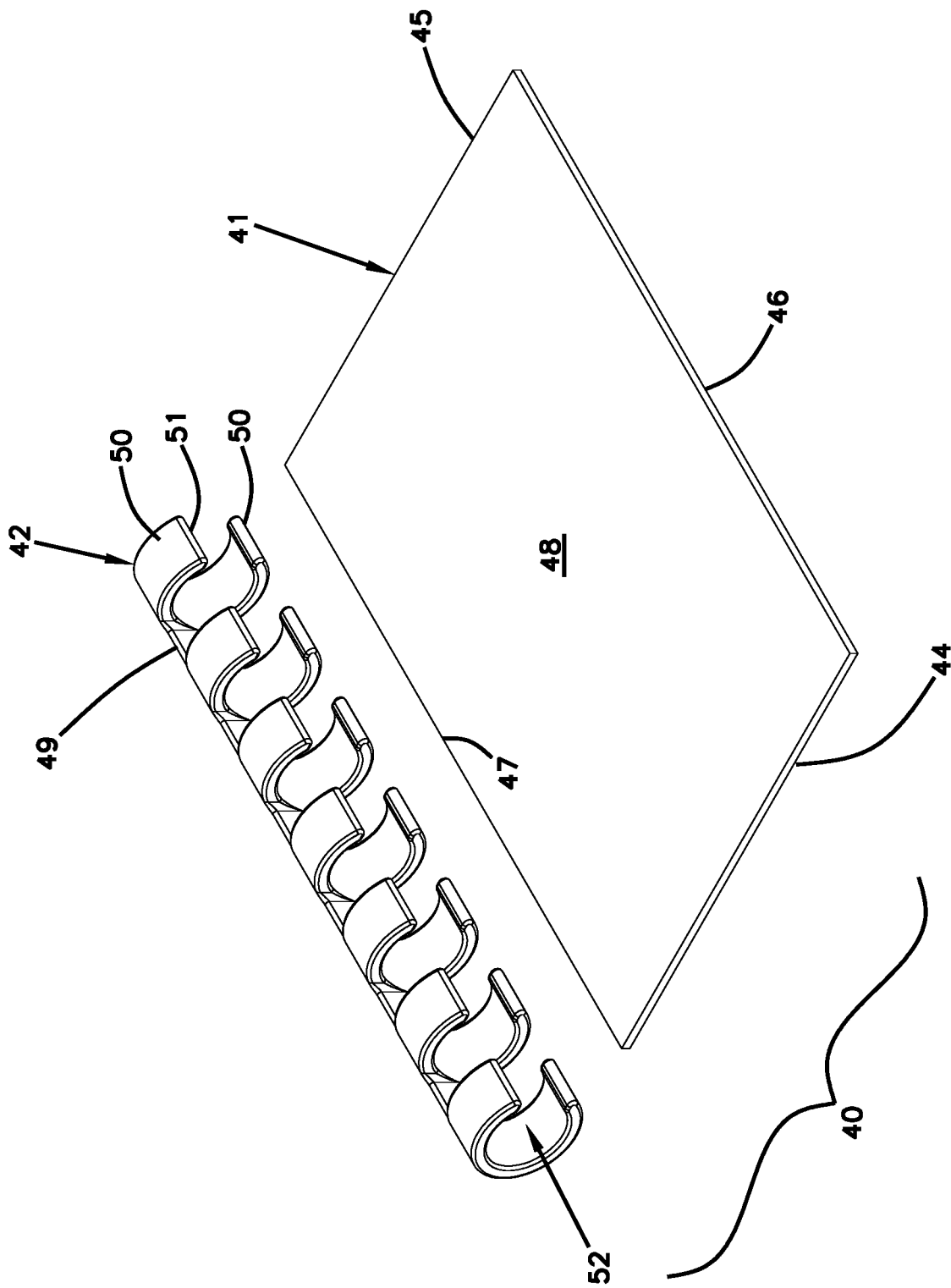
FIG. 3 illustrates a first example sealing arrangement suitable for sealing a first window cut into the cable of FIG. 1, the first sealing arrangement including a sheet and a clip.

A feature of the present disclosure relates to an enclosure arrangement for resealing an opening in an optical cable.

When expanding an optical network into a new neighborhood or other location, one or more distribution cables 12 can be routed through the neighborhood. One or more fibers are broken out from a distribution cable 12 at various points along the route to provide service to subscribers. The broken out fibers can be optically coupled to drop cables 13, which are routed to the subscribers. For example, the broken out fibers can be coupled to the drop cables 13 at an optical terminal enclosure (OTE).

FIGS. 1 and 2 illustrate a portion of a fiber optic network 10 in accordance with the principles of the present disclosure. In such an embodiment, a telecommunications cable 12 (e.g., a single fiber or multi-fiber distribution cable) is shown passing through an example OTE 14. The telecommunications cable 12 may have on the order of twelve to forty-eight fibers 22; however, alternative implementations may include fewer or more fibers. While telecommunications cables typically have a large number of fibers 22, the various aspects of the present disclosure are also applicable to distribution cables having fewer numbers of fibers 22 (e.g., 2 or more fibers).

In certain examples, the telecommunications cable 12 can include an outer jacket 16 enclosing a single buffer tube 15 and at least two strength members extending on opposite sides of the single buffer tube. An outer strength member 11 such as Kevlar can surround the single buffer tube 15 within the jacket 16. The single buffer tube 15 can enclose loose fibers or ribbon fibers. In other examples, the fibers 22 can be loose within the outer jacket 16. In other examples, the cable 12 can include a single strength member.

An incision 18 (e.g., cut) can be made in the outer jacket 16 of the telecommunications cable 12 such that a portion of the outer jacket 16 may be removed from the telecommunications cable 12 that is outside the OTE 14 to provide a window 20 (i.e., opening) that exposes optical fibers 22. One or more of the optical fibers 22 of the telecommunications cable 12 may be cut at a location 24 aligned with the window 20.

The cut optical fiber 22a (FIG. 2) may be retracted out of the telecommunications cable 12 while the remaining optical fibers 22 of the telecommunications cable 12 are uncut and continue to pass through. For example, a second incision can be made in the outer jacket 16 such that a portion of the outer jacket 16 may be removed to provide a second window 19. The cut optical fiber 22a can be retracted out of the cable 12 through the second window 19.

The OTE 14 is mounted over the second window 19 to seal the second window 19. The cut optical fibers 22a retracted out of the cable 12 are protected and managed within the OTE 14. For example, the OTE 14 can include a splice tray 28, 71, 101, 131, optical adapters 120, 150, 180, and/or an optical splitter to which the cut optical fibers 22a can be optically coupled. In certain examples, the cut optical fibers 22a can be spliced at a splice location 26 within splice tray 28 for facilitating coupling of the cut optical fiber 22a to a subscriber location 30. In other examples, the cut optical fiber 22a can be routed directly to the subscriber location 30 and spliced there rather than within the OTE 14.

The OTE 14 is configured to be mounted vertically to a wall or other surface so that the distribution cable 12 extends generally horizontally across the OTE 14. The distribution cable 12 may extend across many buildings or other structures. Multiple sets of first and second windows 18, 19 may be cut into the cable 12 and multiple OTEs 14 may be disposed along the cable 12 at the second windows 19. One or more drop cables 13 extend out from each OTE 14 towards subscribers. In certain implementations, the drop cables 13 may extend generally upwardly (e.g., vertically) towards the subscribers. In certain implementations, the drop cables 13 are routed towards the distribution cable 12 and then run along the distribution cable 12 (e.g., wrapped around the cable 12 or secured to the cable 12) over a distance towards the subscribers.

A sealing arrangement 32 is mounted over the first window 18 to environmentally seal the telecommunications cable 12. The distance between the OTE 14 and the sealing arrangement 32 can be from about 2 meters up to about 100 meters. The distance can vary with the length of the telecommunications cable 12 and the required distance to be routed. The distance can also depend on the path of travel whether it is a straight path or a path with many turns. The location of the incision or cut will also be a factor in addition to the friction of the cable.

Figure 4:
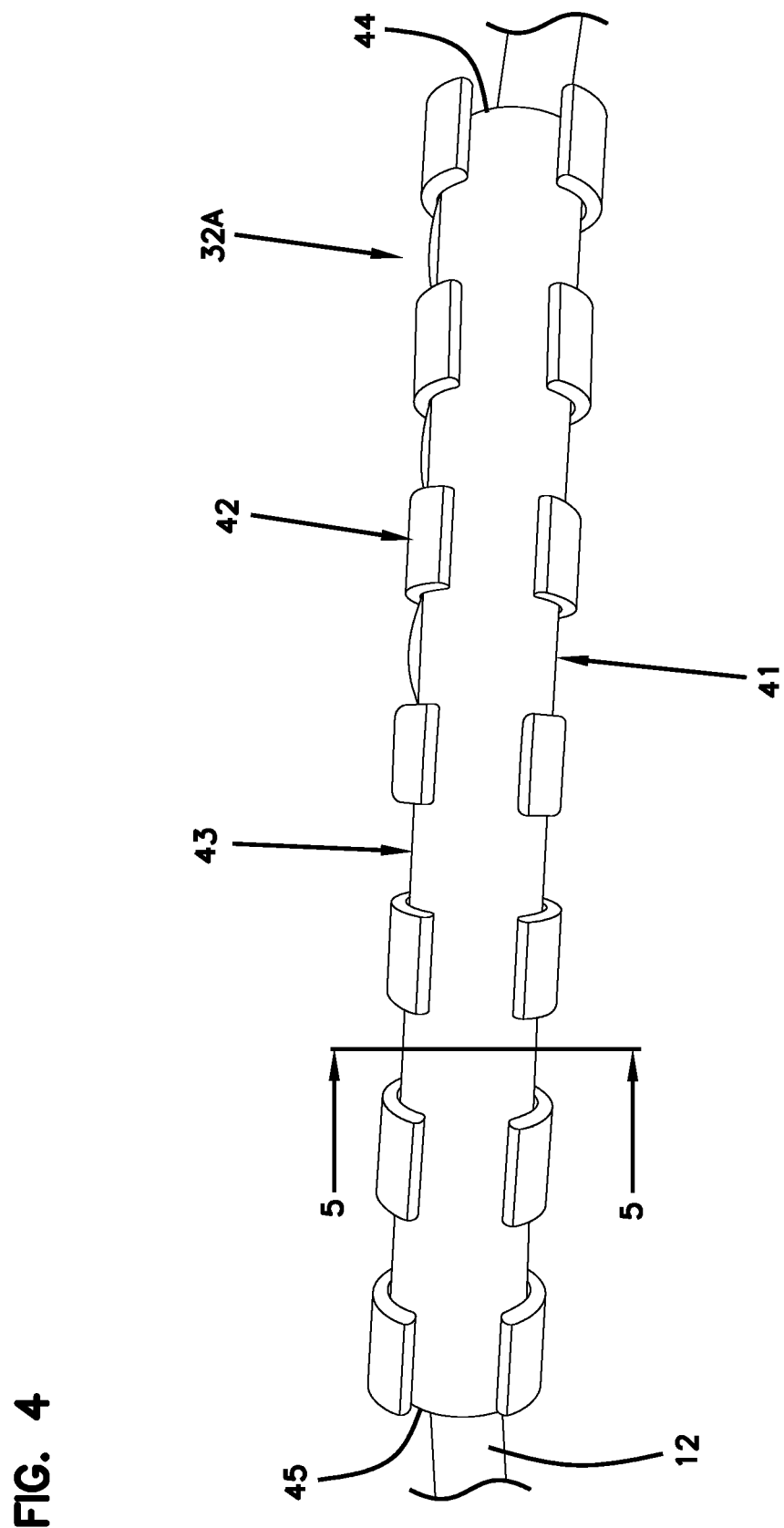
FIG. 4 shows the sheet of FIG. 3 wrapped around a cable and the clip of FIG. 3 holding the sheet in a roll.
Figure 5:
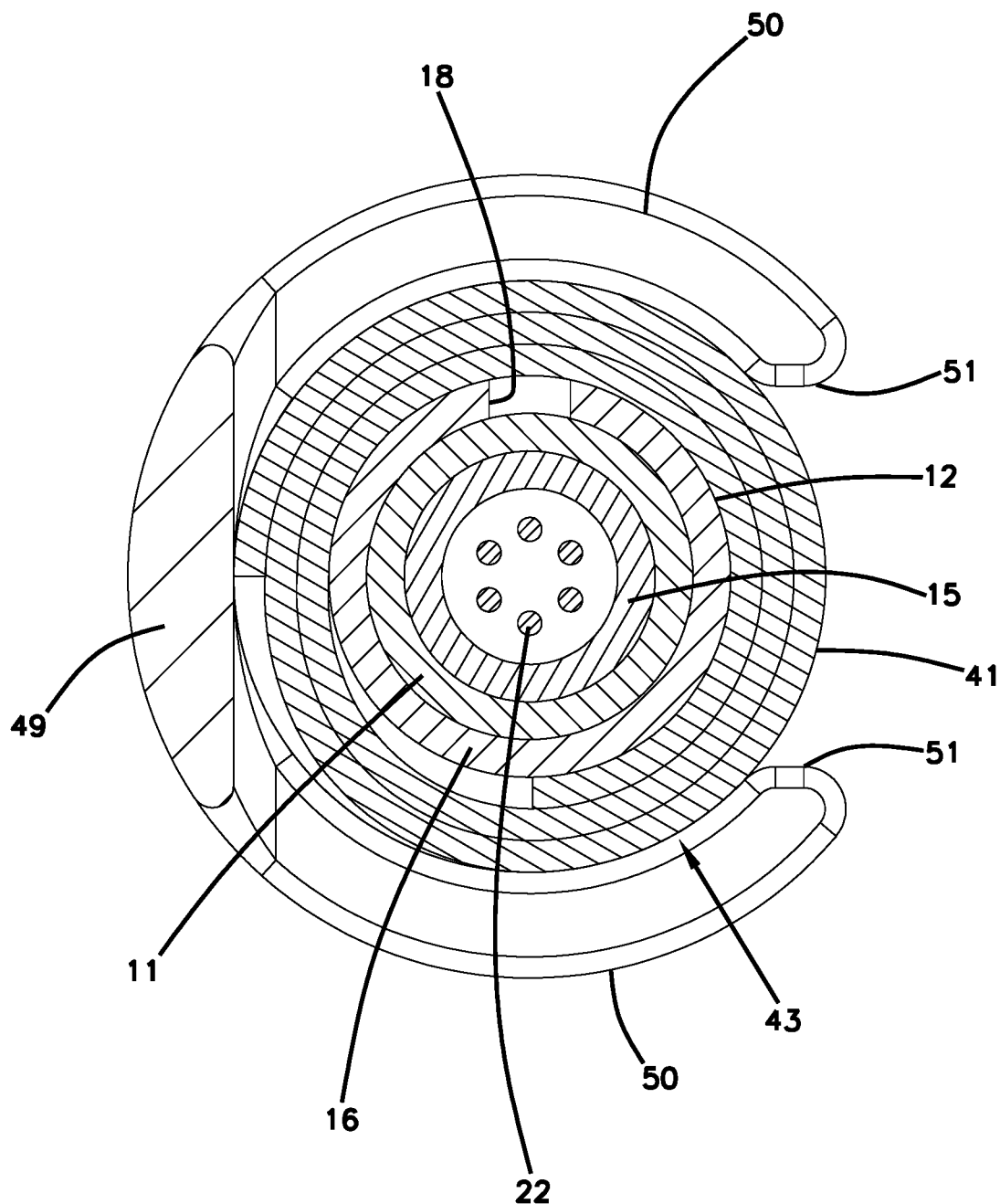
FIG. 5 is a cross-sectional view taken along the 5-5 line of FIG. 4.

FIGS. 3-5 illustrate a first example implementation 32A (FIG. 4) of the sealing arrangement 32. The sealing arrangement 32A includes a sheet 41 and a clip 42. The sheet 41 is wrapped around the telecommunications cable 12 at the first window 18 to form a layered roll 43. The roll 43 environmentally seal the cable 12 to inhibit ingress of water or other contaminants at the window 18. The clip 42 is positioned over the roll 43 to hold the roll 43 to the cable 12.

The sheet 41 has opposite facing first and second major sides 48 separated by a peripheral edge. The first and second major sides 48 extend along a length between first and second ends 44, 45 and along a width between first and second sides 46, 47. In certain examples, the length and width of the sheet 41 are both significantly larger than a thickness of the peripheral edge. In the example shown, the sheet 41 is generally rectangular. In other examples, however, the sheet 41 can be irregularly shaped, rhombus-shaped, parallelogram-shaped, oblong, or any other desired shape.

In some examples, the sheet 41 is formed of rubber. In other examples, the sheet is formed of a gel (e.g., a hydrocarbon gel, a silicone gel, etc.). In other examples, the sheet 41 can be formed of another environmentally sealing material.

The clip 42 includes a backbone 49 from which a plurality of flexible arms 50 extend to define a passage 52 extending along the backbone 49. Each arm 50 extends from the backbone 49 to a respective distal end 51. In certain examples, the arms 50 extend away from the backbone 49 in pairs. In certain examples, the distal ends 51 of each pair of arms 50 are separated by a gap providing lateral access to the passage 52. In certain examples, the arms 50 of each pair curve to form a C-shape. In certain examples, the clip 42 is formed from an elastomeric material. In other examples, the clip 42 is formed from a flexible plastic material. In other examples, the clip 42 is formed from metal.

In some examples, the sheet 41 is positioned so that the first side 46 is disposed at the cable 12 so that the sheet 41 extends across the first window 18 defined in the cable 12. The first end 44 of the sheet 41 is disposed a distance to one side of the window 18 and the second end 45 is disposed a distance to the opposite side of the window 18. The sheet 41 is then wrapped about the cable 12 to form the roll 43 until the second side 47 is layered at an exterior of the roll 43. In other examples, the cable 12 can be wrapped in the sheet 41 starting at an intermediate point between first and second sides 46, 47 so that both sides 46, 47 end up at the exterior of the roll 43.

The clip 42 is mounted over the layered roll 43 to hold the layered roll 43 to the telecommunications cable 12. For example, the clip 42 can be slid laterally over the roll 43 so that the roll 43 passes through the gap between the distal ends 51 of the arms 50. When the layered roll 43 is disposed within the passage 52 of the clip 42, the arms 50 wrap circumferentially around the layered roll 43 (see FIGS. 4 and 5).

Figure 6:
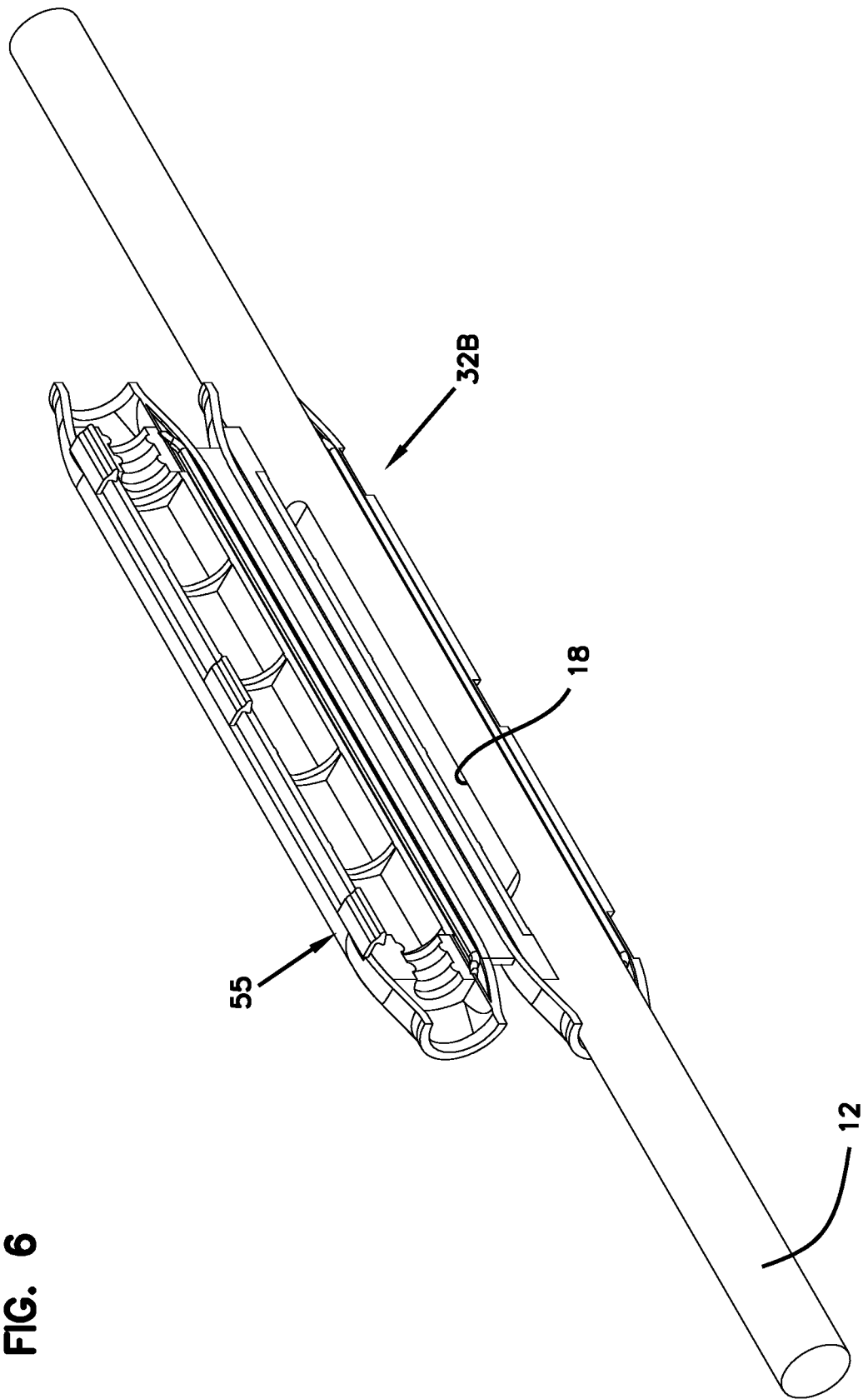
FIG. 6 illustrates an alternative sealing arrangement suitable for sealing a first window cut into the cable of FIG. 1.

FIG. 6 shows an alternative sealing arrangement 32B for the first window 18. The sealing arrangement 32B includes an enclosure 55 that fits over the cable 12 at the first window 18. The enclosure 55 defines a passage along which the cable 12 extends between opposite open ends. In certain examples, the enclosure 55 includes a clam-shell or other two-piece structure to mount around the cable 12. The enclosure 55 includes gaskets, gel, or other sealing material inside to seal against the cable 12.

Figure 7:
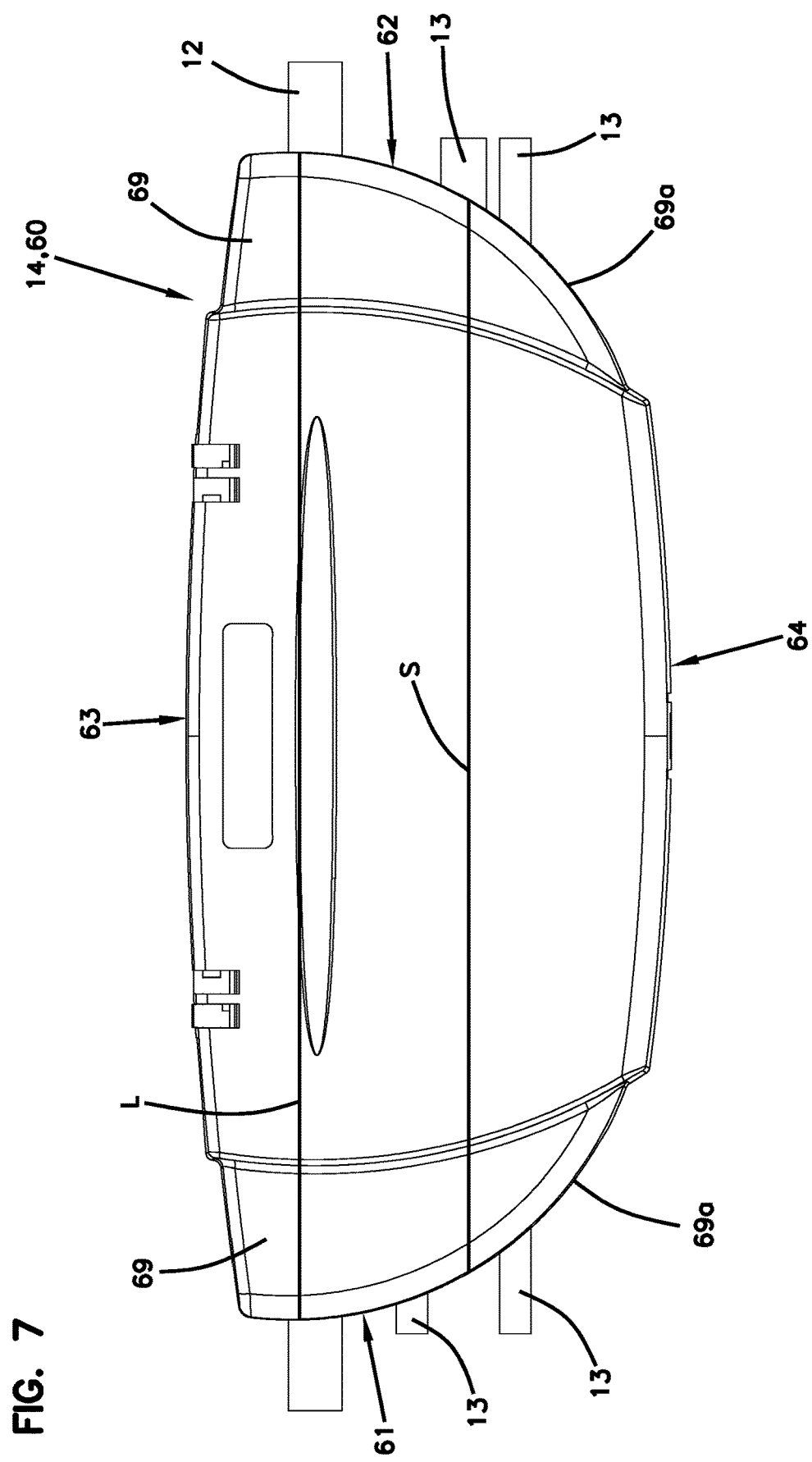
FIG. 7 is a front elevational view of an example enclosure suitable for sealing a second window cut into the distribution cable of FIG. 1, the enclosure including a base and a cover shown in the closed position.
Figure 8:
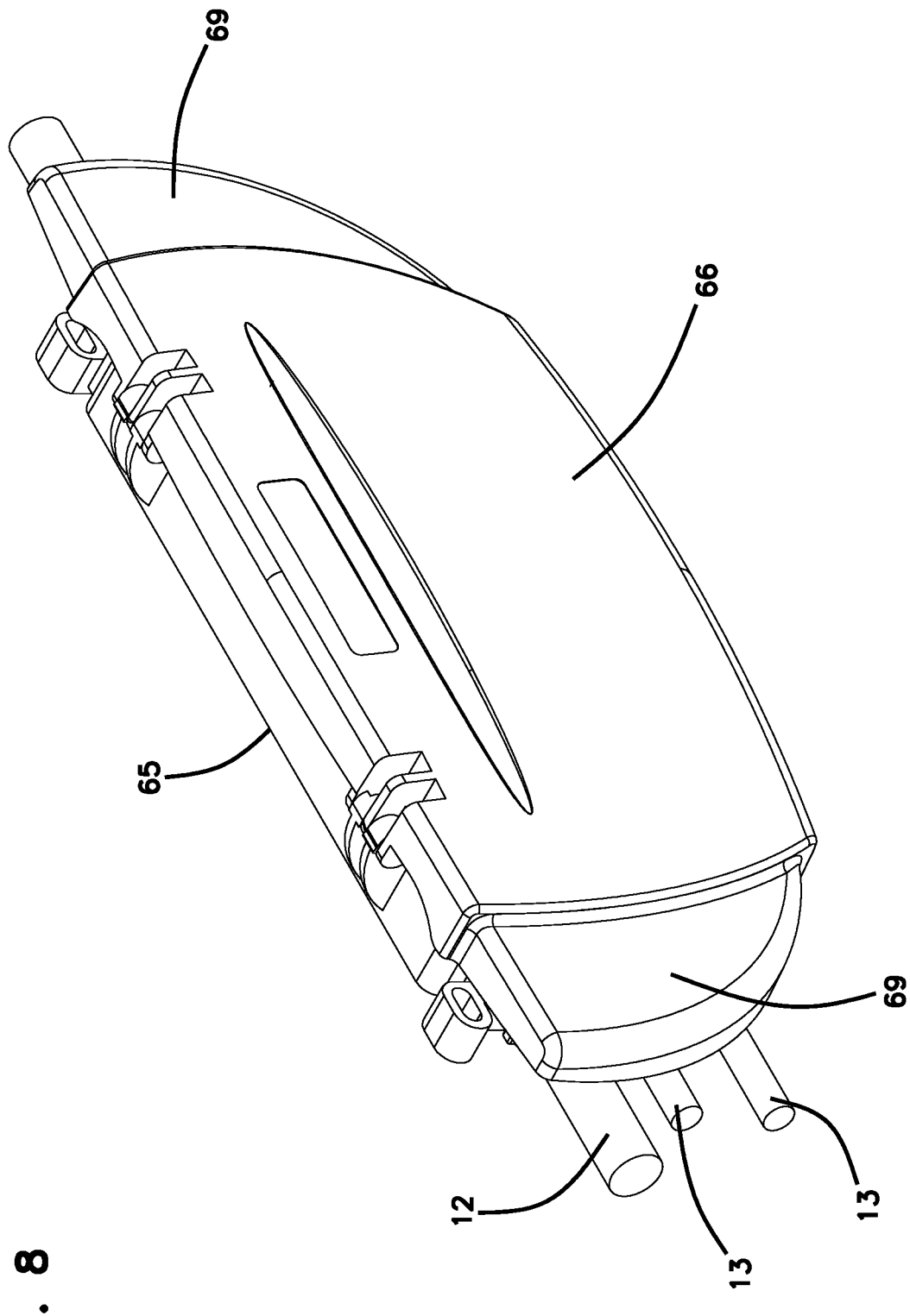
FIG. 8 is a front perspective view of the enclosure of FIG. 7.
Figure 9:
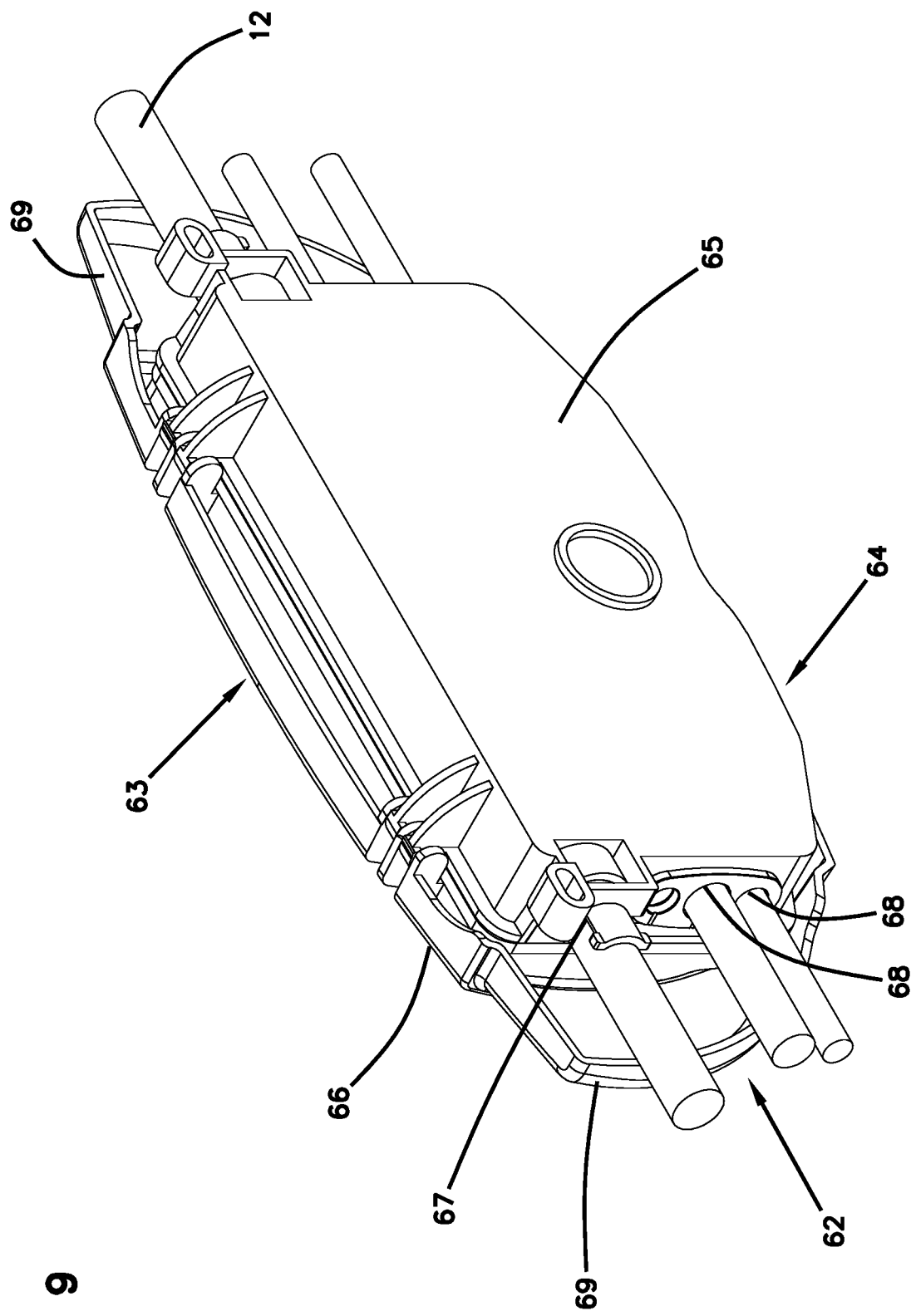
FIG. 9 is a rear perspective view of the enclosure of FIG. 7.

FIGS. 7-9 illustrate an example enclosure 60 suitable for use as an OTE 14 to seal over the second window 19. The enclosure 60 has opposite first and second ends 63, 64 extending between opposite first and second sides 61, 62. The first end 63 of the enclosure 60 is longer than the second end 64. The enclosure 60 includes a base 65 and a cover 66 that cooperate to define an interior. The cover 66 is pivotal relative to the base 65 between a closed position (FIGS. 7-9) and an open position (e.g., FIG. 16).

A first distribution cable port 67 is disposed at the first side 61 of the enclosure 60 and a second distribution cable port 67 disposed at the second side 62 of the enclosure 60. The second distribution cable port 67 is aligned with the first distribution cable port 67 so that the cable 12 can extend linearly through the enclosure 60.

A first drop cable port 68 is disposed at the first side 61 and a second drop cable port 68 is disposed at the second side 62. In some implementations, the drop cable ports 68 are smaller than the distribution cable ports 67. In other implementations, the drop cable ports 68 are the same size as the distribution cable ports 67. In certain implementations, each side 61, 62 also defines additional drop cable ports 68. In some examples, each side 61, 62 has a common number of drop cable ports 68. In other examples, however, the sides 61, 62 can have different numbers of drop cable ports 68.

In certain implementations, the distribution cable ports 67 are disposed closer to the first end 63 of the enclosure 60 than the drop cable ports 68. In some examples, the distribution cable ports 67 are disposed adjacent the first end 63 of the enclosure and the drop cable ports 68 are disposed at an intermediate location between the first and second ends 63, 64 of the enclosure 60. In certain examples, one or more of the drop cable ports 68 may be disposed at the second end 64 of the enclosure 60.

In certain implementations, first and second side walls of the enclosure 60 transition between the first end 63 and the second end 64 so that a longer portion L of the enclosure 60 aligns with the first and second distribution cable ports 67 and a shorter portion S of the enclosure 60 aligns with the first and second drop cable ports 68. In such implementations, the enclosure 60 may appear larger at the portion L from which the distribution cable 12 extends and the enclosure 60 may appear smaller at the portion S from which one or more of the drop cables 13 extend.

In some implementations, the base 65 and the cover 66 cooperate to define the longer portion L and the shorter portion S. In other implementations, however, the cover 66 defines at least the longer portion L, which overhangs the base 65. In certain implementations, the base 65 defines the distribution cable ports 67 and the longer portion L of the cover 66 overhangs the distribution cable ports 67. In certain examples, the base 65 also defines the drop cable ports 68. In certain implementations, the cover 66 also defines the shorter portion S, which also overhangs the drop cable ports 68 of the base 65. For example, as shown in FIG. 9, the cover 66 may include wings 69 that extend laterally outwardly past the cable ports 67, 68.

In the example enclosure 60 shown in FIGS. 7-9, the wings 69 extend laterally outwardly towards the first end 63 of the enclosure 60 and then contour downwardly and laterally inwardly towards the second end 64 of the enclosure 60. In the example shown, sides 69a of the wings 69 have a convex curvature. In other examples, however, the sides 69a may have a concave curvature.

Figure 10:
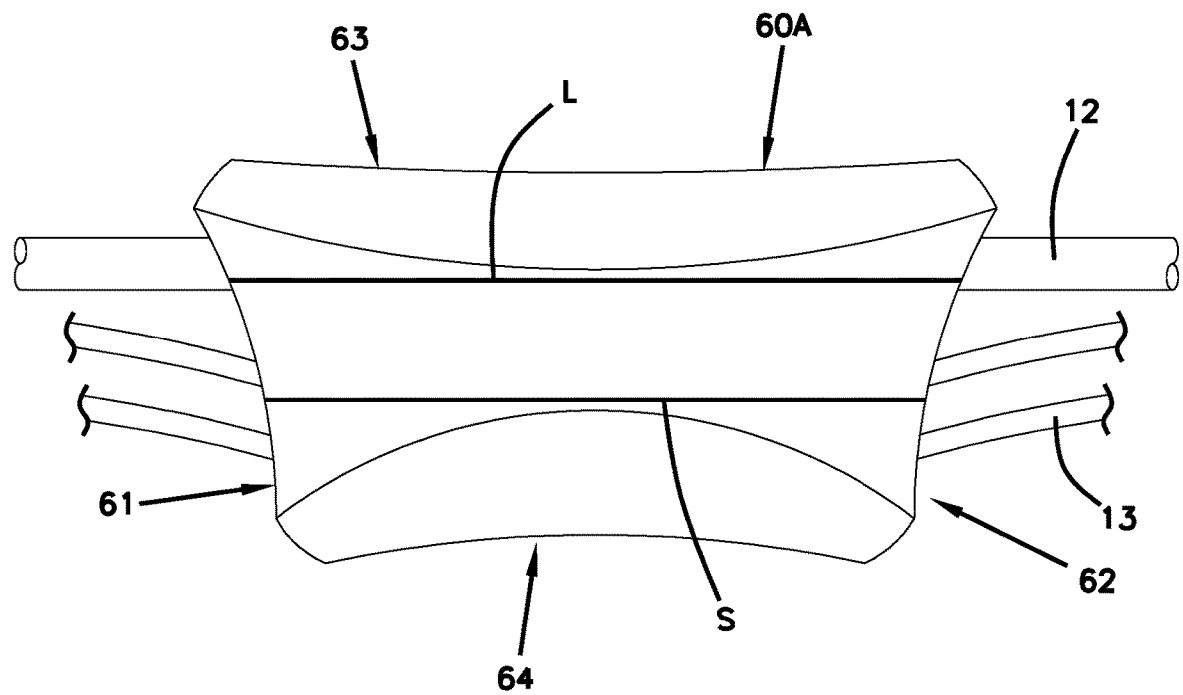
FIGS. 10-15 show footprints of alternative enclosure designs suitable for sealing the second window cut into the distribution cable of FIG. 1.

FIGS. 10-15 illustrate alternative example enclosures 60A-60F suitable for use in sealing the second window 19 cut into the distribution cable 12. In FIG. 10, the enclosure 60A has a longer portion L closer to the first end 63 and a shorter portion S closer to the second end 64. Sides of the enclosure 60A have a concave curvature transitioning between the longer portion L and the shorter portion S. In certain examples, the sides generally have a concave curvature transitioning between the first and second ends 63, 67.

Figure 11:
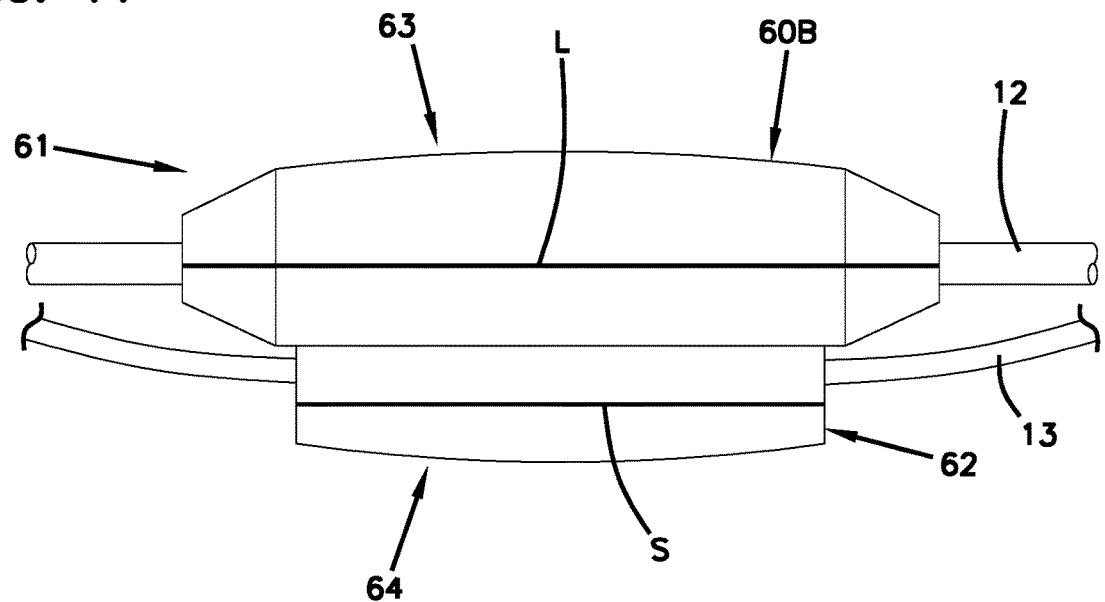

The enclosure 60B of FIG. 11 also has a longer portion L aligned with the distribution cable ports 67 and a shorter portion S aligned with the drop cable ports 68. In the example shown, the shorter portion S is stepped inwardly from the longer portion L. In certain examples, the longer portion L also can define a taper towards the shorter portion S.

Figure 12:
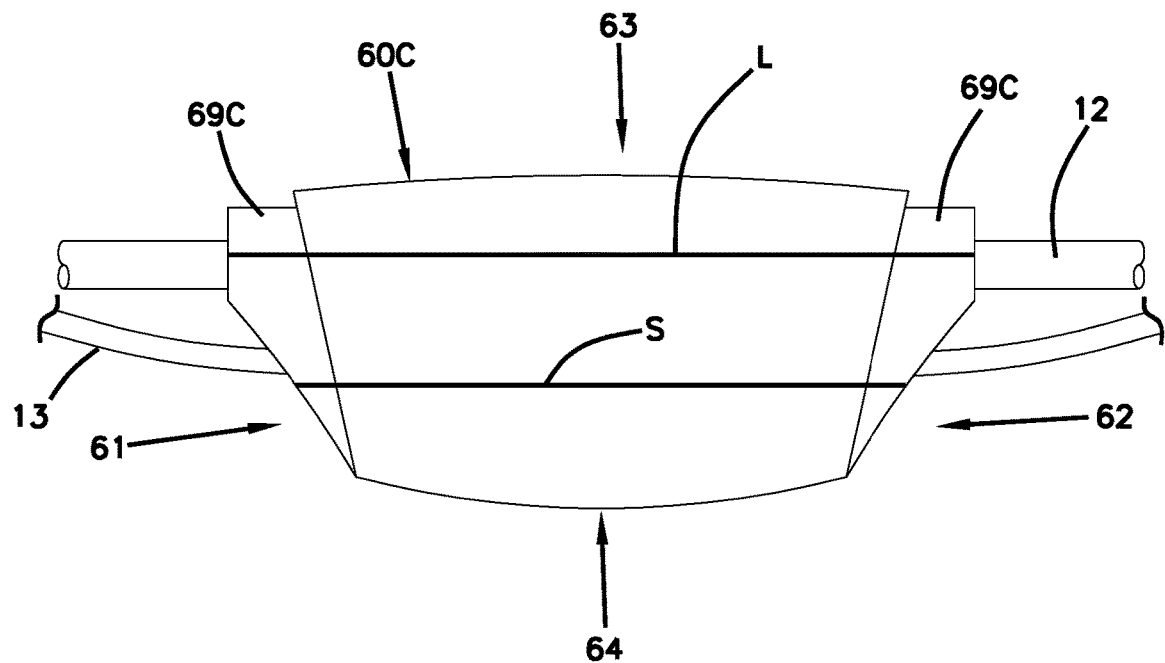

The enclosure 60C of FIG. 12 also has a longer portion L aligned with the distribution cable ports 67 and a shorter portion S aligned with the drop cable ports 68. In certain examples, the enclosure 60C includes wings 69c that extend outwardly beyond the cable ports 67, 68. In certain examples, sides of the wings 69c taper inwardly as the wings 69c extend from the longer portion L towards the second end 64 of the enclosure 60C. In certain examples, the sides of the wings 69c at the longer portion L that aligns with the distribution cable ports 67 extend straight down until the wings 69c start to taper inwardly.

Figure 13:
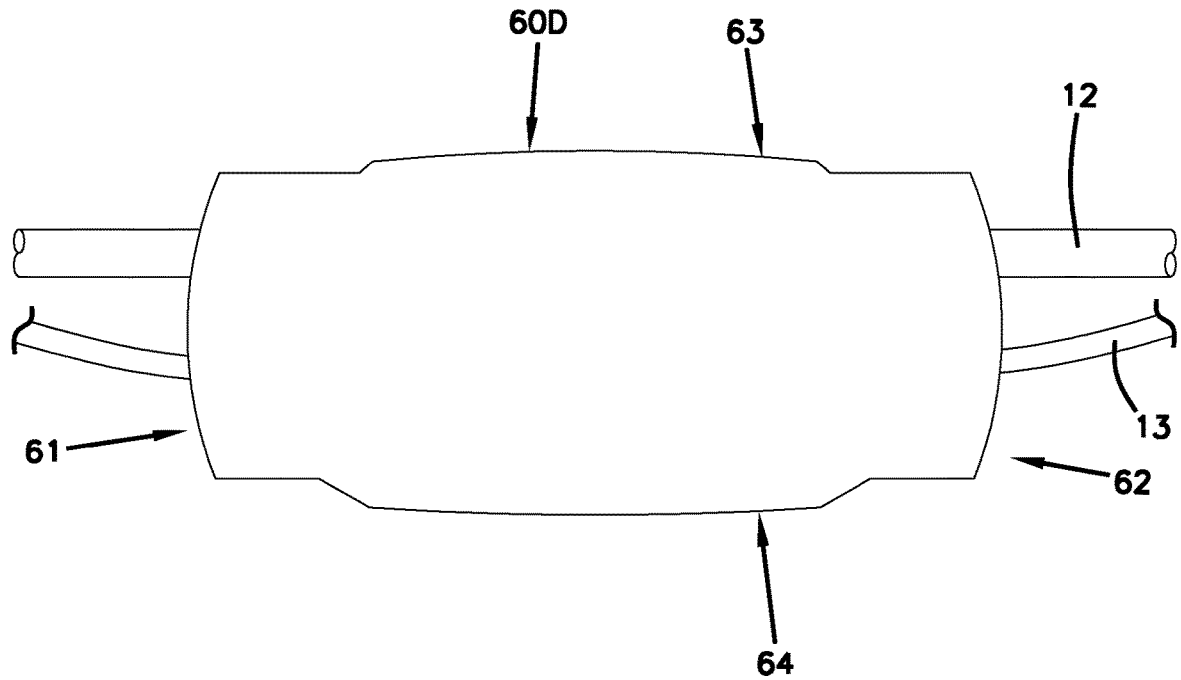

The enclosure 60D of FIG. 13 has sides 61, 62 that define a convex curvature between the first and second ends 63, 64 of the enclosure 60D. The first and second ends 63, 64 of enclosure 60D appear to have generally the same length.

Figure 14:
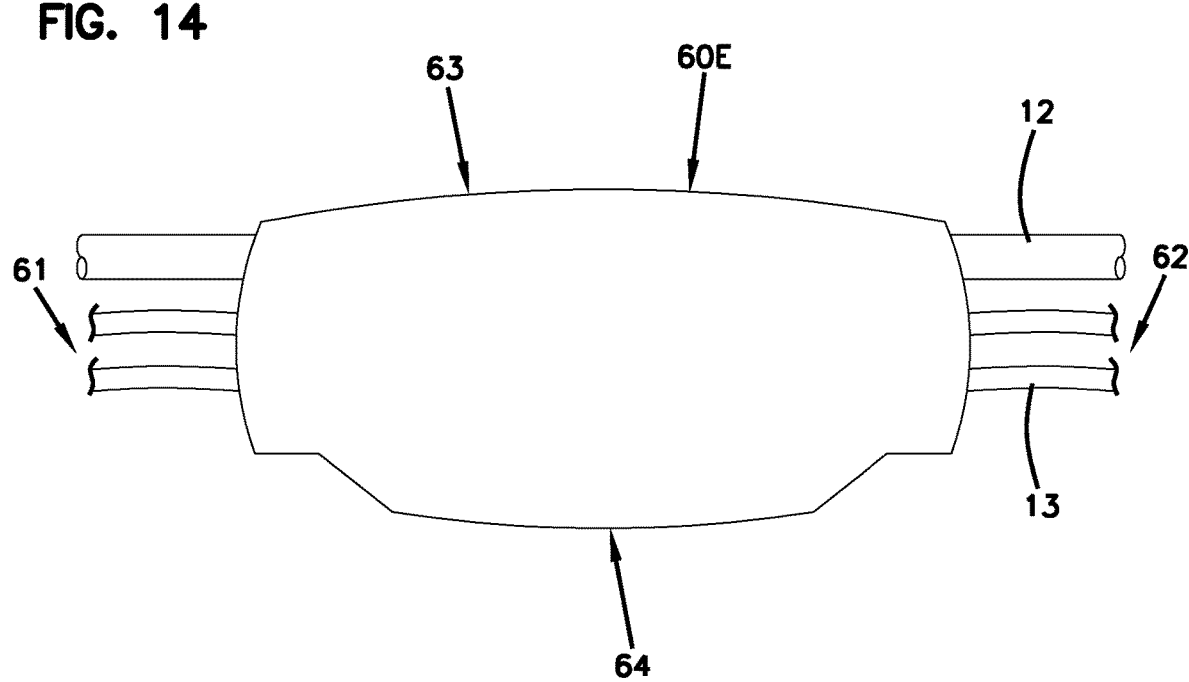

The enclosure 60E of FIG. 14 has a first end 63 that is longer than the second end 64. The sides 61, 62 of the enclosure 60E define a convex curvature extending away from the first end 63 of the enclosure 60E. The sides 61, 62 then step inwardly at a point towards the second end 64 of the enclosure 60E. The sides 61, 62 then taper inwardly from the point to the second end 64.

Figure 15:
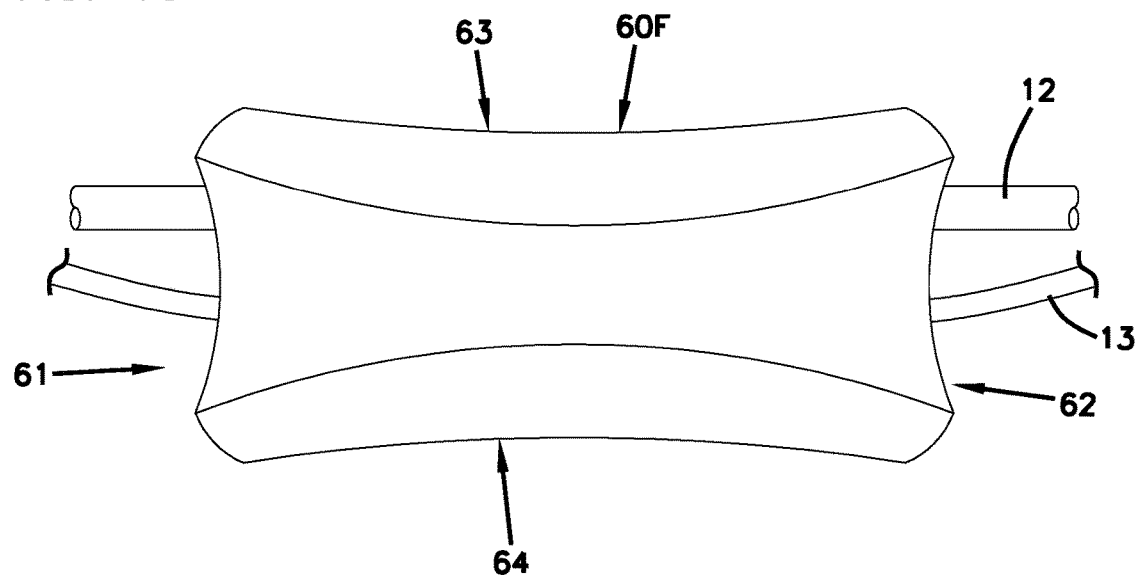

The enclosure 60F of FIG. 15 has first and second ends 63, 64 that are generally the same length. Sides 61, 62 of the enclosure 60F have a generally concave curvature between the first and second ends 63, 64. Accordingly, the enclosure 60F has a waisted shape.

FIGS. 16-26 illustrate various management arrangements suitable for managing the cut optical fibers within any of the various enclosures 60, 60A-60F described herein. For convenience, the management arrangements are shown disposed in the enclosure 60. It will be understood, however, that any of the management arrangements can be utilized with any of the other enclosures 60A-60F described herein.

Figure 16:
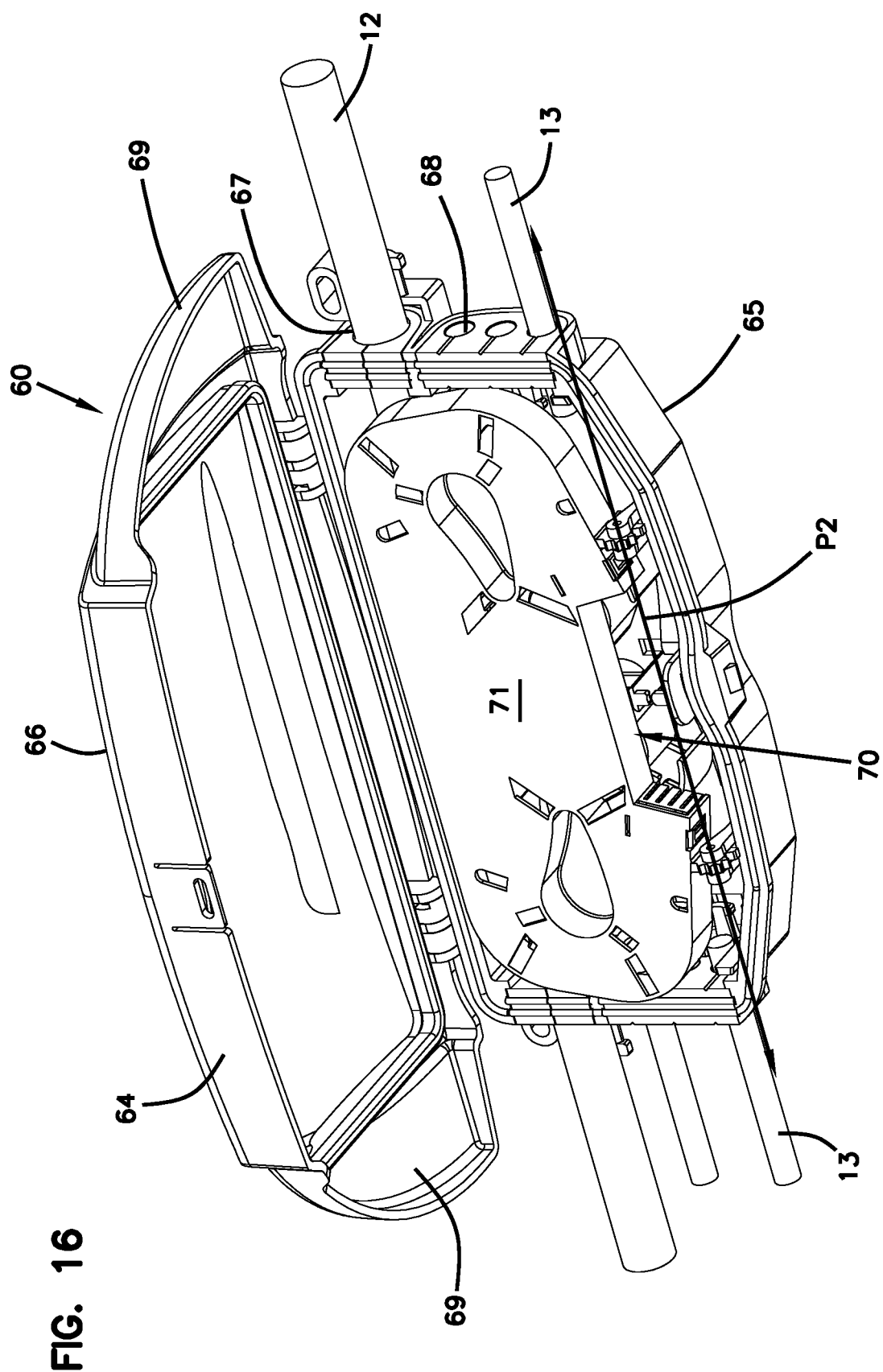
FIG. 16 is a front perspective view of the enclosure of FIG. 7 with the cover shown in the open position so the splice tray of a first management arrangement is visible in the storage position.
Figure 17:
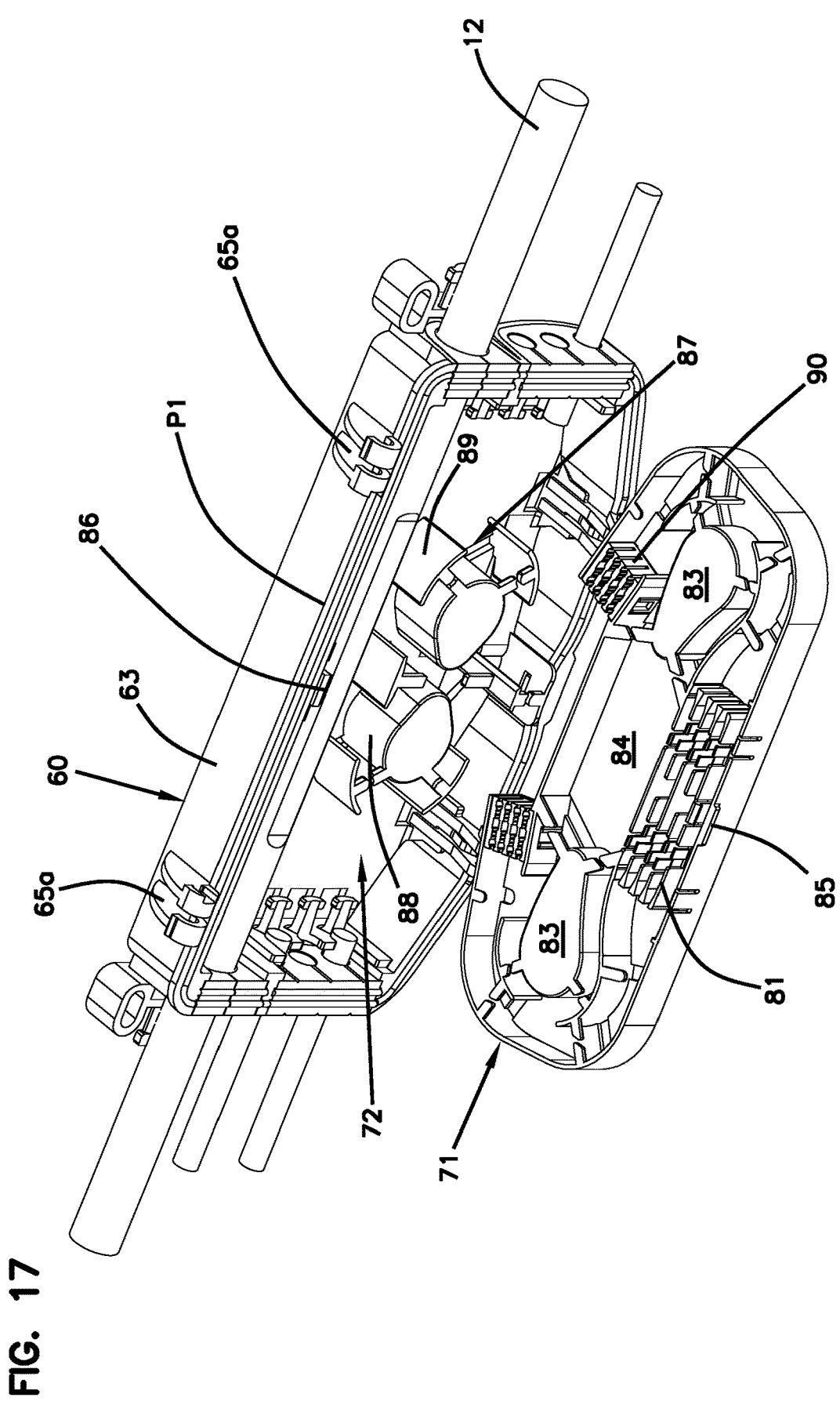
FIG. 17 is a front perspective view of the enclosure of FIG. 16 with the splice tray shown in the access position and the cover of the enclosure removed for ease in viewing.
Figure 18:
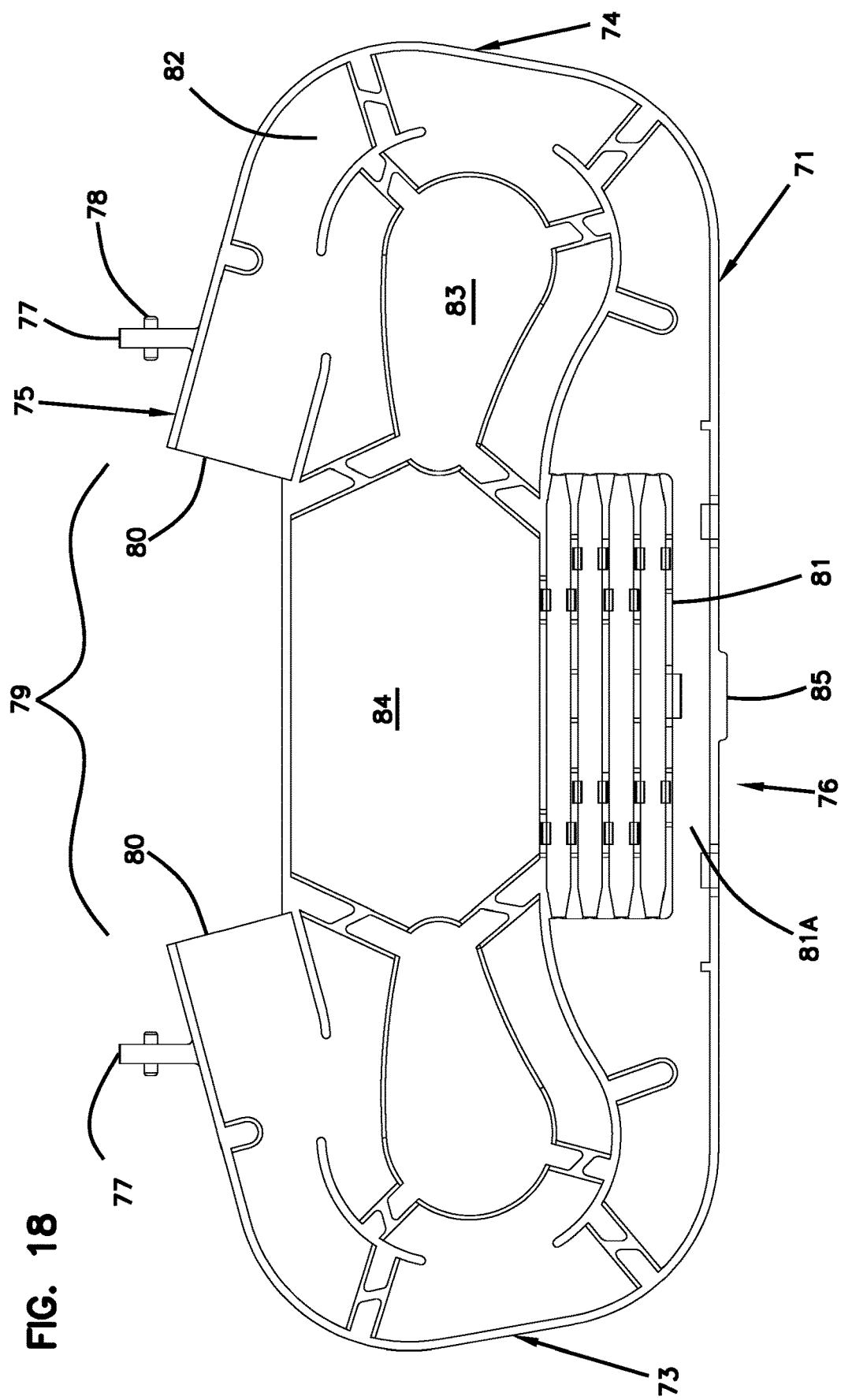
FIG. 18 is a top plan view of the splice tray of FIG. 17.
Figure 19:
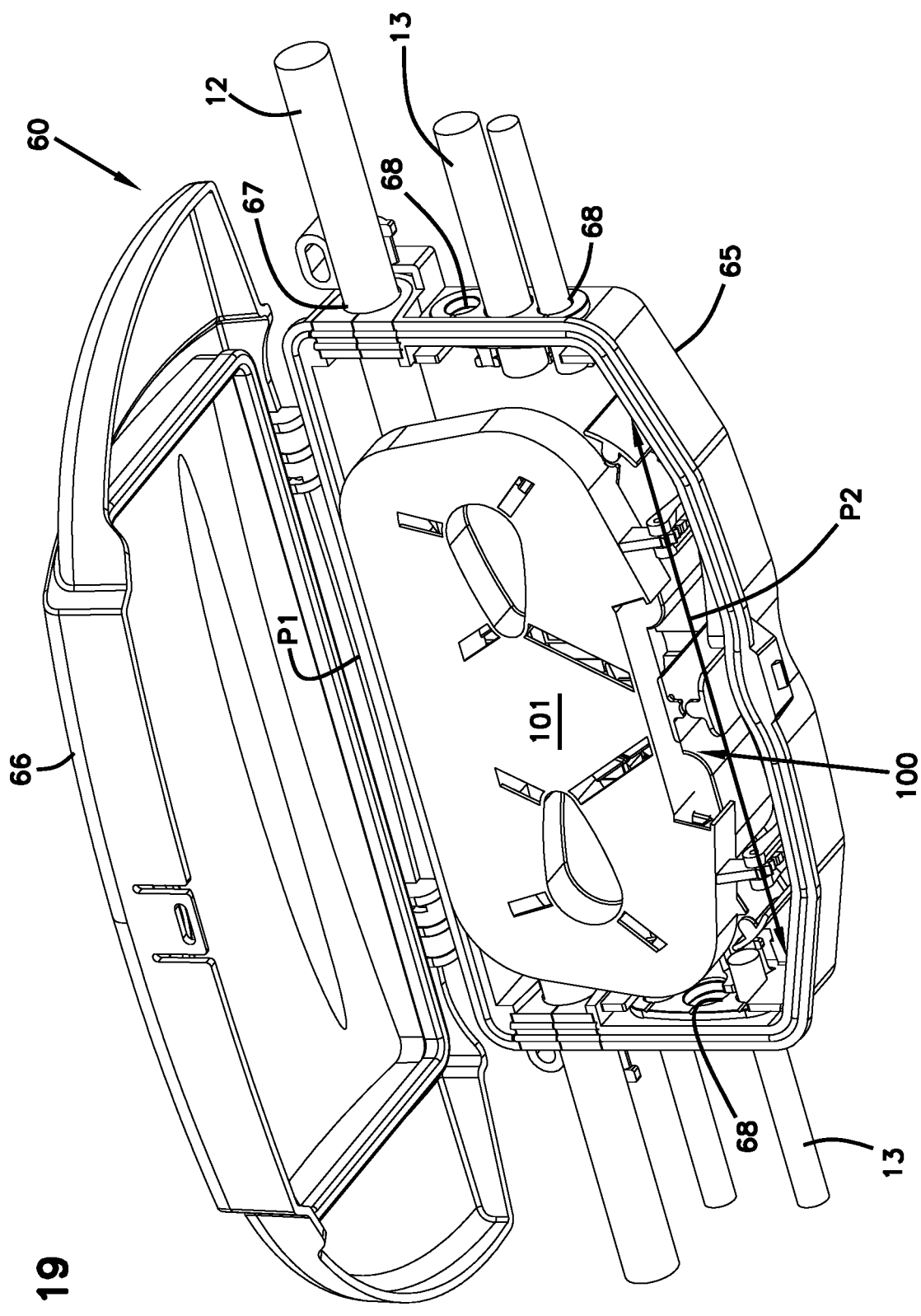
FIG. 19 is a front perspective view of the enclosure of FIG. 7 with the cover shown in the open position so the splice tray of a second management arrangement is visible in the storage position.
Figure 20:
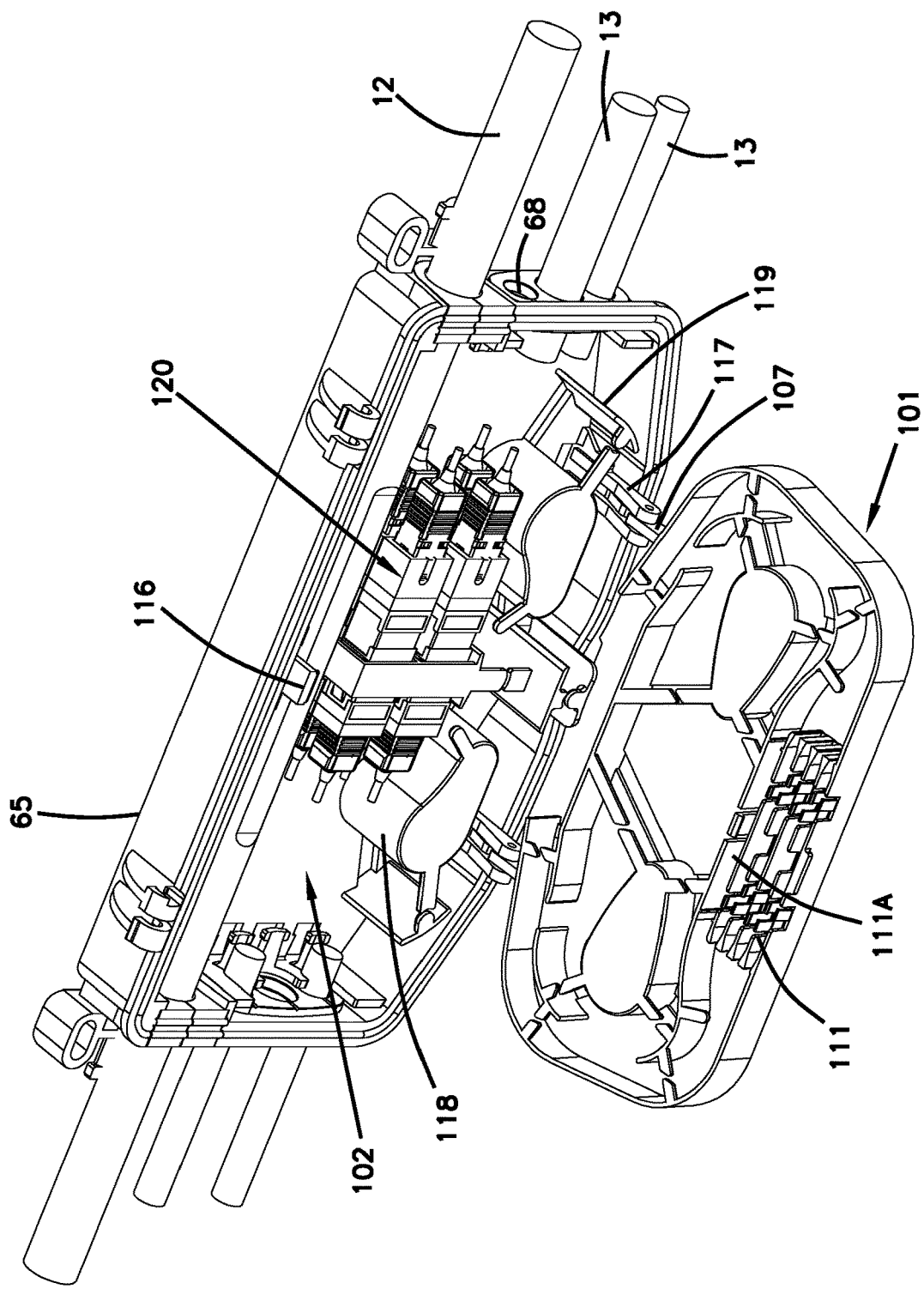
FIG. 20 is a front perspective view of the enclosure of FIG. 19 with the splice tray shown in the access position and the cover of the enclosure removed for ease in viewing.
Figure 21:
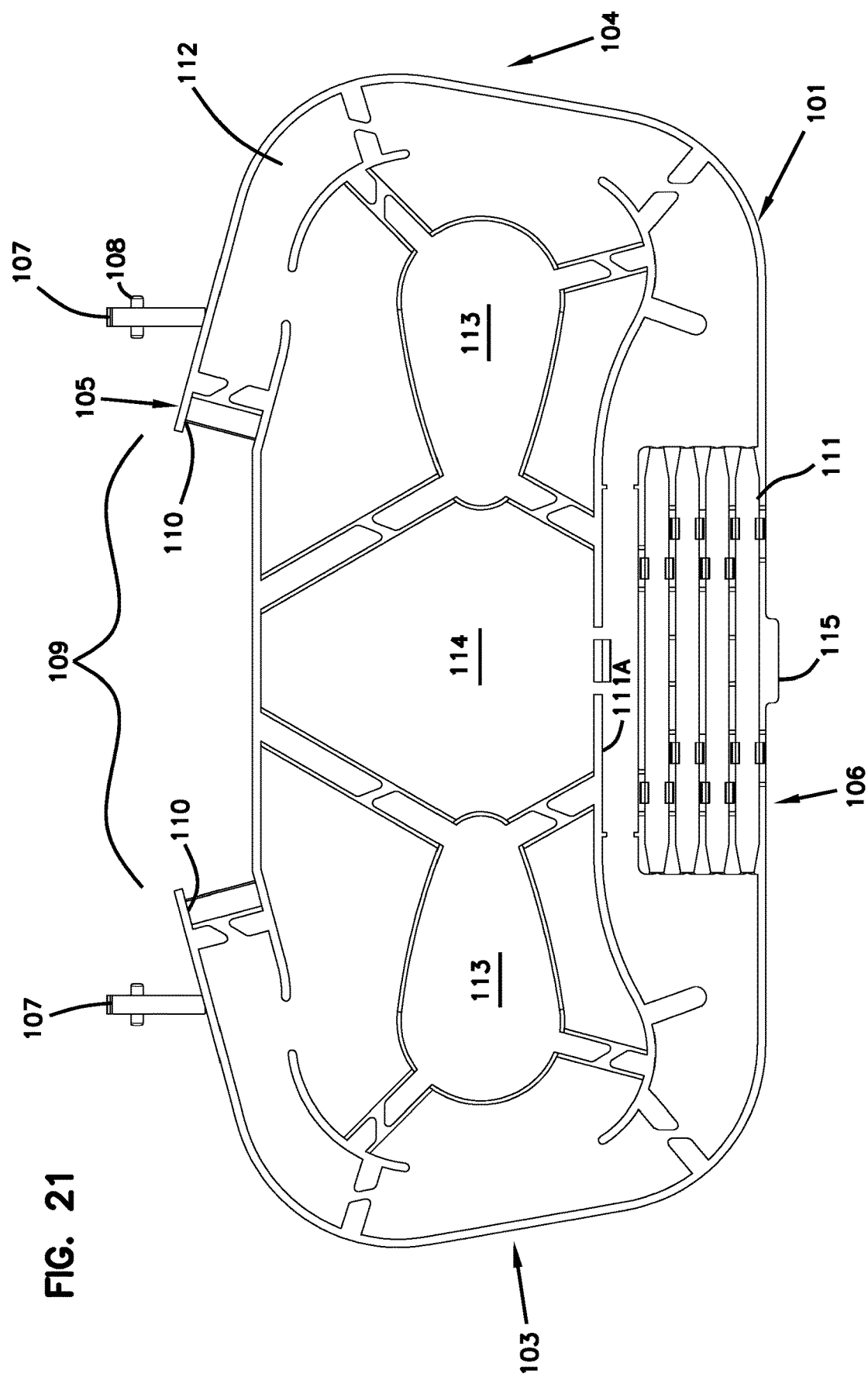
FIG. 21 is a top plan view of the splice tray of FIG. 20.
Figure 22:
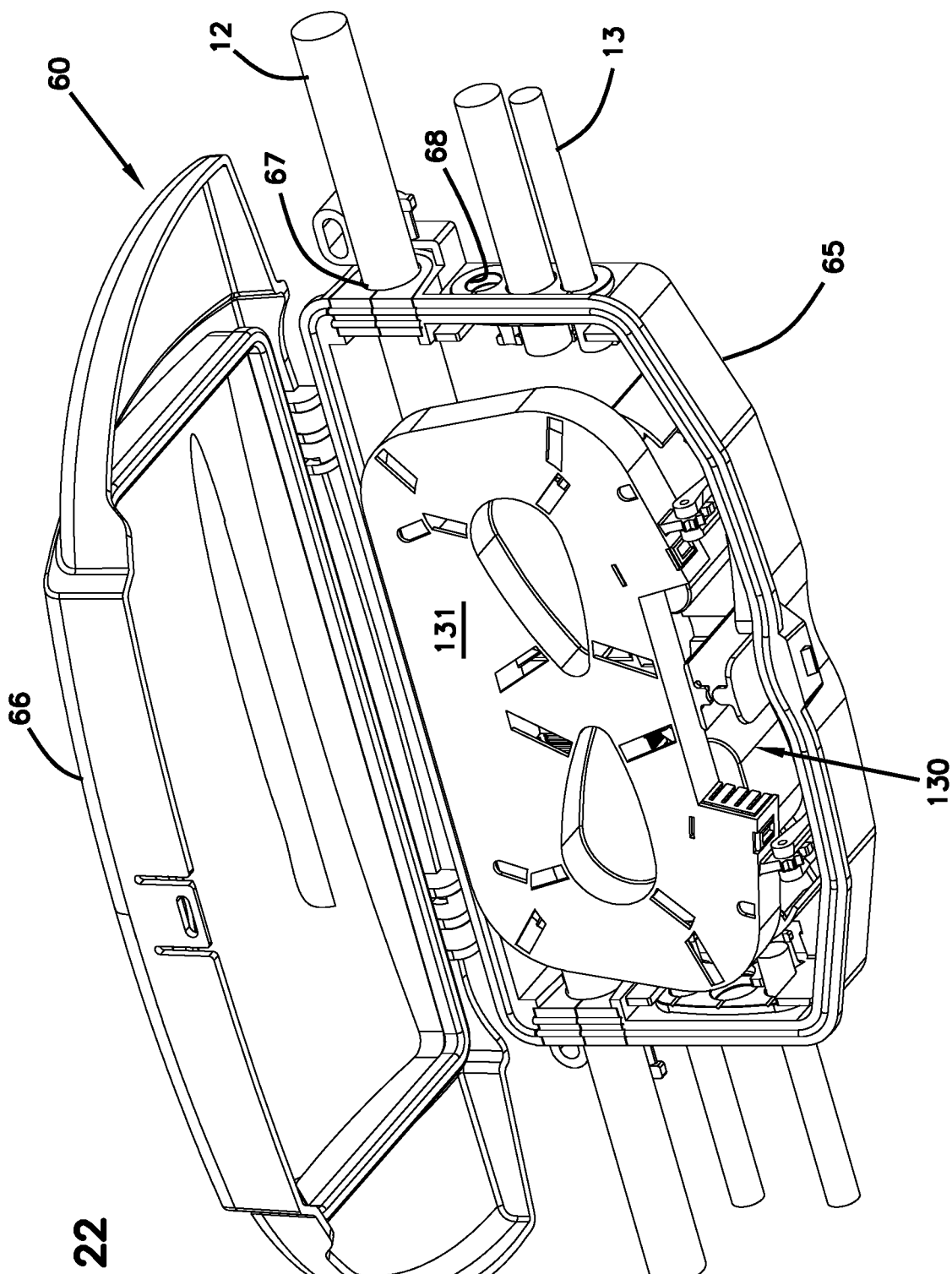
FIG. 22 is a front perspective view of the enclosure of FIG. 7 with the cover shown in the open position so the splice tray of a third management arrangement is visible in the storage position.
Figure 23:
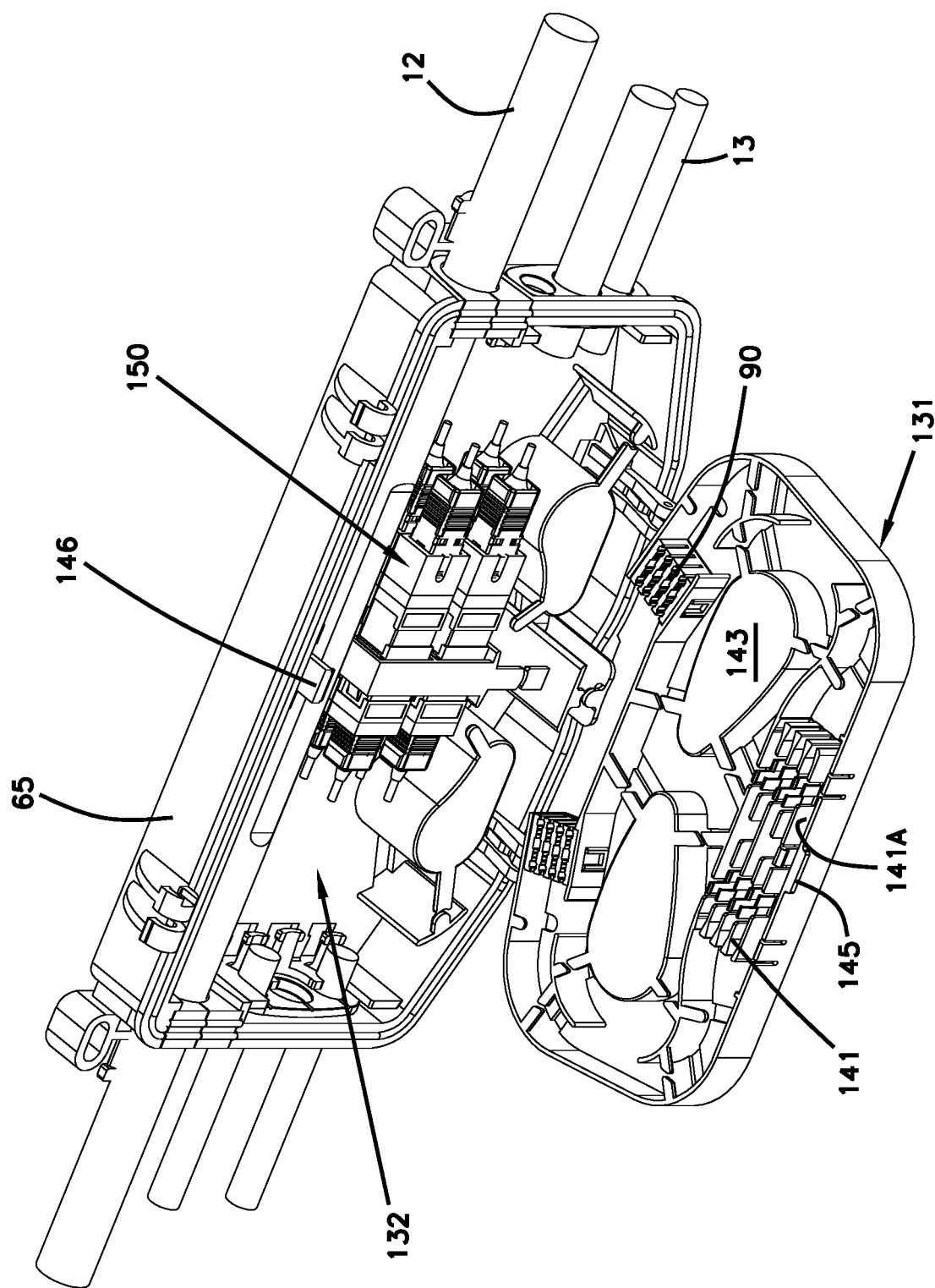
FIG. 23 is a front perspective view of the enclosure of FIG. 22 with the splice tray shown in the access position and the cover of the enclosure removed for ease in viewing.
Figure 24:
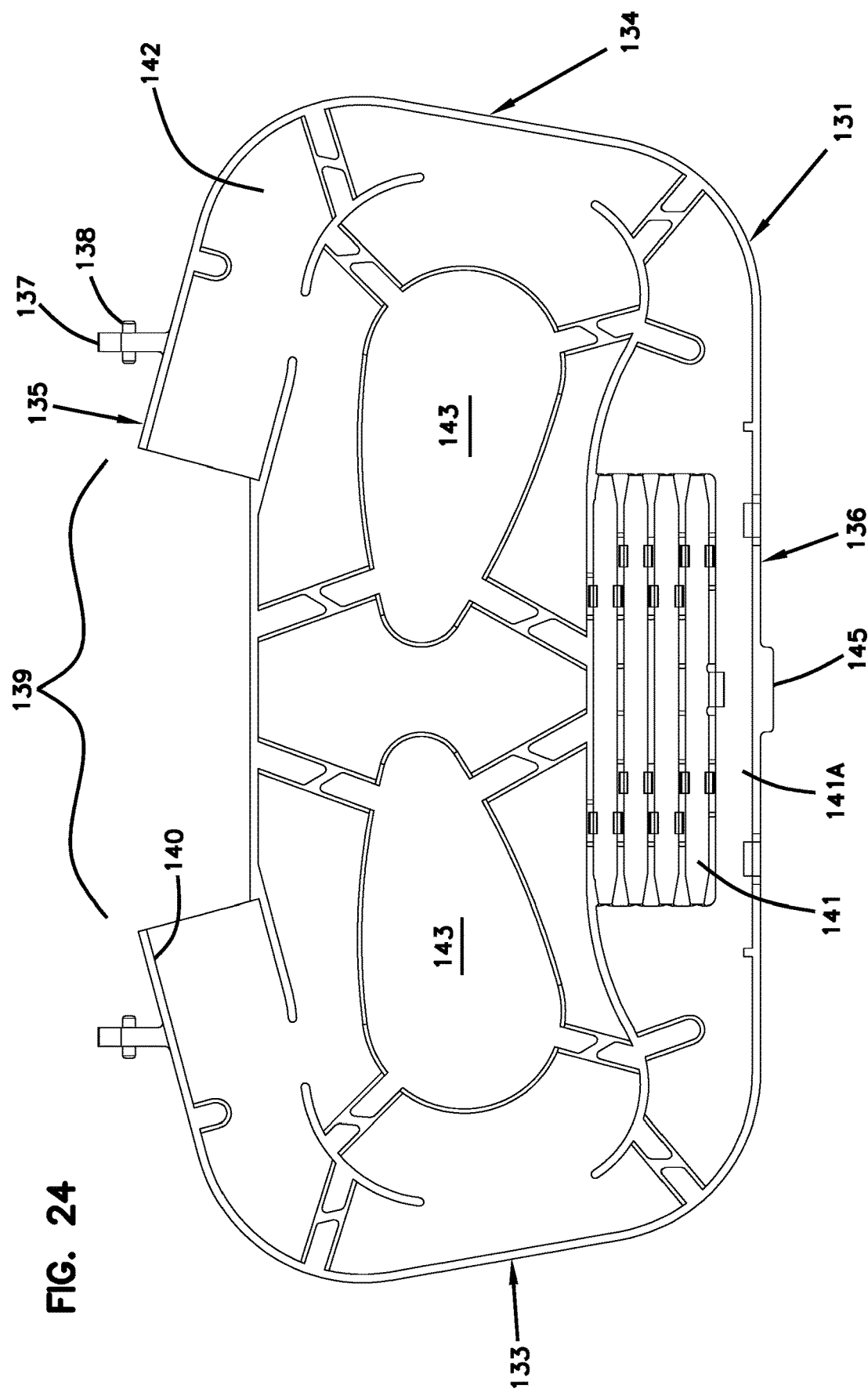
FIG. 24 is a top plan view of the splice tray of FIG. 23.
Figure 25:
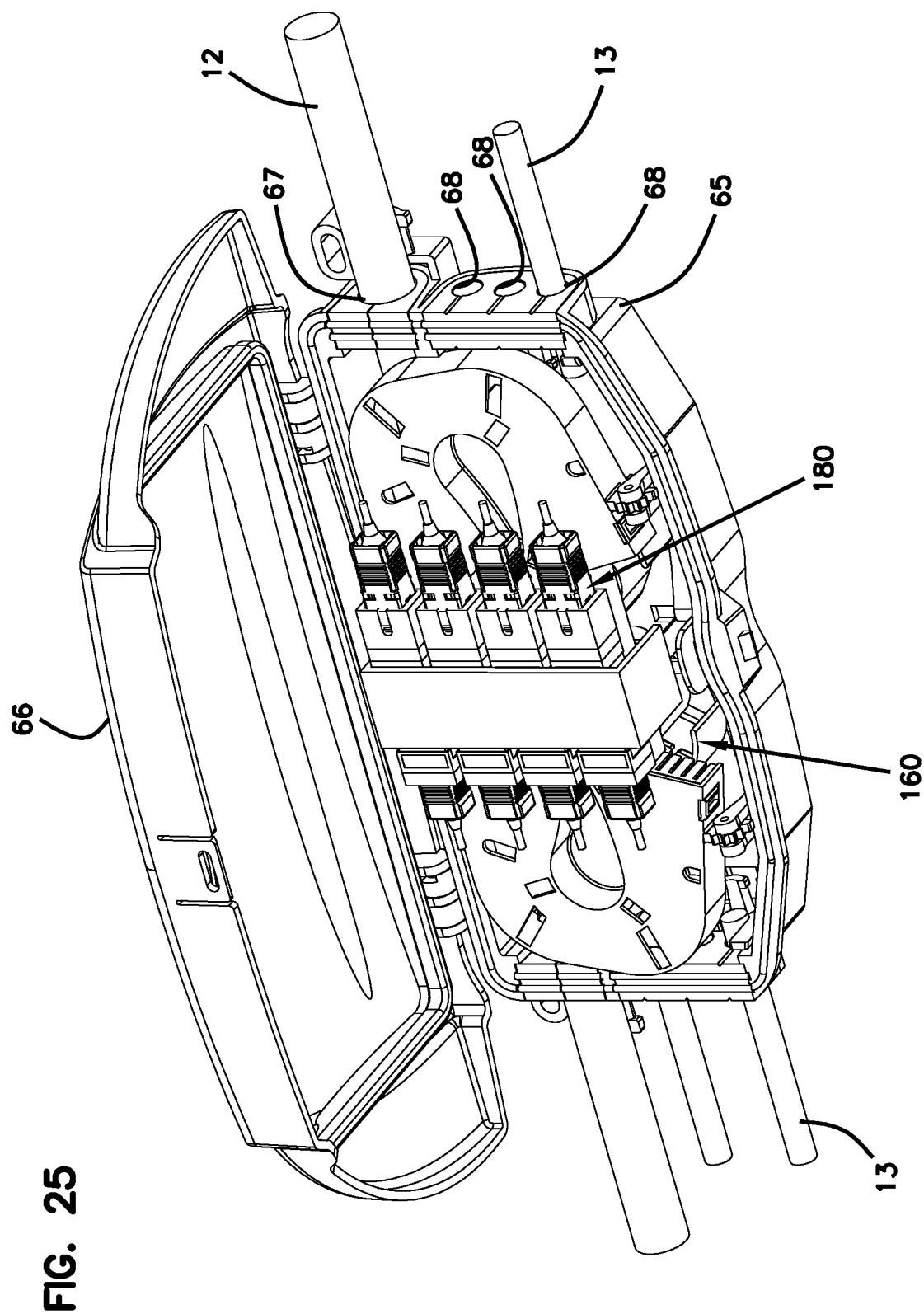
FIG. 25 is a front perspective view of the enclosure of FIG. 7 with the cover shown in the open position so the splice tray of a fourth management arrangement is visible in the storage position.
Figure 26:
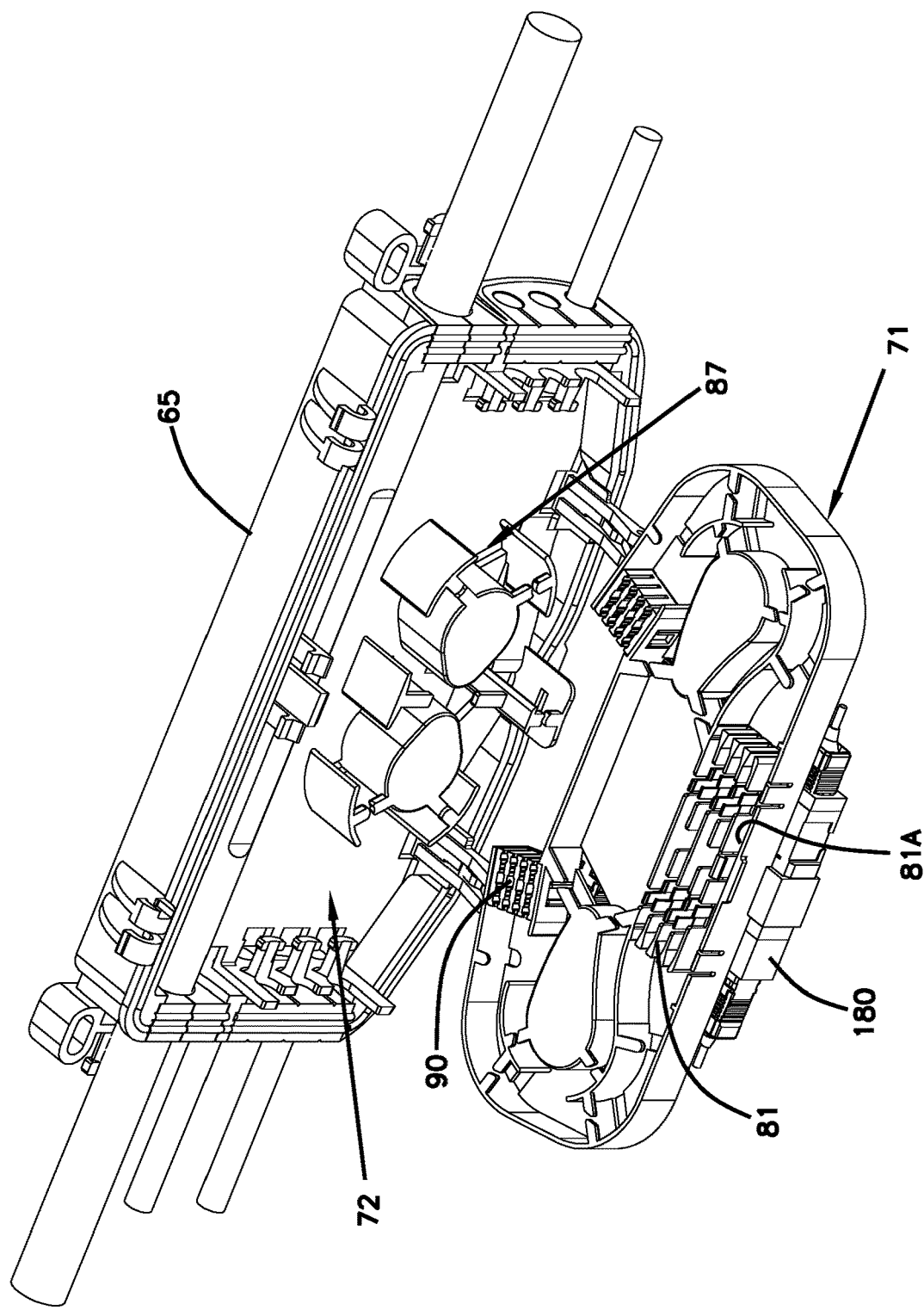
FIG. 26 is a front perspective view of the enclosure of FIG. 25 with the splice tray shown in the access position and the cover of the enclosure removed for ease in viewing.
Figure 27:
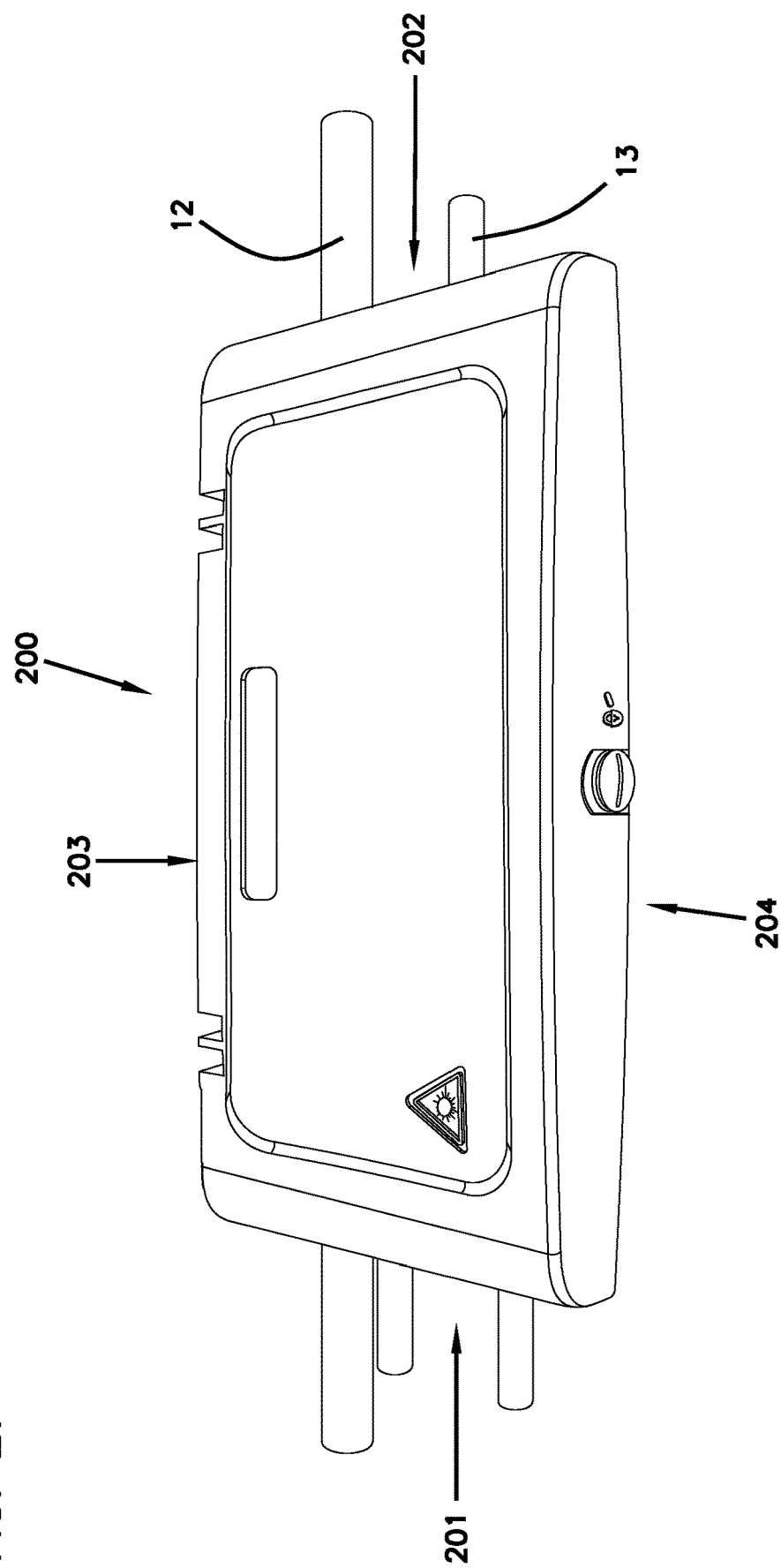
FIG. 27 is a perspective view of another example enclosure suitable for sealing a second window cut into the distribution cable of FIG. 1, the enclosure including a base and a cover shown in the closed position.

FIGS. 16-18 illustrate a first implementation of a management arrangement 70 including a splice tray 71 that facilitates splicing the cut optical fibers of distribution cable 12 to fibers of drop cables 13. FIGS. 19-21 illustrate a second implementation of a management arrangement 100 including a splice tray 101 that facilitates splicing and/or connecting the cut optical fibers of distribution cable 12 to fibers of drop cables 13. FIGS. 22-24 illustrate a third implementation of a management arrangement 130 including a splice tray 131 that facilitates splicing and/or connecting the cut optical fibers of distribution cable 12 to fibers of drop cables 13. FIGS. 25-26 illustrate a fourth implementation of a management arrangement 160 including the splice tray 71 that facilitates splicing and/or connecting the cut optical fibers of distribution cable 12 to fibers of drop cables 13. In an example, the splice tray 71 of management arrangement 160 is generally the same as the splice tray 71 of management arrangement 70, except that optical adapters 180 are mounted to the splice tray 71 of management arrangement 160 as will be discussed in more detail herein.

Referring to FIGS. 16-26 in general, the cover 66 of the enclosure 60 is mounted to the base 65 so that the cover 66 pivots relative to the base 65 between a closed position (FIGS. 7-9) and an open position (e.g., FIGS. 16-17). The cover 66 blocks access to the interior of the enclosure 60 when disposed in the closed position. The cover 66 allows access to the interior when disposed in the open position. The cover 66 pivots relative to the base 65 about a first pivot axis P1 that is disposed at the first end 63 of the base 65. For example, hinge members on the cover 66 cooperate with hinge members 65a disposed at the first end 63 of the base 65 to mount the cover 66 to the base 65.

In some examples, the cover 66 extends at a generally 90° angle relative to the base 65 when in the open position. In other examples, the cover 66 extends at a generally 180° angle relative to the base 65 when in the open position. In still other examples, the cover 66 can extend at any desired angle (e.g., 100°, 105°, 110°, 120°, 130°, etc.) relative to the base 65 when in the open position.

The base 65 and cover 66 cooperate to define a cable storage region 72, 102, 132 disposed within the interior of the enclosure 60. A splice tray 71, 101, 131 mounts to the base 65 to selectively cover the cable storage region 72, 102, 132.

The splice tray 71, 101, 131 extends between opposite first and second sides 73, 74, 103, 104, 133, 134 and between opposite first and second ends 75, 76, 105, 106, 135, 136. The splice tray 71, 101, 131 is pivotal relative to the base 65 along a second pivot axis P2 (FIG. 16) to move between a storage position (FIG. 16) and an access position (FIG. 17). The second pivot axis P2 is disposed at the second end 64 of the base 65 and at the first end 75, 105, 135 of the splice tray 71, 101, 131. In certain examples, the second pivot axis P2 extends between hinge pins 78, 108, 138 of two spaced-apart hinge members 77, 107, 137 extending from the first end 75, 105, 135 of the splice tray 71, 101, 131. The hinge pins 78, 108, 138 snap into or otherwise couple to hinge members 117 (FIG. 20) disposed within the base 65 at the second end 64 of the base 65.

In some examples, the splice tray 71, 101, 131 extends at a generally 90° angle relative to the base 65 when in the access position. In other examples, the splice tray 71, 101, 131 extends at a generally 180° angle relative to the base 65 when in the access position. In still other examples, the splice tray 71, 101, 131 can extend at any desired angle (e.g., 100°, 105°, 110°, 120°, 130°, etc.) relative to the base 65 when in the access position. In an example, the splice tray 71, 101, 131 is held at an angle of 105° relative to the base to provide a work surface on which a technician can splice or otherwise work with the cut fibers within the enclosure 60.

The splice tray 71, 101, 131 includes a first closure member 85, 115, 145 (e.g., a tab) that fits with a second closure member 86, 116, 146 (e.g., a latch) to hold the splice tray 71, 101, 131 in the storage position (see FIG. 17). The second closure member 86, 116, 146 is disposed at the base 65. In certain examples, the second closure member 86, 116, 146 is disposed within the base 65 at the first end 63. In certain examples, the splice tray 71, 101, 131 is moved from the storage position to the access position by disengaging the second closure member 86, 116, 146 from the first closure member 85, 115, 145.

The splice tray 71, 101, 131 has a fiber input region 79, 109, 139 disposed at the first end 75, 105, 135 and a splice region 81, 111, 141 disposed at the second end 76, 106, 136. In certain implementations, the fiber input region 79, 109, 139 is disposed between the two spaced-apart hinge members 77, 107, 137. Accordingly, the fibers are routed onto the tray 71, 101, 131 at a central region of the first end 75, 105, 135 of the tray 71, 101, 131.

The splice tray 71, 101, 131 defines a first fiber entrance 80, 110, 140 at the fiber input region 79, 109, 139. In the example shown, the splice tray 71, 101, 131 defines first and second fiber entrances 80, 110, 140 at the fiber input region 79, 109, 139. In certain examples, the first fiber entrance 80, 110, 140 at least partially faces the second fiber entrance 80, 110, 140. In certain examples, the second end 76, 106, 136 of the splice tray 71, 101, 131 is generally flat and the first end 75, 105, 135 of the splice tray 71, 101, 131 is contoured so that the first and second fiber entrances 80, 110, 140 are angled towards each other.

The splice region 81, 111, 141 is configured to hold one or more optical splices (e.g., fusion splices, mass fusion splices, mechanical splices, etc.). In the example shown, the splice region 81, 111, 141 defines four slots to hold optical splices. In other examples, the splice region 81, 111, 141 may include an empty volume at which any of various splice chips can be mounted. The splice chips can be configured to hold different numbers of splices and/or splices of different sizes. Accordingly, the trays 71, 101, 131 can be customized for a particular use by selecting which splice chip to position at the splice region 81, 111, 141.

In certain implementations, the splice tray 71, 101, 131 also can include a splitter region 81A, 111A, 141A at which a passive optical power splitter or a passive wave division multiplexer can be disposed. In certain examples, the splitter region 81A, 111A, 141A is disposed at the second end 76, 106, 136 of the splice tray 71, 101, 131. In certain examples, the splitter region 81A, 111A, 141A is disposed adjacent the splice region 81, 111, 141. In the examples shown in FIGS. 18, 24, and 26, the splitter region 81A, 141A is disposed between the splice region 81, 141 and an end wall at the second end 76, 136 of the splice tray 71, 131. In the example shown in FIG. 21, the splitter region 111A is disposed between the splice region 111 and a central region of the splice tray 101.

A fiber path 82, 112, 142 extends along the splice tray 71, 101, 131 between the fiber input region 79, 109, 139 and the splice region 81, 111, 141. One or more cable spools 83, 113, 143 are disposed at a central region of the splice tray 71, 101, 131 to store excess length of the fibers. In certain examples, the spools 83, 113 are separated by an open volume 84, 114.

In certain examples, the cable spools 83, 113, 143 are shaped to accommodate loop winding and/or "FIG. 8" winding of optical fibers. In loop winding, the optical fibers are coiled around exteriors of the cable spools 83, 113, 143 without passing between the spools. In "FIG. 8" winding, the optical fibers are coiled in a FIG. 8 pattern so that the fibers pass between the spools. The "FIG. 8" winding allows for reversing the winding direction of the optical fibers.

In certain examples, one or more storage spools 88, 118 and one or more radius limiters 89, 119 may be disposed within the base 65 for storing additional excess length of the fibers. In certain examples, the storage spools 88, 118 also are shaped to accommodate loop winding and/or "FIG. 8" winding of optical fibers.

In the example shown in FIG. 17, the fiber storage structures 87 may be sized to fit within the open volume 84 when the splice tray 71 is in the storage position. In the example shown in FIG. 20, the volume 114 does not accommodate the fiber storage structures. Rather, the splice tray 101 is sized to fit over the fiber storage structures and still allow the cover 66 to close relative to the base 65.

In the examples shown in FIGS. 17, 23, and 26, retention blocks 90 can be disposed at the fiber entrances 80. The retention blocks 90 can define one or more slits at which a fiber or buffer tube can be held via a friction fit within the slit. In examples, various designs of retention blocks 90 can be selectively mounted at the fiber entrances 80 to accommodate different numbers of fibers or types of cabling (e.g., loose fibers, ribbonized fibers, buffered fibers, upjacketed fibers, etc.).

In the examples shown in FIGS. 19-26, one or more optical adapters 120, 150, 180 are provided in the enclosure 60. In such embodiments, the cut optical fibers of the distribution cable 12 can be spliced to connectorized optical pigtails plugged into first ports of the optical adapters 120, 150, 180. In some examples, connectorized ends of drop cables can be routed into the enclosure 60 via the drop cable ports 68 and plugged into second ports of the optical adapters 120, 150, 180. In other examples, unconnectorized ends of the drop cables can be routed into the enclosure and spliced to connectorized pigtails, which are plugged into the second ports of the optical adapters 120, 150, 180.

In the example management arrangements 100, 130 shown in FIGS. 20 and 23, the optical adapters 120, 150 are disposed within the cable storage region 72, 102 of the base 65. For example, the optical adapters 120, 150 can be mounted in one or more rows and/or one or more columns. In the example shown, the optical adapters 120, 150 are mounted in two rows of two adapters each. In the example management arrangement 160 shown in FIG. 26, the optical adapters 180 are carried by the splice tray 71. For example, the adapters 180 can be mounted to an opposite face of the splice tray 71 from the splice region 81 (see FIG. 26).

FIGS. 27-32 illustrate another example enclosure 200 suitable for use as an OTE 14 to seal over the second window 19. The enclosure 200 has opposite first and second ends 203, 204 extending between opposite first and second sides 201, 202. The enclosure 200 includes a base 205 and a cover 206 that cooperate to define an interior. The cover 206 is pivotal relative to the base 205 between a closed position (FIG. 27) and an open position (e.g., FIG. 28). The base 205 and cover 206 cooperate to define a cable storage region disposed within the interior of the enclosure 200.

In certain examples, the first end 203 of the enclosure 200 is approximately the same length as the second end 204. In certain examples, the enclosure 200 is generally rectangular in shape (e.g., see FIG. 27).

A first distribution cable port 207 is disposed at the first side 201 of the enclosure 200 and a second distribution cable port 207 disposed at the second side 202 of the enclosure 200. The second distribution cable port 207 is aligned with the first distribution cable port 207 so that the cable 12 can extend linearly through the enclosure 200.

A first drop cable port 208 is disposed at the first side 201 and a second drop cable port 208 is disposed at the second side 202. In some implementations, the drop cable ports 208 are smaller than the distribution cable ports 207. In other implementations, the drop cable ports 208 are the same size as the distribution cable ports 207. In certain implementations, each side 201, 202 also defines additional drop cable ports 208. In some examples, each side 201, 202 has a common number of drop cable ports 208. In other examples, however, the sides 201, 202 can have different numbers of drop cable ports 208.

In certain implementations, anchor members 209 are disposed at the distribution cable ports 207 and/or the drop cable ports 208. The anchor members 208 extend outwardly from the ports 207, 208 and provide a surface to which the cables 12, 13 can be tied. In certain examples, each anchor member 209 includes a radial flange at a distal end to retain a cable tie. In certain examples, the anchor members 209 for the distribution cable ports 207 are larger than the anchor members 209 for the drop cable ports 208.

In certain examples, the cover 206 is larger than the base 205. In certain examples, the cover 206 extends beyond the base 205 sufficient to extend across the anchor members 209. In certain examples, the cover 206 extends beyond the base 205 sufficient to block the anchor members 209 from view from a front of the enclosure 200. In certain examples, a lock between the cover 206 and the base 205 is disposed at the first end 203 or the second end 204 of the enclosure 200. In other examples, the lock may be disposed on a front of the enclosure 200 (i.e., on the cover).

Figure 28:
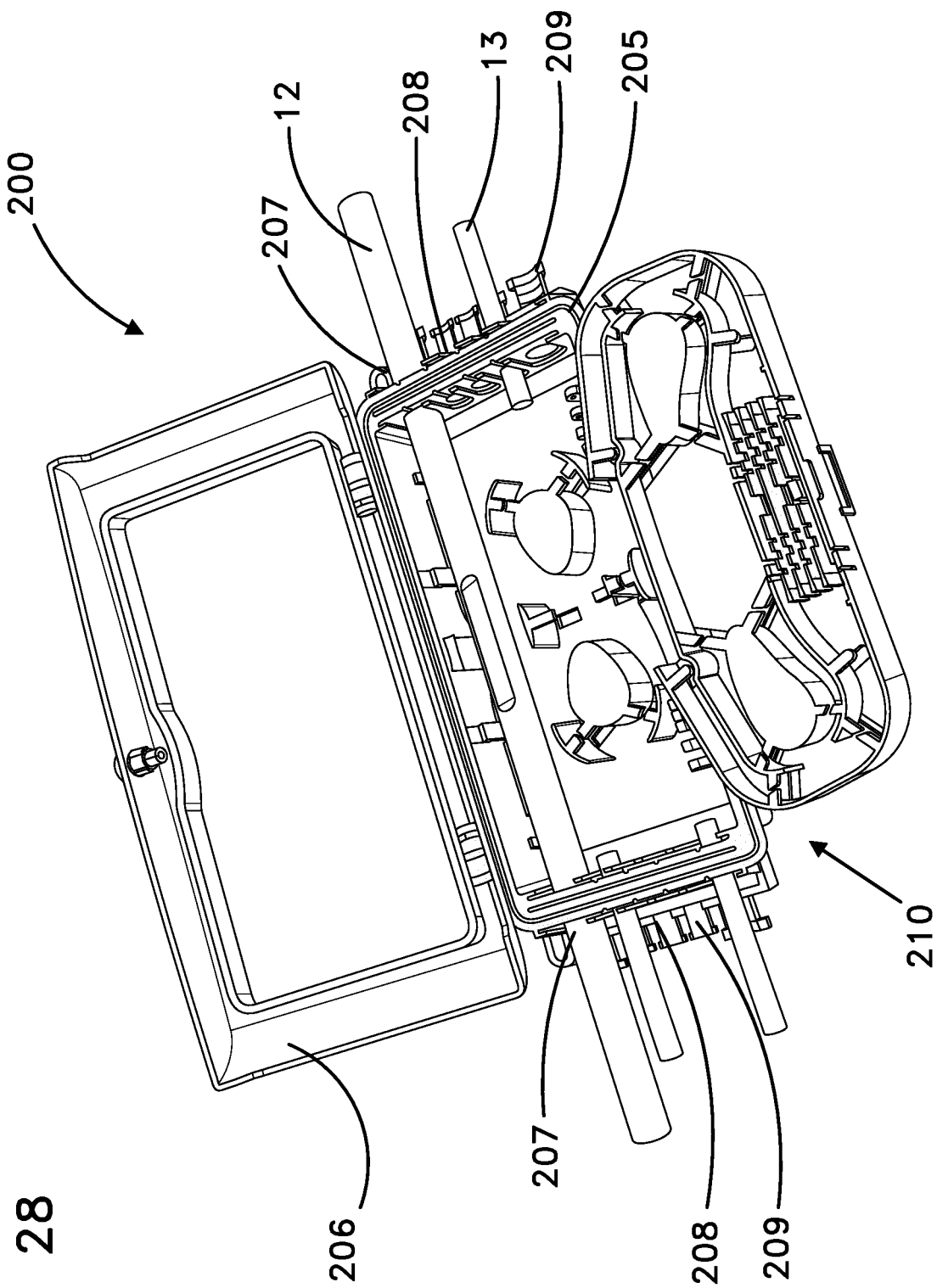
FIG. 28 is a front perspective view of the enclosure of FIG. 27 with the cover shown in the open position so the splice tray of a management arrangement is visible in the access position.
Figure 29:
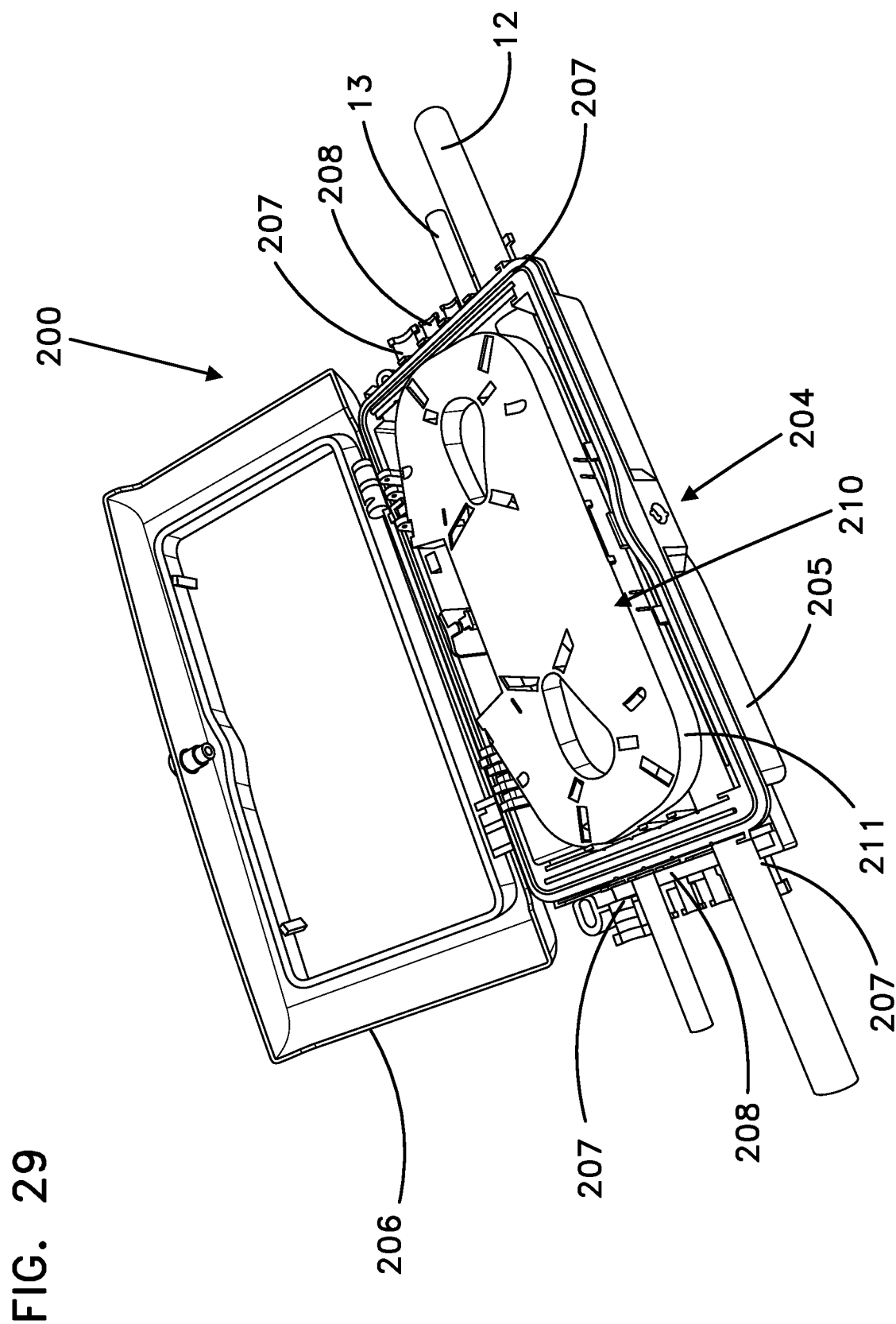
FIG. 29 is a front perspective view of the enclosure of FIG. 27 with the cover shown in the open position so the splice tray of a management arrangement is visible in the stowed position, the management arrangement being flipped 180° relative to the management arrangement of FIG. 28.
Figure 30:
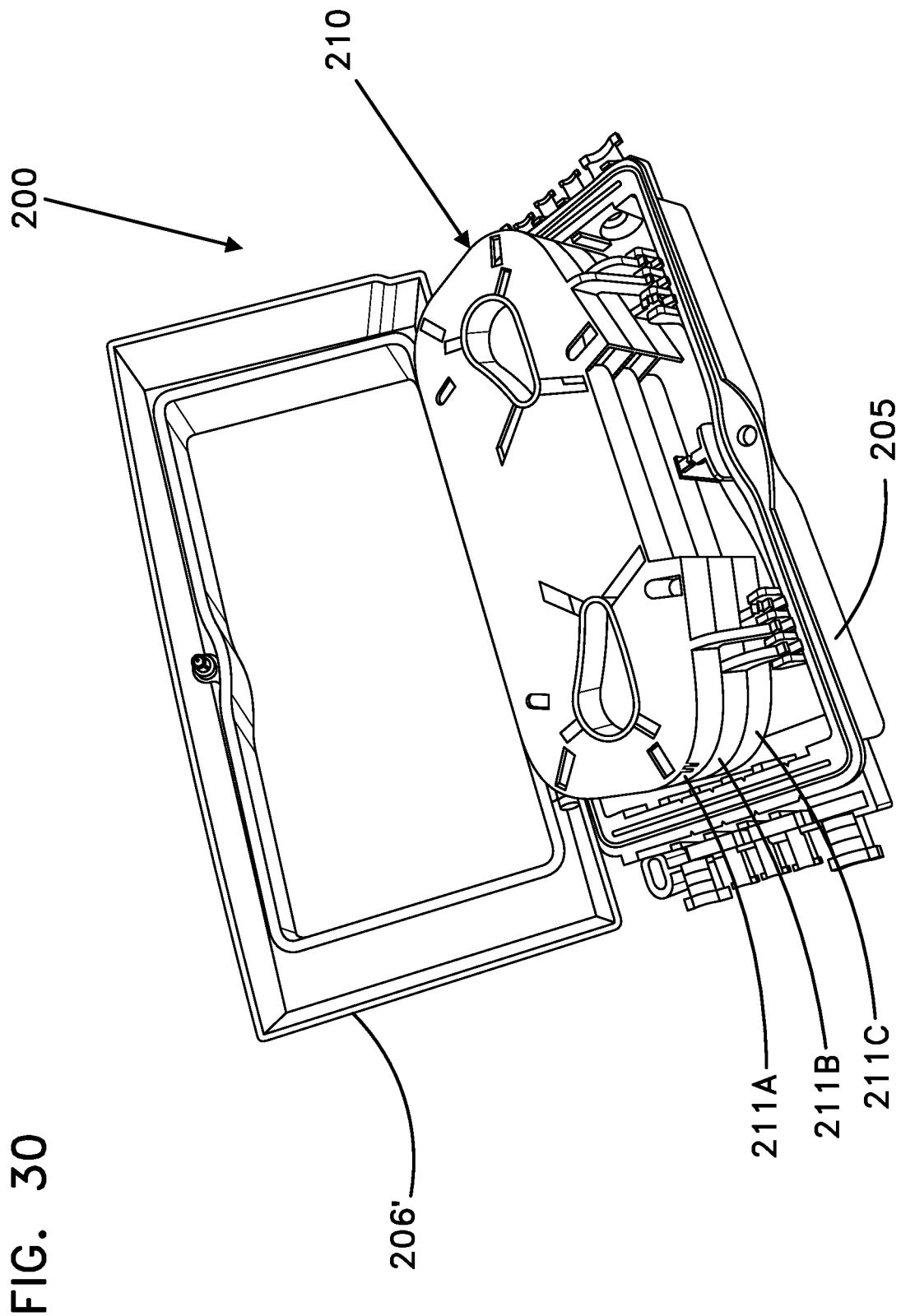
FIG. 30 is a front perspective view of the enclosure of FIG. 27 with additional splice trays added to the management arrangement in a stack.

As shown in FIG. 29, certain implementations of the enclosure 200 also define additional distribution cable ports 207. For example, the first and second distribution cable ports 207 may be disposed closer to the first end 203 of the enclosure 200 while third and fourth distribution cable ports 207 are disposed closer to the second end 204 of the enclosure 200 (compare FIGS. 28 and 30). Accordingly, the distribution cable 12 can be routed through the enclosure 200 closer to the second end 204 than to the first end 203.

In certain implementations, the distribution cable ports 207 are larger than the drop cable ports 208. A drop cable 13 can be routed through any of the distribution cable ports 207. In the example shown in FIGS. 28 and 29, up to four drop cables 13 can be routed through the enclosure 200 in addition to the distribution cable 12 by routing one of the four drop cables 13 through the second set of distribution cable ports 207.

FIGS. 28 and 29 also show another example management arrangement 210 suitable for managing the cut optical fibers within the enclosure 200. The management arrangement 210 including a splice tray 211 that facilitates splicing the cut optical fibers of distribution cable 12 to fibers of drop cables 13. The splice tray 211 mounts to the base 205 to selectively cover the cable storage region.

The splice tray 211 extends between opposite first and second sides and between opposite first and second ends. The splice tray 211 is pivotal relative to the base 205 along a respective pivot axis to move between a storage position (FIG. 29) and an access position (FIG. 28). In FIG. 28, the respective pivot axis is disposed at the second end 204 of the base 205 and at the first end of the splice tray 211. In FIG. 29, however, the orientation of the management arrangement 210 has been moved 180° compared to FIG. 28. Accordingly, the respective pivot axis of the splice tray 211 is disposed at the first end 203 of the base 205, but still at the first end of the splice tray 211. Moving the respective pivot axis closer to the first end 203 of the base 205 accommodates routing the distribution cable 12 through the distribution cable ports 207 located closer to the second end 204 of the enclosure 200.

In certain implementations, the management arrangement 210 is upgradeable. One or more additional splice trays 211 may be added to the management arrangement 210. For example, in FIGS. 30 and 31, the management arrangement 210 includes a first splice tray 211A, a second splice tray 211B, and a third splice tray 211C. Each of the splice trays 211A-211C is pivotal relative to the base 205. Each of the splice trays 211A-211C is pivotal relative to the other splice trays. In certain examples, the splice trays 211A-211C have co-axial pivot axes.

Figure 31:
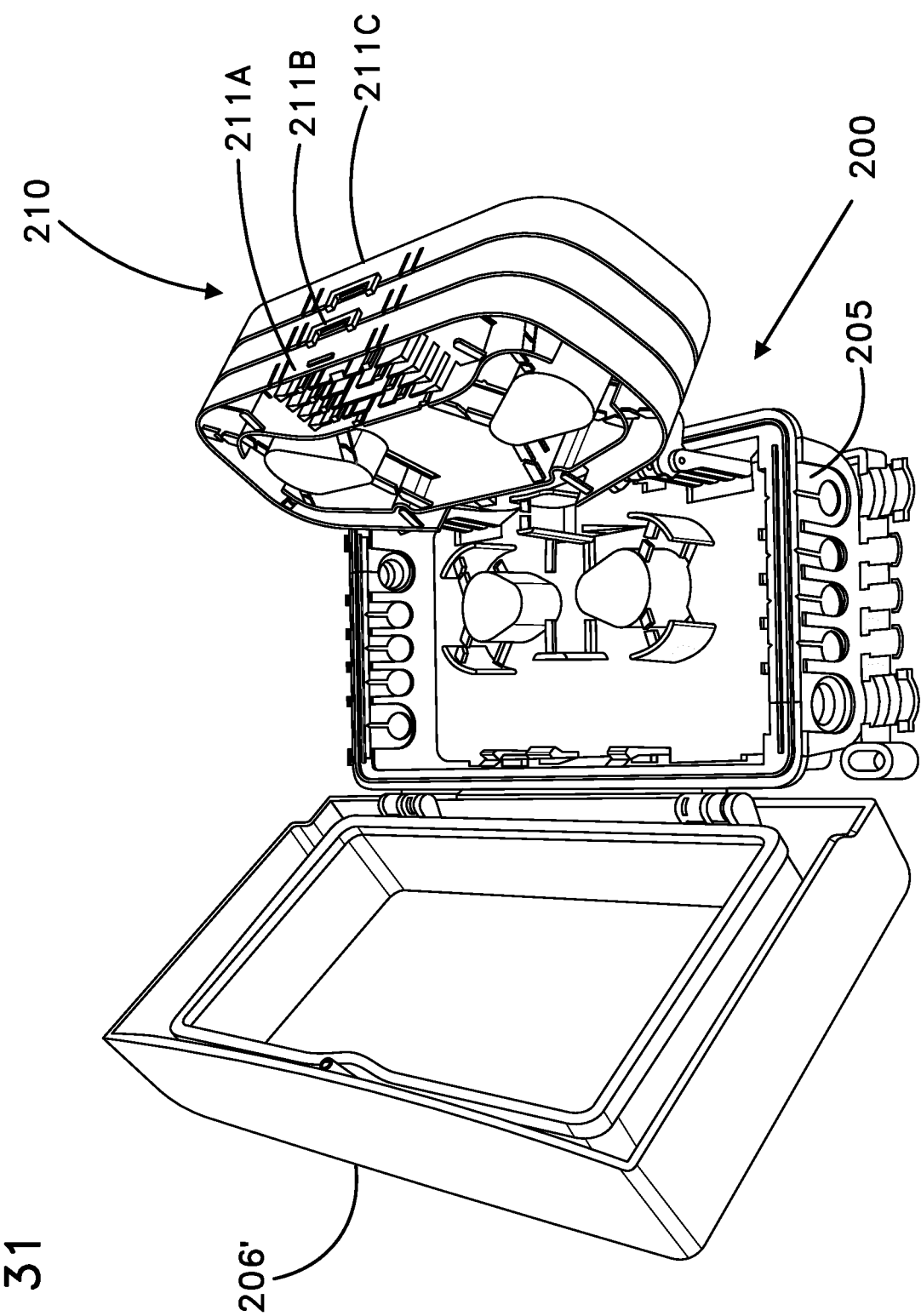
FIG. 31 is a front perspective view of the enclosure of FIG. 30 with the cover shown in the open position so the stack of splice trays is visible.
Figure 32:
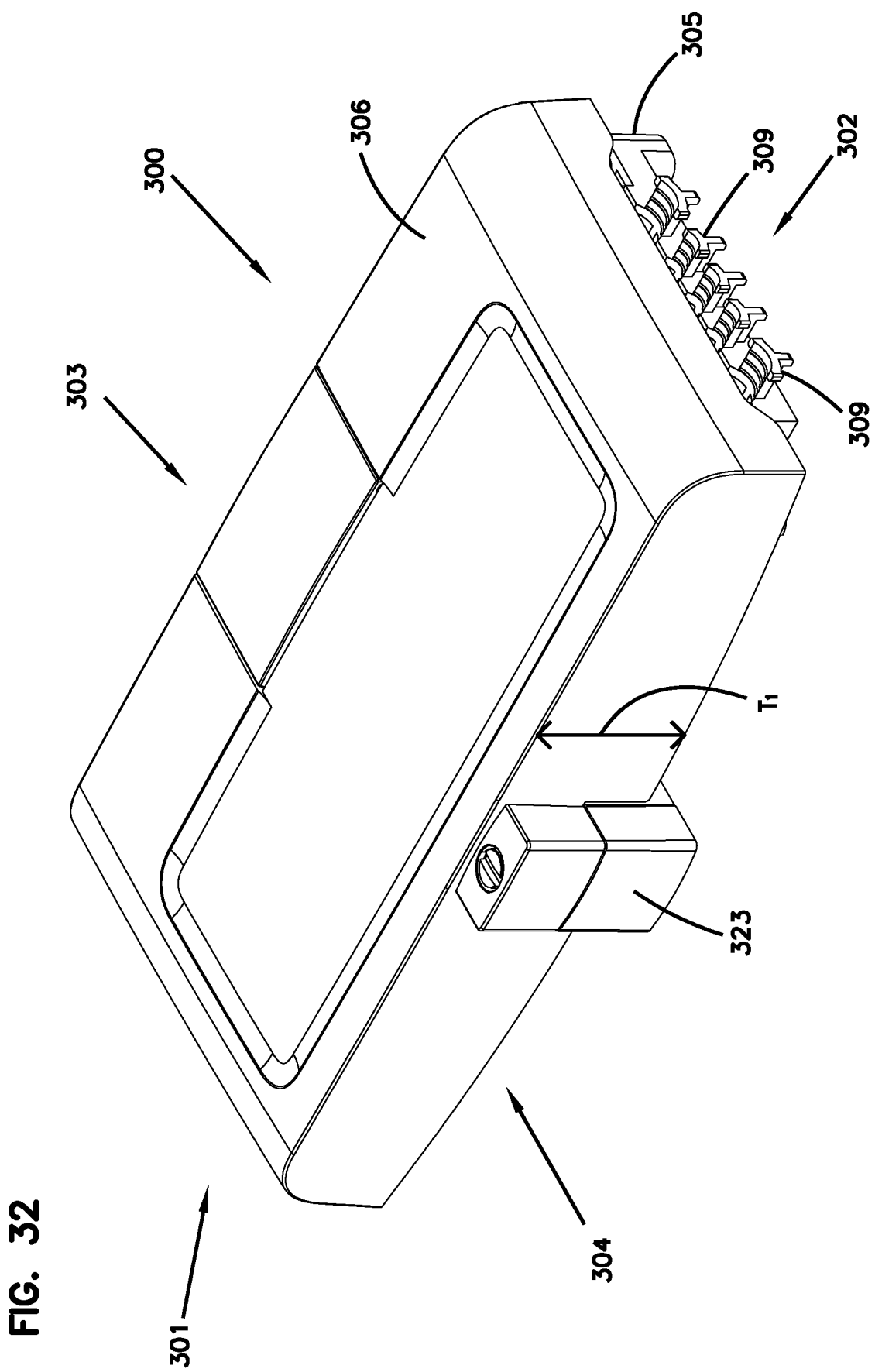
FIG. 32 is a front perspective view of another example enclosure suitable for sealing a second window cut into the distribution cable of FIG. 1, the enclosure including a base and a cover shown in the closed position.
Figure 33:
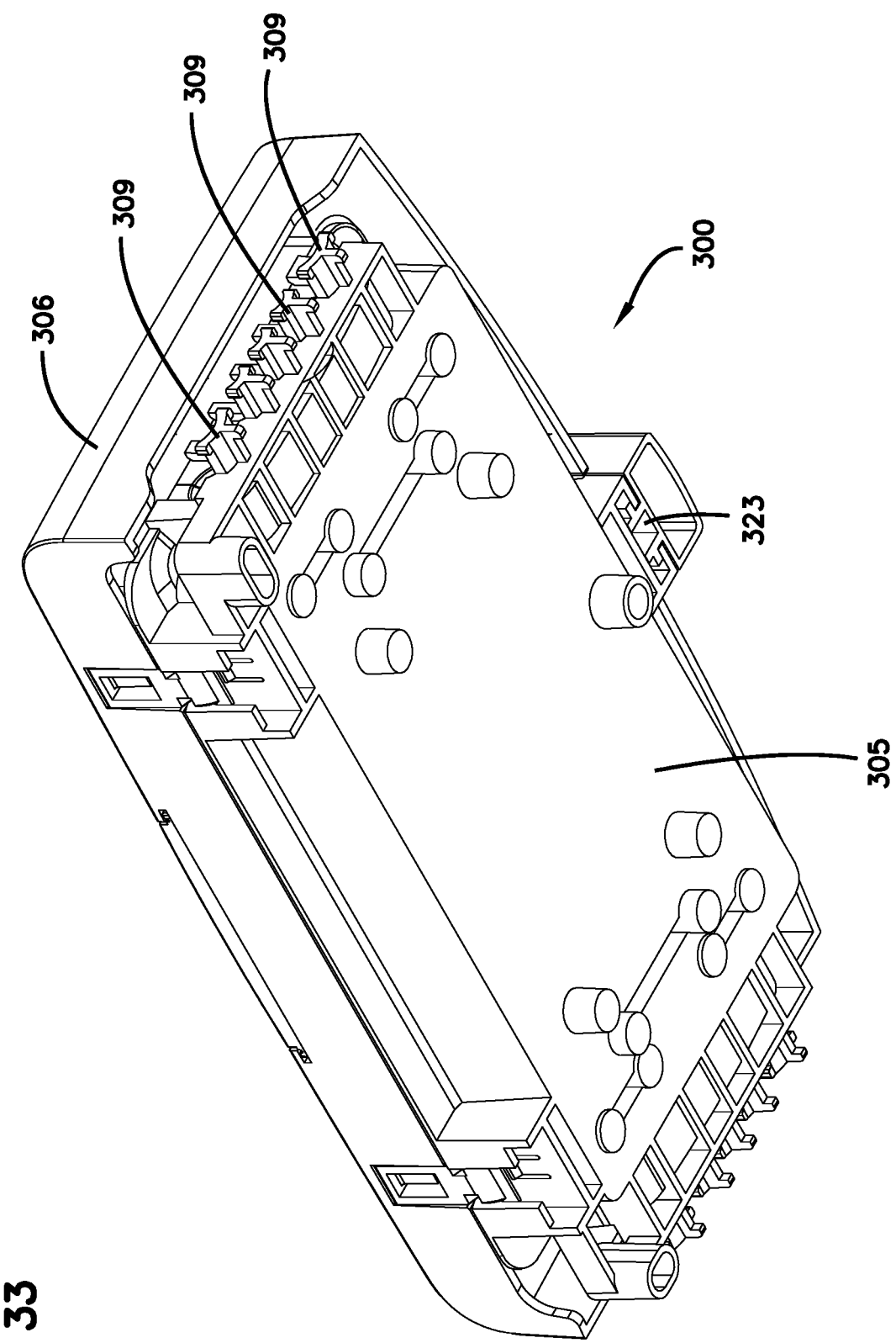
FIG. 33 is a rear perspective view of the enclosure of FIG. 32.

In certain implementations, each splice tray 211A-211C includes a separate latch member that can latch to a latch arm of the management arrangement 210 (e.g., see FIG. 31). As shown in FIG. 31, a deeper cover 206' can be installed on the base 205 to accommodate the additional splice trays. In other examples, the original cover 206 may be sufficiently deep.

Figure 37:
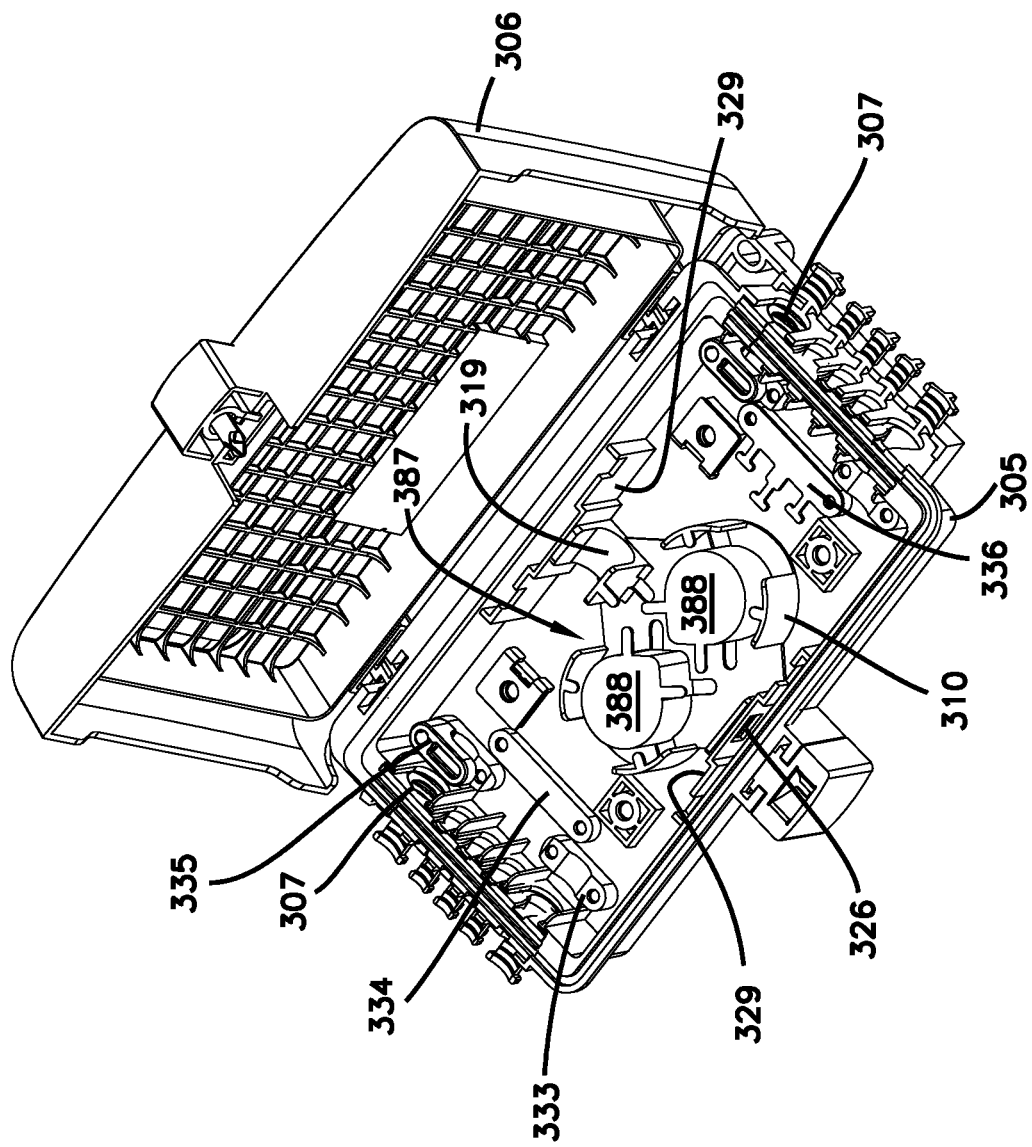
FIG. 37 is a front perspective view of the enclosure of FIG. 32 shown with the cover open, the management arrangement disposed in a first orientation, and the tray arrangement removed.
Figure 38:
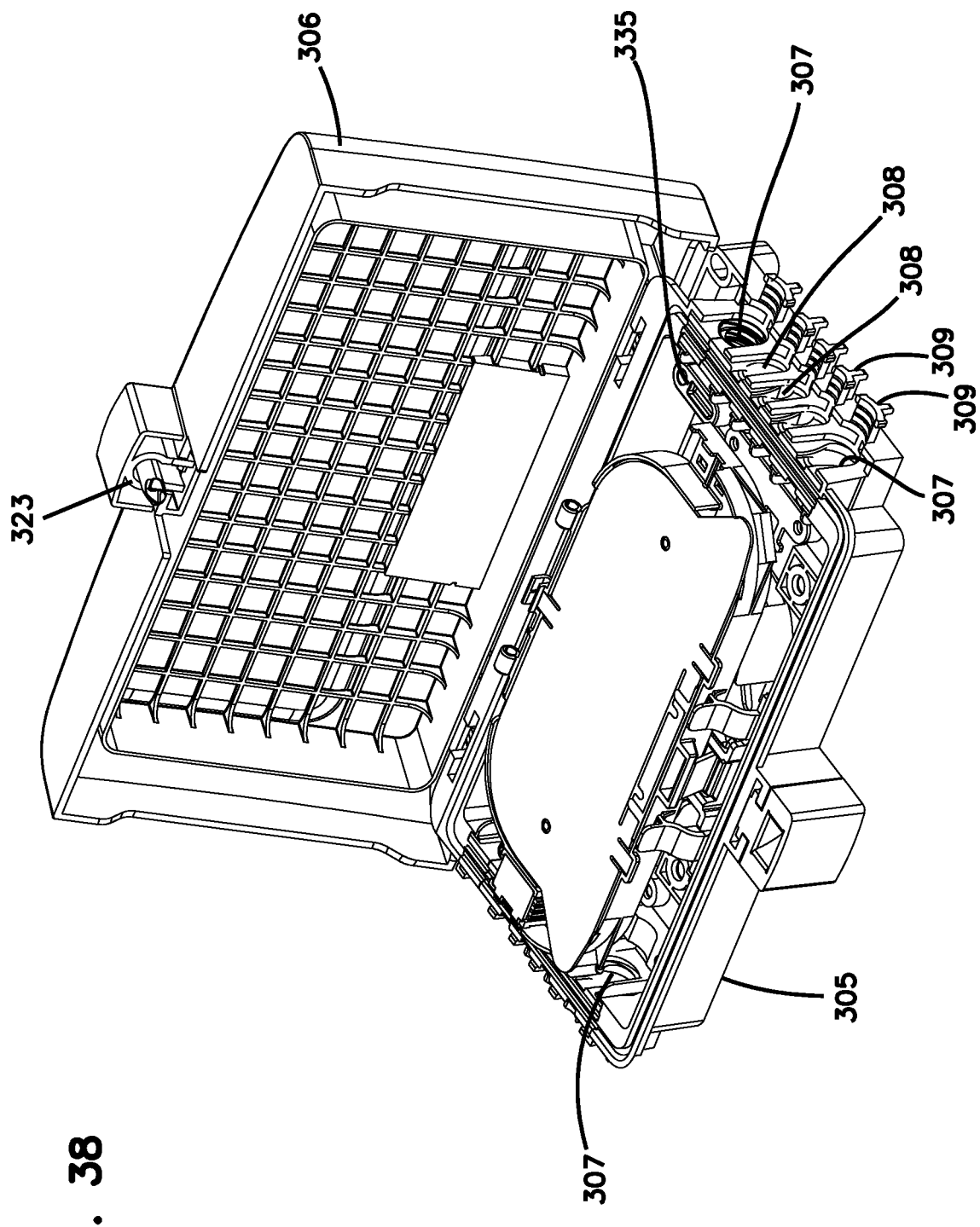
FIG. 38 is a front perspective view of the enclosure of FIG. 37 with a tray mounted to the enclosure in a first orientation, the tray disposed in a stowed position.
Figure 39:
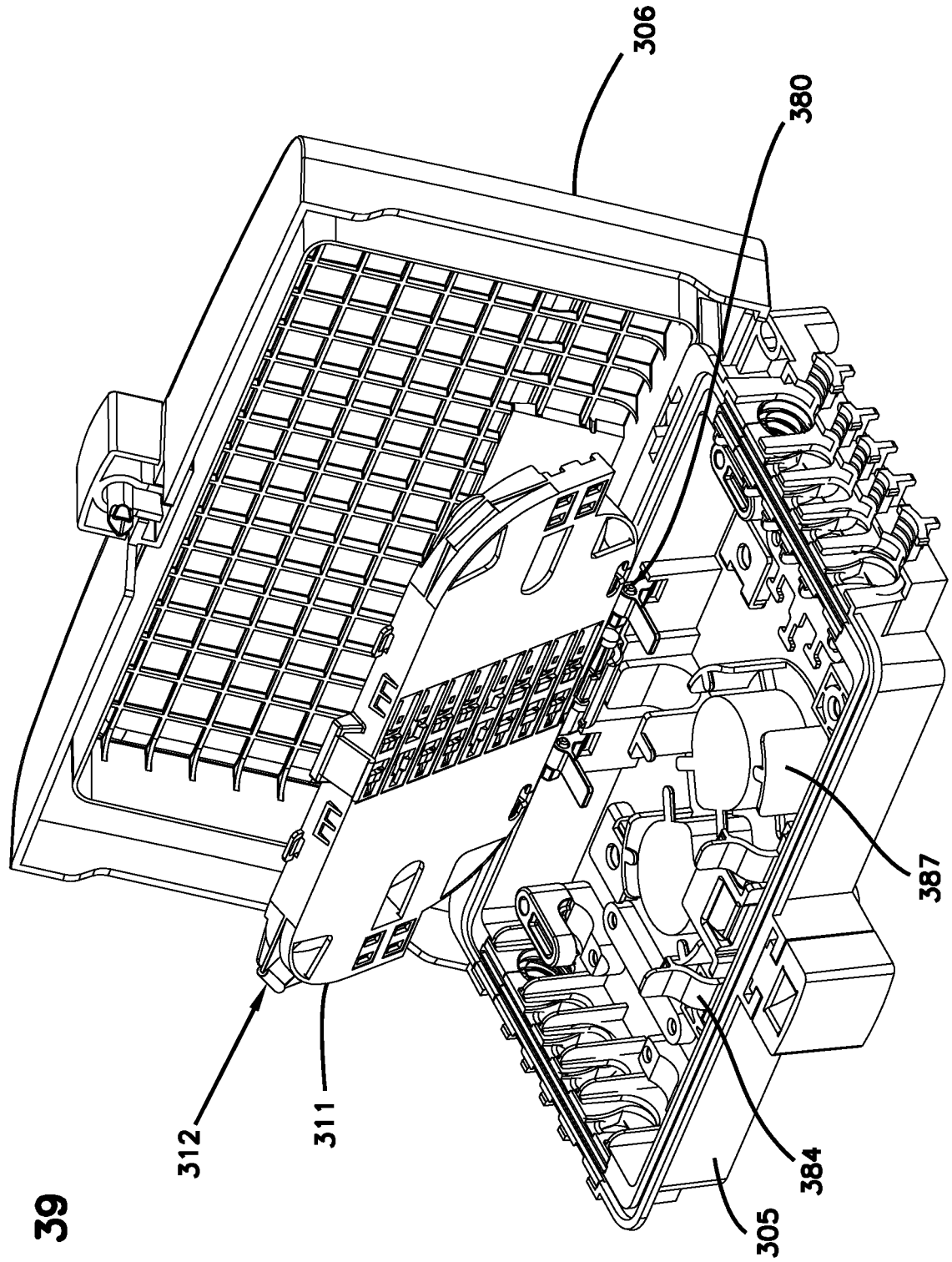
FIG. 39 is a front perspective view of the enclosure of FIG. 38 with the tray disposed in the access position.
Figure 40:
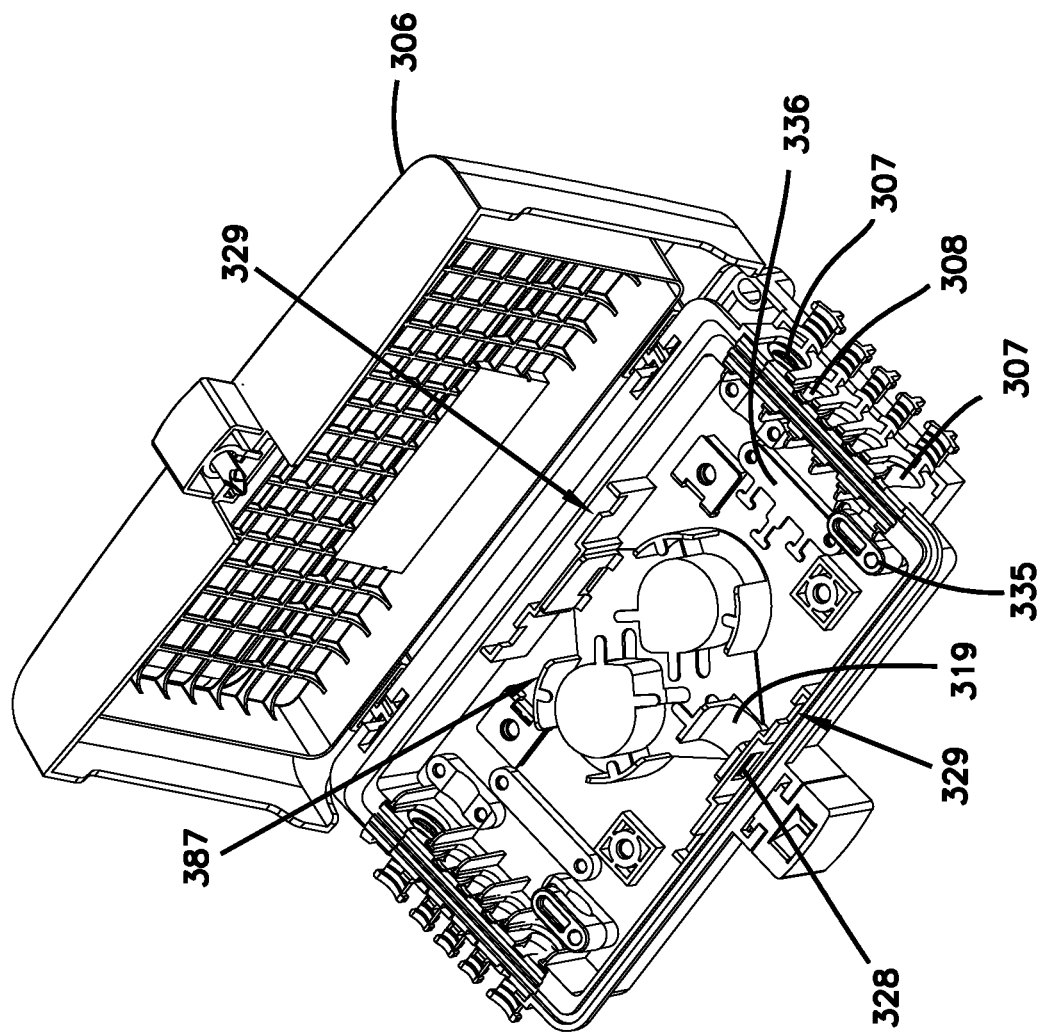
FIG. 40 is a front perspective view of the enclosure of FIG. 32 shown with the cover open, the management arrangement disposed in a second orientation flipped 180 degrees from the first orientation, and the tray arrangement removed.
Figure 41:
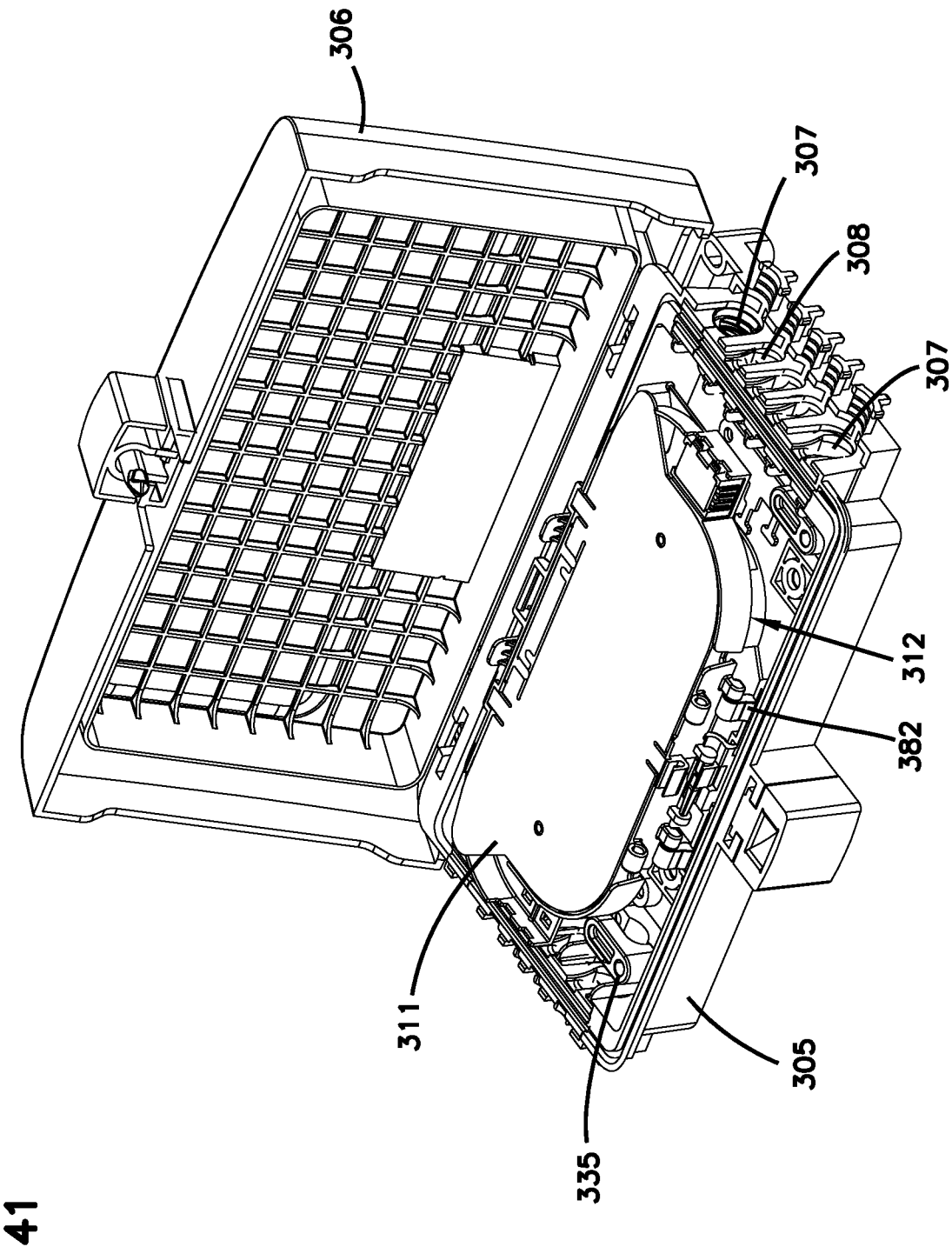
FIG. 41 is a front perspective view of the enclosure of FIG. 40 with a tray mounted to the enclosure in a second orientation, the tray disposed in a stowed position.
Figure 42:
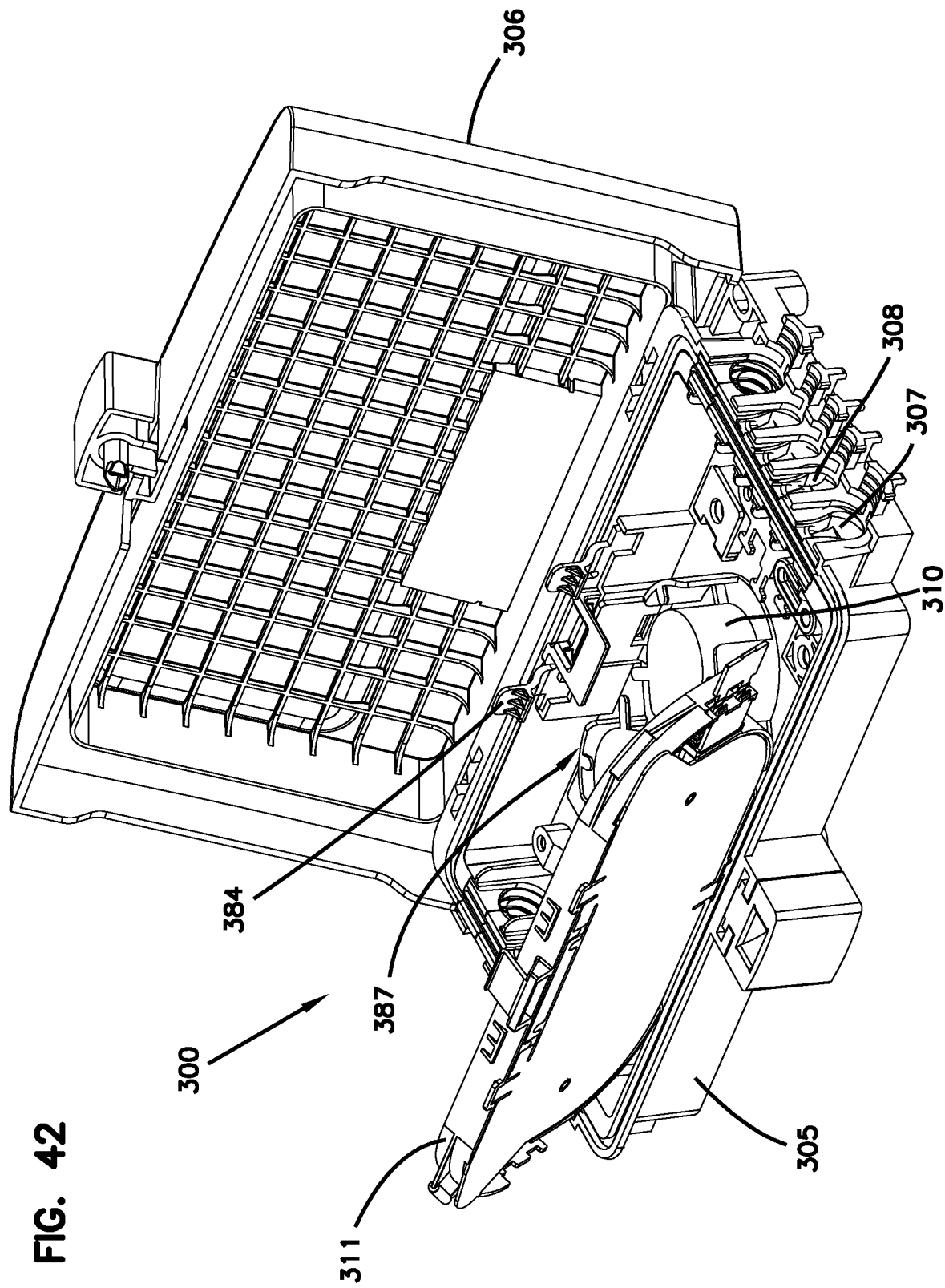
FIG. 42 is a front perspective view of the enclosure of FIG. 41 with the tray disposed in the access position.
Figure 43:
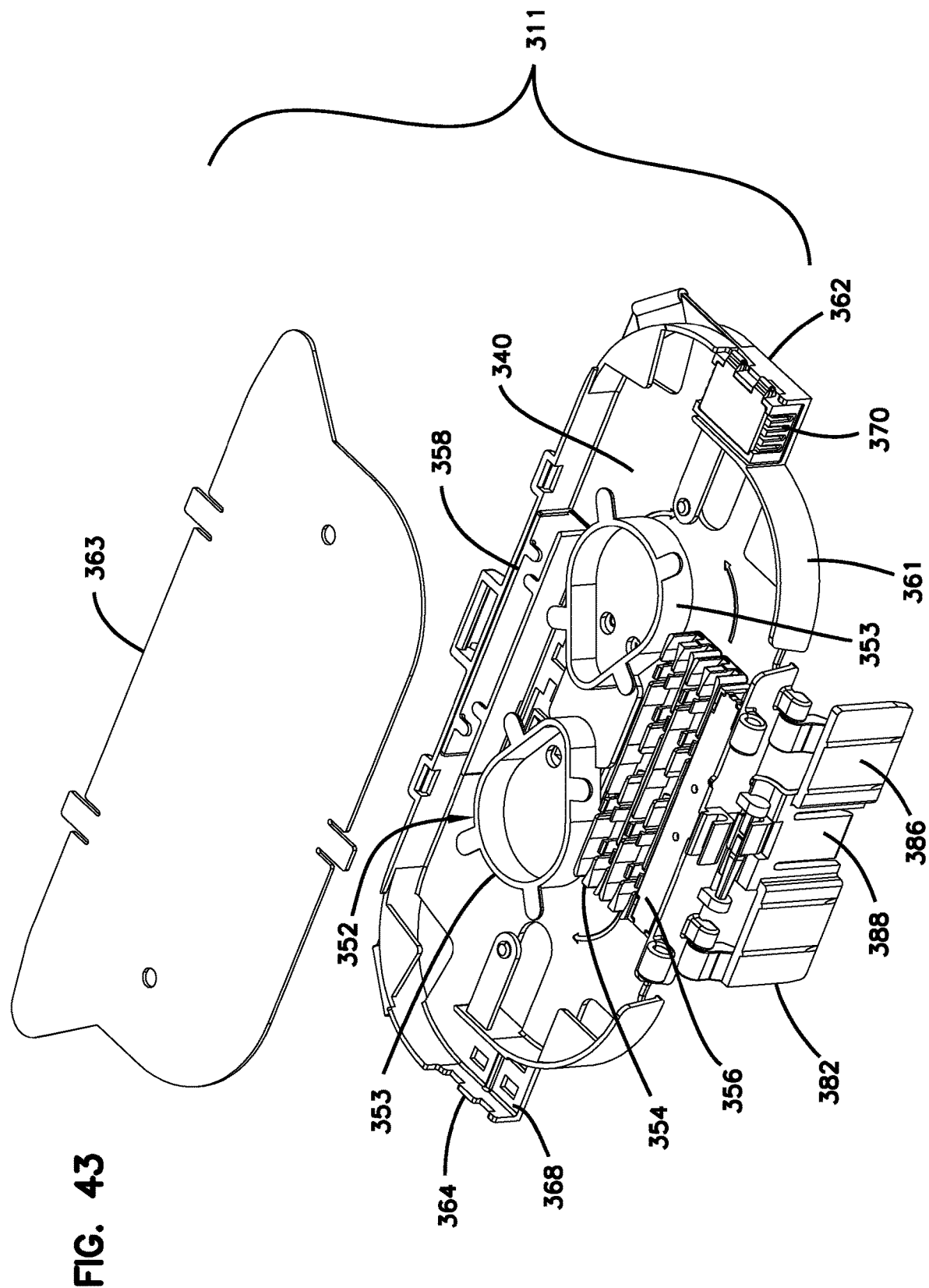
FIG. 43 is a front perspective view of an example tray suitable for use with any of the tray arrangements disclosed herein.
Figure 44:
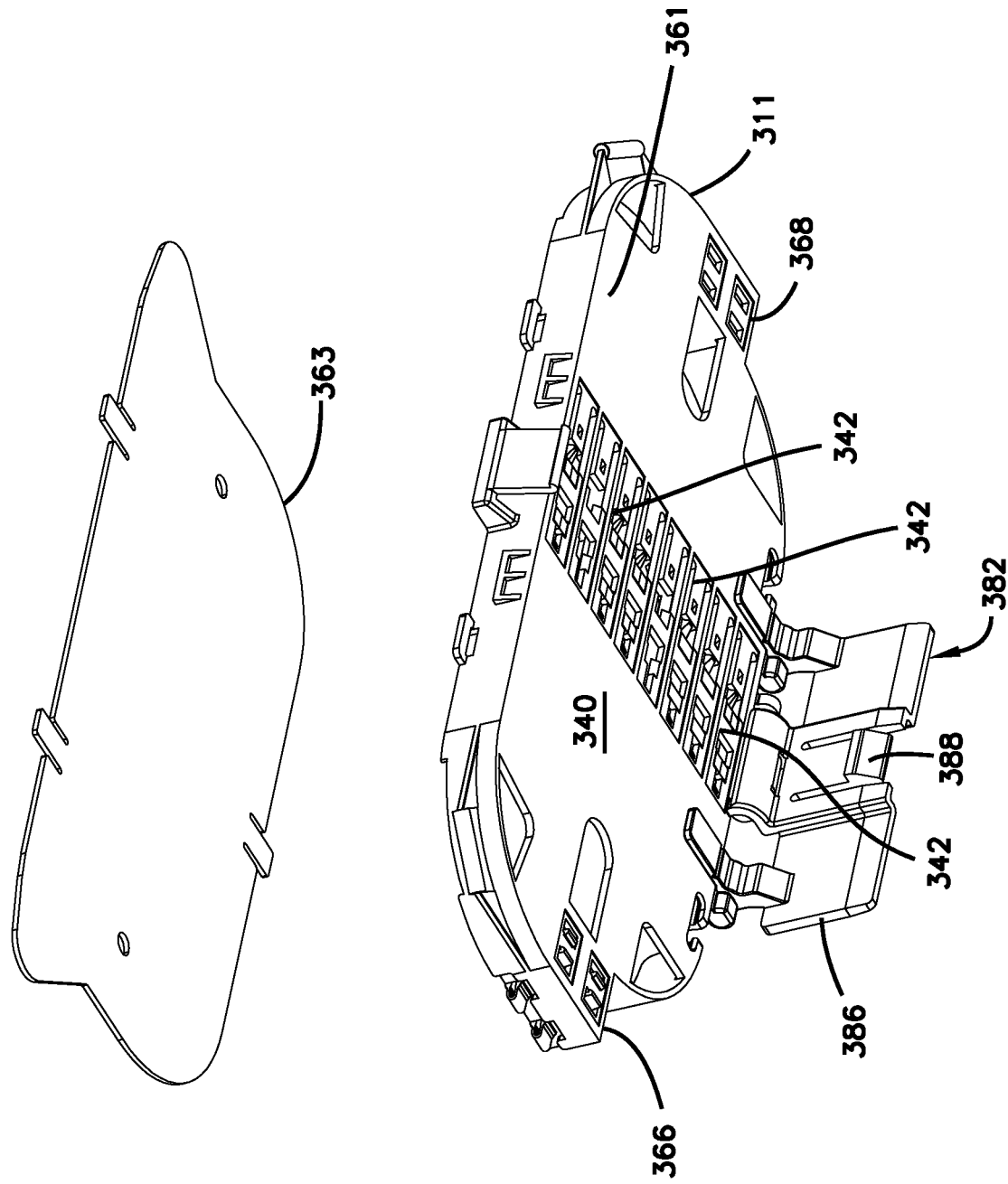
FIG. 44 is a rear perspective view of the tray of FIG. 43.
Figure 45:
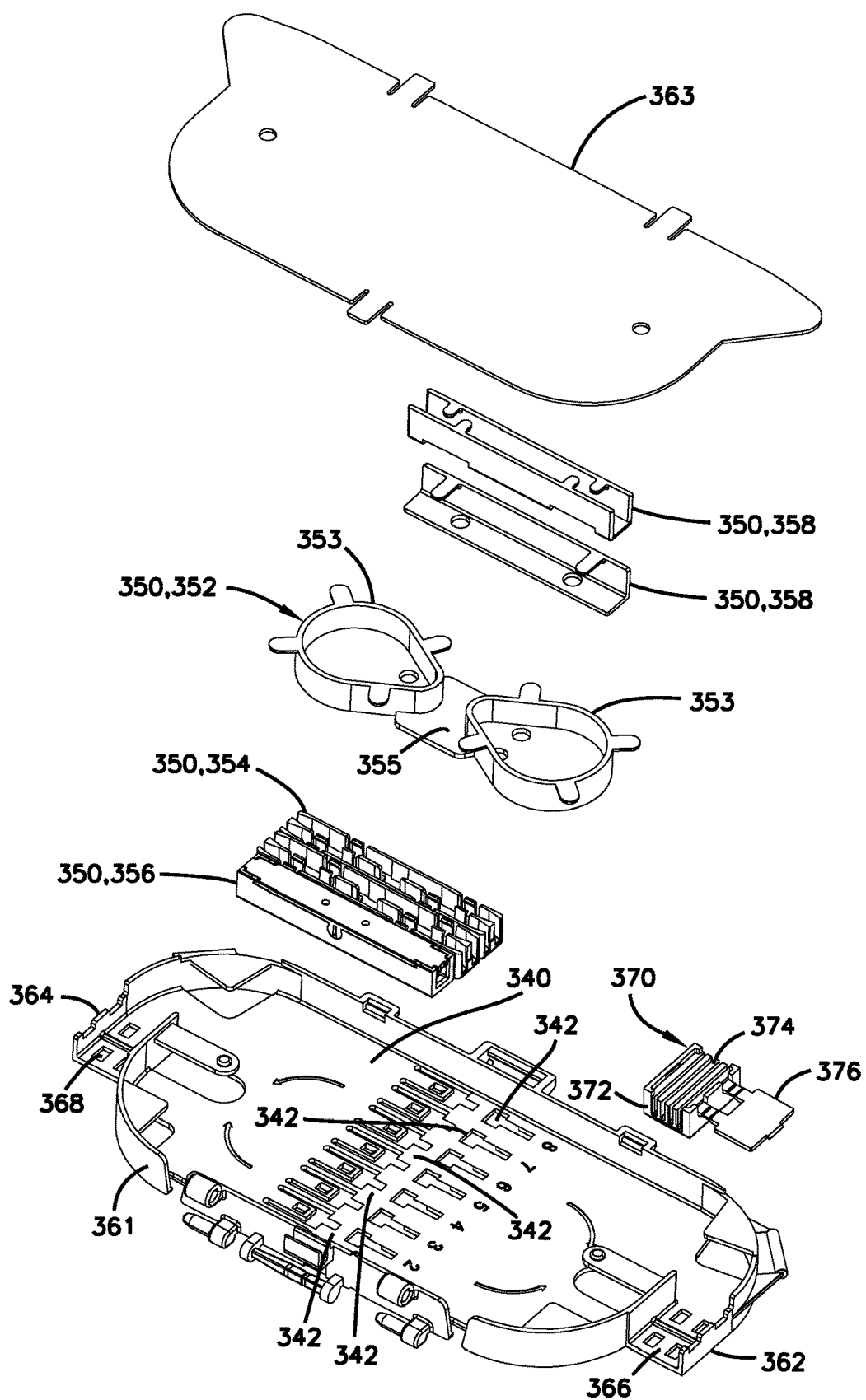
FIG. 45 is a front perspective view of the tray of FIG. 43 with various components exploded off the tray so that the mounting stations are visible.
Figure 46:
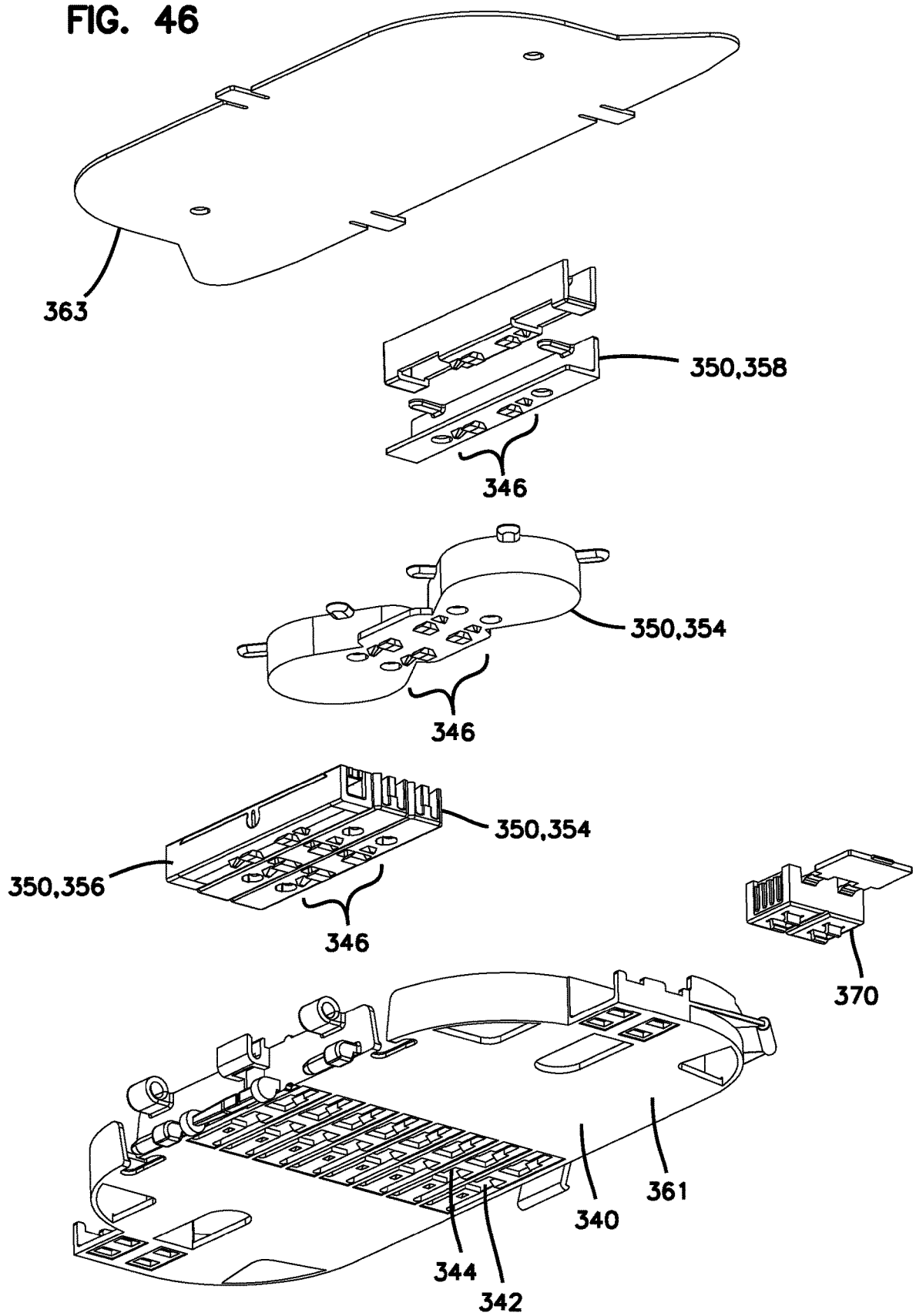
FIG. 46 is a rear perspective view of the tray of FIG. 45.

Referring now to FIGS. 32-49, another example enclosure 300 suitable for use as an OTE 14 to seal over the second window 19. The enclosure 300 has opposite first and second ends 303, 304 extending between opposite first and second sides 301, 302. The enclosure 300 includes a base 305 and a cover 306 that cooperate to define an interior. The cover 306 is pivotal relative to the base 305 between a closed position (FIG. 32) and an open position (e.g., FIG. 37). The base 305 and cover 306 cooperate to define a cable storage region disposed within the interior of the enclosure 300.

In certain examples, the first end 303 of the enclosure 300 is approximately the same length as the second end 304. In certain examples, the enclosure 300 is generally rectangular in shape (e.g., see FIG. 32).

A first distribution cable port 307 is disposed at the first side 301 of the enclosure 300 and a second distribution cable port 307 disposed at the second side 302 of the enclosure 300. The second distribution cable port 307 is aligned with the first distribution cable port 307 so that the cable 12 can extend linearly through the enclosure 300. In certain implementations, the enclosure 300 also defines additional distribution cable ports 307. For example, the first and second distribution cable ports 307 may be disposed closer to the first end 303 of the enclosure 300 while third and fourth distribution cable ports 307 are disposed closer to the second end 304 of the enclosure 300. Accordingly, the distribution cable 12 can be routed through the enclosure 300 closer to the second end 304 than to the first end 303.

Aligned pairs of drop cable ports 308 are disposed at the first and second sides 301, 302. In some implementations, the drop cable ports 308 are smaller than the distribution cable ports 307. In other implementations, the drop cable ports 308 are the same size as the distribution cable ports 307. In certain implementations, each side 301, 302 also defines additional drop cable ports 308. In some examples, each side 301, 302 has a common number of drop cable ports 308. In other examples, however, the sides 301, 302 can have different numbers of drop cable ports 308.

In certain implementations, anchor members 309 are disposed at the distribution cable ports 307 and/or the drop cable ports 308. The anchor members 309 extend outwardly from the ports 307, 308 and provide a surface to which the cables 12, 13 can be tied. In certain examples, each anchor member 309 includes a radial flange at a distal end to retain a cable tie. In certain examples, the anchor members 309 for the distribution cable ports 307 are larger than the anchor members 309 for the drop cable ports 308.

In certain examples, the cover 306 is larger than the base 305. In certain examples, the cover 306 extends beyond the base 305 sufficient to extend across the anchor members 309. In certain examples, the cover 306 extends beyond the base 305 sufficient to block the anchor members 309 from view from a front of the enclosure 300 (e.g., see FIG. 33).

In certain examples, a lock 323 between the cover 306 and the base 305 is disposed at the first end 303 or the second end 304 of the enclosure 300. In other examples, the lock 323 may be disposed on a front of the enclosure 300 (i.e., on the cover). Examples of suitable locks 323 can be found in U.S. Provisional Application No. 62/661,204, filed Apr. 23, 2018, the disclosure of which is hereby incorporated herein by reference.

Figure 34:
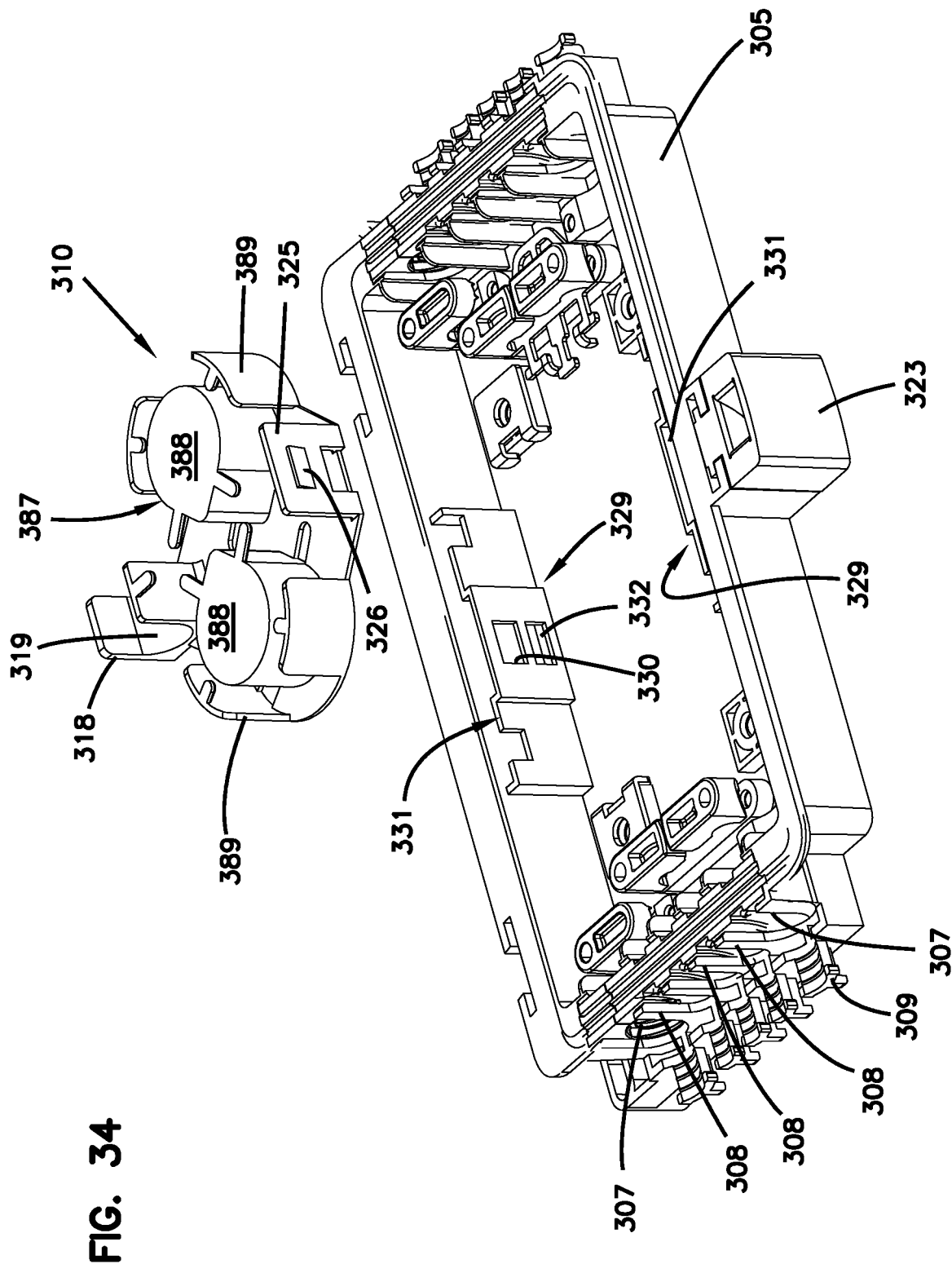
FIG. 34 is a front perspective view of the base of the enclosure of FIG. 32 with the cover removed and a management arrangement exploded upwardly from the base.

FIGS. 34-36 show another example management arrangement 310 suitable for managing the cut optical fibers within the enclosure 300. The management arrangement 310 including a fiber storage structure 387 that is mountable within the interior of the enclosure 300. The fiber storage structure 387 includes one or more storage spools 388 and/or one or more radius limiters 389 configured for storing additional excess length of the fibers. In certain examples, the fiber storage structure 387 is shaped to accommodate loop winding and/or "FIG. 8" winding of optical fibers.

In certain implementations, the management arrangement 310 also includes a guide member 318 configured to manage fibers extending through the enclosure interior. In certain examples, the guide member 318 defines a channel 319 aligned with the distribution cable ports 307 to be used. In some examples, fibers passing through the enclosure 300 without being broken out from the distribution cable 12 are routed through the guide member 318. In other examples, one or more fibers being broken out from the distribution cable 12 within the enclosure 300 can pass through the guide member 318.

In certain implementations, the management arrangement 310 is selectively mountable within the enclosure 300 in a first orientation and in a second orientation that is flipped 180° from the first orientation. In certain implementations, the guide member 318 is integrally formed with the fiber storage structure 387. For example, the guide member 318 can be carried with the fiber storage structure 387 when the management arrangement 310 is flipped between the first and second orientations. In an example, the management arrangement 310 is disposed in the first orientation when the distribution cable is to be received at the distribution ports 307 disposed closer to the first end 303 of the enclosure 300 (e.g., see FIG. 37) and is disposed in the second orientation when the distribution cable is received at the distribution ports 307 disposed closer to the second end 304 of the enclosure 300 (e.g., see FIG. 40).

In certain implementations, the management arrangement 310 is configured to latch or otherwise secure to the enclosure 300. For example, the management arrangement 310 includes a first mounting structure and the enclosure (e.g., the base 305) includes a second mounting structure that fits with the first mounting structure. For example, in the example shown, the management arrangement 310 includes cantilevered surfaces 325, 327 at opposite ends of the mounting arrangement 310. Each cantilevered surface 325, 327 includes a respective latching tab 326, 328, respectively.

The base 305 includes a receiving arrangement 329 at opposite ends 303, 304 of the base 305. In certain examples, the receiving arrangements 329 are oriented to face each other and are otherwise identical to each other. Each receiving arrangement 329 defines a latching receptacle 330 into which the latching tabs 326, 328 snap when the management arrangement 310 is installed within the enclosure 300.

In certain implementations, the distribution cable 12 and drop cables 13 can be anchored within the enclosure 300. In certain examples, anchor members can be disposed within the enclosure 300 adjacent the distribution cable ports 307 and drop cable ports 308. In some examples, the anchor members for the distribution cable ports 307 include clamps 335 and the anchor members for the drop cable ports 308 include cable tie receiving structures 336. In other examples, the drop cables 13 can be clamped and/or the distribution cable 12 can be tied. Other anchoring structures are possible.

In the example shown, first and second anchor mounts 333, 334 are disposed adjacent distribution cable ports 307 and the drop cable ports 308, respectively. A clamp 335 can be installed at the first anchor mount 333 (e.g., by a fastener) to squeeze the cable 12. A cable tie receiving structure 336 can be installed at the second anchor mount 334. In the example shown, a clamp 335 is only installed at the distribution ports 307 at which the distribution cable 12 is received. In certain examples, clamps 335 are disposed at opposite sides of the enclosure 300 adjacent the aligned distribution ports 307 at which the distribution cable 12 is received.

A tray arrangement 312 is mountable within the interior of the enclosure 300. The tray arrangement 312 includes one or more trays 311 that are pivotal relative to the enclosure 300. In certain examples, each tray 311 pivots relative to the fiber storage structure 387. Each tray 311 pivots between a stowed position (e.g., FIG. 38) and an access position (e.g., FIG. 39). In certain examples, the tray arrangement 312 is mountable to the enclosure 300 separate from the management arrangement 310.

In certain implementations, the tray arrangement 312 is selectively mountable within the enclosure 300 in a first orientation (see FIG. 38) and in a second orientation (see FIG. 41) that is flipped 180° from the first orientation. The trays 311 pivot towards the cover 306 when disposed in the first orientation (see FIG. 39) and pivot towards the user when disposed in the second orientation (see FIG. 42). In certain implementations, the tray arrangement 312 is mounted to the enclosure in the first orientation when the management arrangement 310 is mounted to the enclosure 300 in the first orientation (see FIG. 39) and is mounted to the enclosure in the second orientation when the management arrangement 310 is mounted to the enclosure 300 in the second orientation (see FIG. 42). In other implementations, the tray arrangement 312 and management arrangement 310 can be oriented opposite each other.

In certain examples, a hinge arrangement includes a hinge piece 382 and a latch piece 384. The hinge piece 382 and the latch piece 384 each include a retention structure 386 that slides into a channel 331 defined by a respective one of the receiving arrangements 329 within the enclosure 300 (see FIGS. 39 and 42). In certain examples, the retention structure 386 includes a latch member 388 that snaps into a latching receptacle 332 (FIG. 34) defined in the receiving arrangements 329.

When the tray arrangement 312 is disposed in the first orientation, the hinge piece 382 mounts in the channel 331 defined in a first one of the receiving arrangements 329 and the latch piece 384 mounts in the channel 331 defined in a second one of the receiving arrangements 329. When the tray arrangement 312 is disposed in the second orientation, the hinge piece 382 mounts in the channel 331 defined in the second receiving arrangement 329 and the latch piece 384 mounts in the channel 331 defined in the first receiving arrangement 329.

The hinge piece 382 mounts to a hinge structure at one end of a tray 311 (e.g., at a peripheral wall of the tray 311). In certain examples, an additional tray 311 of the tray arrangement 312 mounts to the first tray 311. Subsequent trays mount to the previous tray. Examples of a suitable hinge arrangement and tray retention structure for use in mounting multiple trays 311 to the enclosure 300 can be found in U.S. Provisional Application No. 62/792,724, filed Jan. 15, 2019, the disclosure of which is hereby incorporated herein by reference.

Each tray 311 includes a main body 361 and a cover 363 that cooperate to define an interior of the tray 311. Various components 350 can be disposed within the tray interior. Each tray 311 of the tray arrangement 312 is elongate between opposite first and second ends 362, 364. Each tray 311 includes a first fiber entrance 366 at the first end 362 and a second fiber entrance 368 at the second end 364. In some examples, the first and second fiber entrances 366, 368 are configured to receive cable ties to secure fibers entering the tray 311. In other examples, one or both of the first and second fiber entrances 366, 368 includes a respective fiber retainer 370 mounted thereat. Each fiber retainer 370 including a resilient piece 372 defining fiber channels 374 and a cover 376 that mounts over the resilient piece 372 to close the fiber channels 374.

In certain implementations, the main body 361 of each tray 311 includes a base 340 defining a plurality of mounting stations 342 (e.g., see FIGS. 44 and 45) at which various components 350 can be selectively mounted. Each mounting station 342 includes a first mounting structure 344. Each of the various components 350 includes a second mounting structure 346 that fits with the first mounting structure 344 to hold the component 350 at the mounting station 342. In certain examples, the first mounting structure 344 includes a dovetail slot and a cantilevered stop member. The second mounting structure 346 includes dovetailed tabs. Example first and second mounting structures suitable for use with the tray 311 and components 350 can be found in U.S. Provisional Application No. 62/661,437, filed Apr. 23, 2018, the disclosure of which is hereby incorporated herein by reference.

In certain implementations, the various components 350 include a bend radius insert 352 and a splice holder 354. In certain examples, the various components 350 also include a splitter holder 356. In certain examples, the various components 350 also include a routing guide 358. In certain examples, the second mounting structure 346 of each component 350 is identical. In certain examples, one or more components 350 include two or more sets of second mounting structures 346 to snap into two or more of the mounting stations 342. For example, in certain examples, two sets of second mounting structures 346 are disposed at the bottom of the bend radius insert 352 (e.g., see FIG. 46).

In the example shown, the bend radius insert 352 includes two spools 353 held at a fixed distance relative to each other by a spacer piece 355. The second mounting structure 346 is disposed at bottom of the spacer piece and/or at a bottom of the spools 353. The spacer piece 355 spaces the spools 353 sufficient to accommodate FIG. 8 routing, which enables a user to flip the direction in which fibers are routed. In certain examples, the spools 353 have a narrow portion facing each other. In certain examples, the spools 353 are each elongate. In certain examples, the spools 353 have tear-drop shapes. In certain examples, a component 350 is mounted at opposite ends of the bend radius insert 352 to aid in defining a routing channel around the spools 353 (see FIG. 43).

Figure 47:
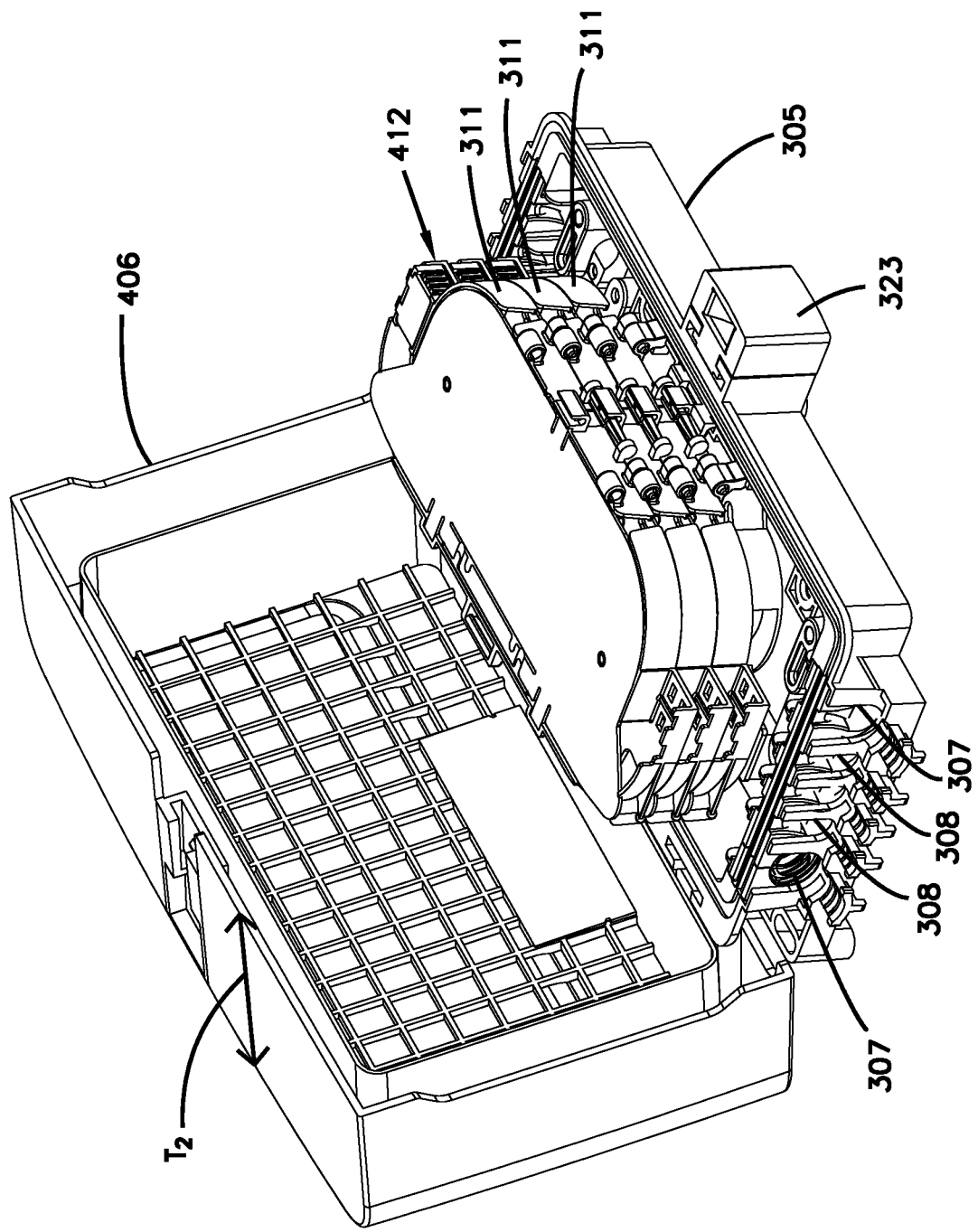
FIG. 47 is a front perspective view of the example enclosure of FIG. 41 with an upgraded cover and an upgraded tray arrangement.
Figure 48:
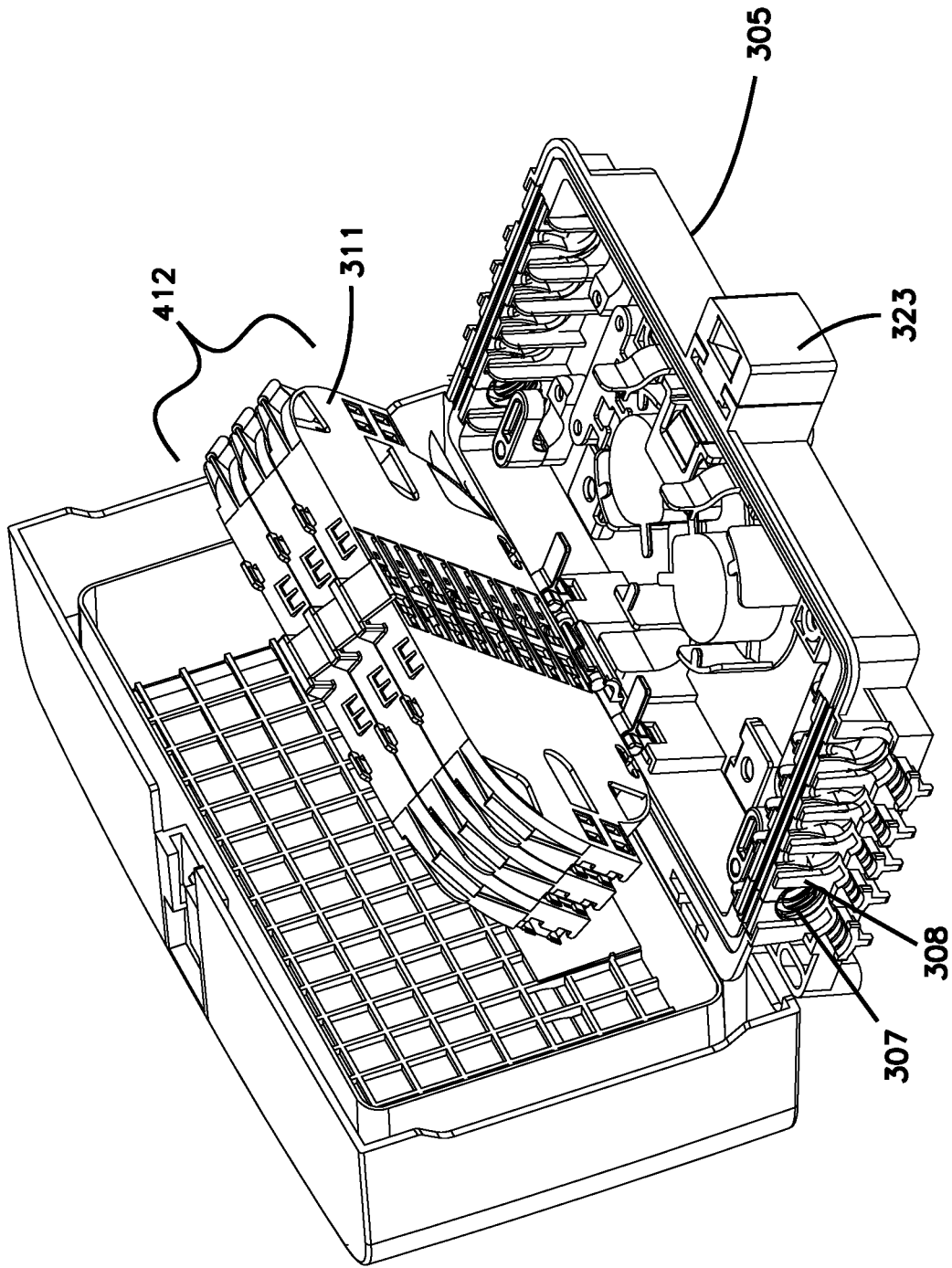
FIG. 48 is a front perspective view of the enclosure of FIG. 47 with the upgraded tray arrangement disposed in the first orientation and each of the trays moved to the access position.
Figure 49:
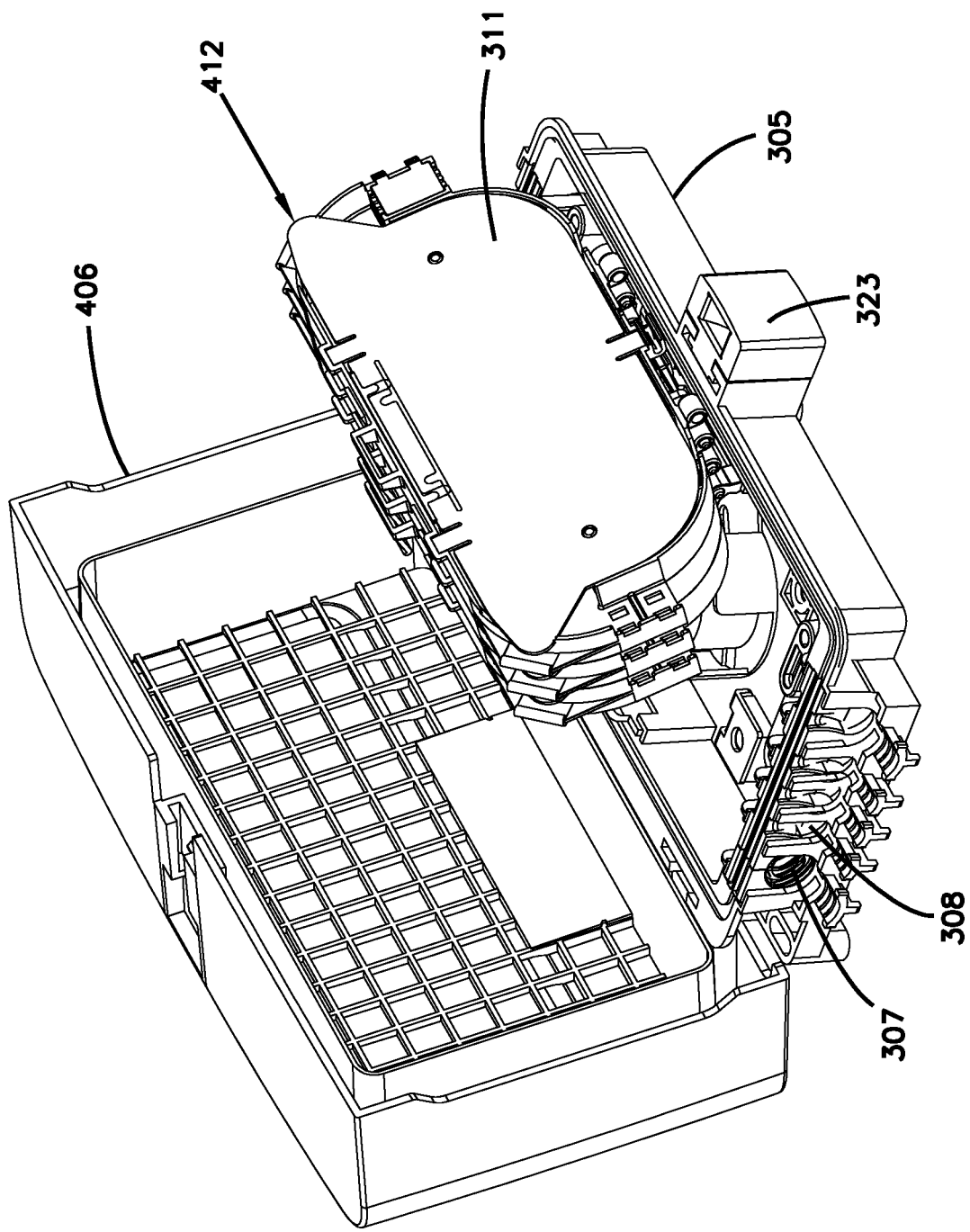
FIG. 49 is a front perspective view of the enclosure of FIG. 47 with the upgraded tray arrangement disposed in the second orientation and each of the trays moved to the access position.

Referring now to FIGS. 47-49, a small capacity enclosure 300 can be initially provided to the subscriber with a first tray arrangement 312 having a first capacity. Subsequently, the enclosure and tray arrangement can be easily upgraded in the field. The cover 306 is removed from the base 305. The tray arrangement 312 is upgraded to a larger capacity tray arrangement 412.

In some examples, the tray arrangement is upgraded by installing additional trays 311 to the existing tray(s) 311 to form the larger capacity tray arrangement 412. In other examples, the tray arrangement is upgraded by replacing the first tray arrangement 312 with a new tray arrangement 412 having more trays 311 than the first tray arrangement 312. The new tray arrangement 412 can be installed in either of the first and second orientations (compare FIGS. 48 and 49).

A new cover 406 is mounted to the base 305. The new cover 406 is larger than the first cover 306. For example, the new cover 406 may have a thickness T2 (FIG. 47) that is greater than a thickness T1 (FIG. 32) of the first cover 306. The increased thickness T2 of the new cover 306 accommodates the additional trays 311 of the upgraded tray arrangement 412.

Alternatively, a supplier can provide one customer with the smaller capacity enclosure 300 and another customer with the larger capacity enclosure 300 depending on need.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An enclosure arrangement for sealing a window cut into a telecommunications cable, the enclosure arrangement comprising:
a re-enterable enclosure having first and second ends extending between first and second sides to define an interior, the enclosure defining a first aligned pair of distribution cable ports disposed towards the first end, a second aligned pair of distribution cable ports disposed towards the second end, and a plurality of aligned pairs of drop cable ports disposed between the first and second aligned pairs of distribution cable ports, the distribution cable ports being larger than the drop cable ports;
a management arrangement being selectively mountable within the interior of the enclosure in a first orientation and in a second orientation that is flipped 180° from the first orientation, the management arrangement including fiber guide channels supporting FIG. 8 routing, the management arrangement including a guide member defining a channel separate from the FIG. 8 routing, the guide member being disposed on only one side of the FIG. 8 routing so that the guide member is aligned with the first pair of distribution cable ports when the management arrangement is disposed in the first orientation and the guide member is aligned with the second pair of distribution cable ports when the management arrangement is disposed in the second orientation; and
a tray arrangement that mounts within the interior of the enclosure, the tray arrangement including one or more trays each being configured to pivot relative to the management arrangement between a stowed position and an access position, wherein the tray arrangement is mounted to the enclosure separate from the management arrangement, and wherein the tray arrangement is selectively mountable within the interior of the enclosure in a first orientation and in a second orientation that is flipped 180° from the first orientation.

2. The enclosure arrangement of claim 1, wherein the management arrangement is configured to be mounted in the first orientation when the first aligned pair receives the telecommunications cable and wherein the management arrangement is configured to be mounted in the second orientation when the second aligned pair receives the telecommunications cable.

3. The enclosure arrangement of claim 1, wherein the interior of the enclosure is environmentally sealed, wherein each of the distribution cable ports and drop cable ports are environmentally sealed.

4. The enclosure arrangement of claim 1, wherein the enclosure includes a base and a cover that pivots relative to the base to provide access to the interior of the enclosure.

5. The enclosure arrangement of claim 1, wherein the base defines the first aligned pair of distribution cable ports, the second aligned pair of distribution cable ports, and the aligned pairs of drop cable ports, and wherein the base includes anchor members extending outwardly from respective ones of the first and second distribution cable ports and the drop cable ports; and wherein the cover extends sufficiently beyond the base to block the anchor members from view.

6. The enclosure arrangement of claim 1, further comprising anchor members disposed within the interior of the enclosure adjacent the first aligned pair of distribution cable ports, the second aligned pair of distribution cable ports, and the aligned pairs of drop cable ports.

7. The enclosure arrangement of claim 6, wherein the anchor members adjacent the first aligned pair of distribution cable ports and the second aligned pair of distribution cable ports include cable clamps and the anchor members adjacent the aligned pairs of drop cable ports include cable tie supporting members.

8. The enclosure system of claim 1, wherein each tray of the tray arrangement includes a base defining a plurality of mounting stations at which various components can be selectively mounted, each mounting station including a first mounting structure, wherein each of the various components includes a second mounting structure that fits with the first mounting structure to hold the component at the mounting station.

9. The enclosure system of claim 8, wherein the various components include a bend radius insert and a splice holder.

10. The enclosure system of claim 9, wherein the various components also include a splitter holder.

11. The enclosure system of claim 9, wherein the various components also include a routing guide.

12. The enclosure system of claim 1, wherein each tray of the tray arrangement is elongate between opposite first and second ends, each tray includes a first fiber entrance at the first end and a second fiber entrance at the second end.

13. The enclosure system of claim 12, further comprising a respective fiber retainer mounted at the first fiber entrance, the second fiber entrance, or both, each fiber retainer including a resilient piece defining fiber channels and a cover that mounts over the resilient piece to close the fiber channels.

14. The enclosure system of claim 9, wherein the bend radius insert includes a first spool and a second spool spaced from the first spool a sufficient distance to provide the FIG. 8 routing.

15. The enclosure system of claim 1, wherein the enclosure includes a base including a receiving arrangement at opposite ends of the base, each receiving arrangement defining a latching receptacle into which latching tabs snap when the management arrangement is installed within the enclosure.

16. The enclosure system of claim 15, wherein when the tray arrangement is disposed in the first orientation, a hinge piece of the tray arrangement mounts in a channel defined in a first one of the receiving arrangements and a latch piece mounts in a channel defined in a second one of the receiving arrangements.

17. The enclosure system of claim 16, wherein when the tray arrangement is disposed in the second orientation, the hinge piece mounts in the channel defined in the second receiving arrangement and the latch piece mounts in the channel defined in the first receiving arrangement.

18. The enclosure system of claim 1, wherein the tray arrangement is moveable between the first and second orientations independent of the management arrangement.

* * * * *